US012646105B2

(12) United States Patent
Scully et al.

(10) Patent No.: US 12,646,105 B2
(45) Date of Patent: Jun. 2, 2026

(54) METHOD OF DISPLAYING PRODUCTS IN A VIRTUAL ENVIRONMENT

(71) Applicant: Apple Inc., Cupertino, CA (US)

(72) Inventors: Brendan J. Scully, Cos Cob, CT (US); Yang Liu, Sunnyvale, CA (US); Alexander B. Oser, Minneapolis, MN (US); Wilson W. Yin, Cupertino, CA (US); Brandel C. Zachernuk, Sunnyvale, CA (US); Maxime Montegnies, Alameda, CA (US); Yiyao Nie, San Jose, CA (US); Paul C. Hikiji, San Jose, CA (US); Mark D. Laughlin, Santa Cruz, CA (US); Weixuan Zhao, Santa Clara, CA (US); Jaewoong Hwang, Sunnyvale, CA (US); Wai Ki Chan, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 18/270,166

(22) PCT Filed: Dec. 23, 2021

(86) PCT No.: PCT/US2021/065146
§ 371 (c)(1),
(2) Date: Jun. 28, 2023

(87) PCT Pub. No.: WO2022/146889
PCT Pub. Date: Jul. 7, 2022

(65) Prior Publication Data
US 2024/0062279 A1 Feb. 22, 2024

Related U.S. Application Data

(60) Provisional application No. 63/132,844, filed on Dec. 31, 2020.

(51) Int. Cl.
*G06Q 30/0601* (2023.01)
*G06F 3/01* (2006.01)
(Continued)

(52) U.S. Cl.
CPC ......... *G06Q 30/0643* (2013.01); *G06F 3/017* (2013.01); *G06T 19/006* (2013.01);
(Continued)

(58) Field of Classification Search
CPC .... G06Q 30/0643; G06V 10/54; G06F 3/017; G06T 19/006; G06T 19/20; G06T 2219/2004; G06T 2219/2016
See application file for complete search history.

(56) References Cited

U.S. PATENT DOCUMENTS 9,213,420 B2 * 12/2015 Amacker .............. G06F 3/0304
9,710,841 B2 * 7/2017 Ainsworth, III ... G06Q 30/0643
(Continued)

OTHER PUBLICATIONS

UploadVR "HoloLens 2 AR Headset: On Stage Live Demonstration," retrieved at: https://www.youtube.com/watch?v=uIHPPtPBgHK &t=154s, retrieved on Aug. 31, 2020.
(Continued)

*Primary Examiner* — Nicholas Augustine
(74) *Attorney, Agent, or Firm* — Kubota & Basol LLP

(57) ABSTRACT

Methods for displaying a virtual shopping experiences provide for an efficient and intuitive user experience. In some embodiments, a computer-generated environment can include a virtual product display that includes one or more representations of products. In some embodiments, the computer-generated environment can include stations that provide additional information associated with a respective product. In some embodiments, a user is able to customize a respective product, for example, by selecting an accessory and dragging the accessory to a representation of the respec-
(Continued)

tive product. In some embodiments, a user is able to preview a product by placing a representation of the product on a representation of a portion of the user's body.

21 Claims, 31 Drawing Sheets

(51) Int. Cl.
  *G06T 19/00*    (2011.01)
  *G06T 19/20*    (2011.01)
  *G06V 10/54*    (2022.01)

(52) U.S. Cl.
  CPC .............. *G06T 19/20* (2013.01); *G06V 10/54*
  (2022.01); *G06T 2219/2004* (2013.01); *G06T*
      *2219/2016* (2013.01)

(56) References Cited

U.S. PATENT DOCUMENTS

| | | | | |
|---|---|---|---|---|
| 10,049,276 | B1 | 8/2018 | Harper et al. | |
| 11,417,179 | B1* | 8/2022 | Zalewski | H04W 4/80 |
| 2009/0234716 | A1* | 9/2009 | Mallick | G16H 30/40 |
| | | | | 705/37 |
| 2010/0030578 | A1* | 2/2010 | Siddique | G06Q 20/12 |
| | | | | 705/26.1 |
| 2012/0075168 | A1* | 3/2012 | Osterhout | G06F 3/017 |
| | | | | 345/8 |
| 2013/0110666 | A1* | 5/2013 | Aubrey | G06Q 30/0255 |
| | | | | 705/26.5 |
| 2013/0215116 | A1* | 8/2013 | Siddique | G06Q 20/40 |
| | | | | 705/26.7 |
| 2014/0025529 | A1 | 1/2014 | Honeycutt et al. | |
| 2014/0229342 | A1* | 8/2014 | Marlowe | G06Q 30/0643 |
| | | | | 705/27.2 |
| 2014/0363059 | A1* | 12/2014 | Hurewitz | G06Q 30/0201 |
| | | | | 382/118 |
| 2014/0365272 | A1* | 12/2014 | Hurewitz | G06Q 30/0201 |
| | | | | 705/7.29 |
| 2015/0371321 | A1* | 12/2015 | Chapuis | G09F 3/208 |
| | | | | 705/27.1 |
| 2016/0026253 | A1 | 1/2016 | Bradski et al. | |
| 2016/0210602 | A1* | 7/2016 | Siddique | G06Q 20/12 |
| 2017/0132842 | A1 | 5/2017 | Morrison | |
| 2017/0249693 | A1* | 8/2017 | Greenwood | G06T 19/003 |
| 2018/0040044 | A1* | 2/2018 | Mattingly | G06Q 30/0617 |
| 2018/0204174 | A1 | 7/2018 | Soon-Shiong | |
| 2018/0232800 | A1 | 8/2018 | Mattingly et al. | |
| 2019/0065027 | A1 | 2/2019 | Hauenstein et al. | |
| 2019/0266663 | A1* | 8/2019 | Keeler | G06Q 30/0643 |
| 2019/0325498 | A1* | 10/2019 | Clark | G06Q 30/0643 |
| 2020/0225757 | A1 | 7/2020 | Schwarz et al. | |
| 2020/0302510 | A1* | 9/2020 | Chachek | G06V 20/52 |
| 2020/0302693 | A1* | 9/2020 | Singh | G06Q 30/0643 |
| 2021/0004137 | A1 | 1/2021 | Oser | |
| 2021/0248669 | A1* | 8/2021 | Wade | G06V 20/20 |
| 2022/0130126 | A1* | 4/2022 | Delgado | G06T 7/521 |
| 2022/0392171 | A1 | 12/2022 | Baughman et al. | |
| 2024/0273594 | A1 | 8/2024 | Scully et al. | |
| 2024/0273597 | A1 | 8/2024 | Scully et al. | |

OTHER PUBLICATIONS

Magic Leap Augmented Reality Shopping and Voice Control, YouTube, uploaded by Road to VR, Jul. 22, 2016 [online]. Retrieved from the Internet: <https://www.youtube.com/watch?v=Z6Wa6DjHA98>, [retrieved on Dec. 5, 2024], 2 pages.
Morotti, et al. "Fostering Fashion Retail Experience Through Virtual Reality and Voice Assistants", 2020 IEEE Conference on Virtual Reality and 3D User Interfaces Abstracts and Workshops (VRW), Atlanta, GA, 2020, <DOI:10.1109/VRW50115.2020.00074>, pp. 338-342.
Audi R8 Augmented Reality Product Visualiser, Vimeo, uploaded by Engine Creative, Jul. 12, 2018 [online]. Retrieved from the Internet: <https://vimeo.com/279678041>, [retrieved on Feb. 2, 2025], 3 pages.
Configure One [online]. Retrieved from the Internet: <https://www.configureone.com>, [retrieved on Jun. 10, 2022], 9 pages.
Delphi AR App, Vimeo, uploaded by Engine Creative, Oct. 6, 2017 [online]. Retrieved from the Internet: <https://vimeo.com/237081043>, [retrieved on Feb. 2, 2025], 3 pages.
Fully Immersive VR Hot Tub Experience, Vimeo, uploaded by Engine Creative, Sep. 17, 2019 [online]. Retrieved from the Internet: <https://vimeo.com/360577724>, [retrieved on Feb. 2, 2025], 3 pages.
Gap Dressing Room AR APP By Avametric, Vimeo, uploaded by Ari Bloom, Jan. 7, 2017 [online]. Retrieved from the Internet: <https://vimeo.com/198481246>, [retrieved on Feb. 2, 2025], 3 pages.
KBMax [online]. Retrieved from the Internet: <https://web.archive.org/web/20201027065819/https://kbmax.com/solutions/cpq-for-b2b-ecommerce>, [retrieved on Feb. 2, 2025], 4 pages.
Virtual Reality for Automotive Dealerships, FlowFound [online]. Retrieved from the Internet: <https://web.archive.org/web/20200808024625/https://flowfound.com/virtual-reality/>, [retrieved on Jun. 23, 2023.], 4 pages.
Powertrak Software, Axonom Inc. [online]. Retrieved from the Internet <https://www.axonom.com/powertrak>, [retrieved on Jun. 10, 2022], 7 pages.
Reydar—Modern Office Case Study with AR, Vimeo, uploaded by Engine Creative, Feb. 3, 2020 [online]. Retrieved from the Internet: <https://vimeo.com/389031426>, [retrieved on Feb. 2, 2025], 3 pages.
Threekit [online]. Retrieved from <https://www.threekit.com/platform-overview#solution>, [retrieved on Jun. 10, 2022], 20 pages.
Álvarez Márquez et al. "In-Store Augmented Reality-Enabled Product Comparison and Recommendation", Fourteenth ACM Conference on Recommender Systems, ACMPUB27, New York, Sep. 22, 2020, <DOI: 10.1145/3383313.3412266>, pp. 180-189.
Tudjarov et al. "Web Virtual Reality for Product Customization," APEM Journal, vol. 4, 2009, pp. 25-34.
Non-Final Office Action received for U.S. Appl. No. 18/587,657, mailed on Aug. 27, 2025, 17 pages.

* cited by examiner

Device
200

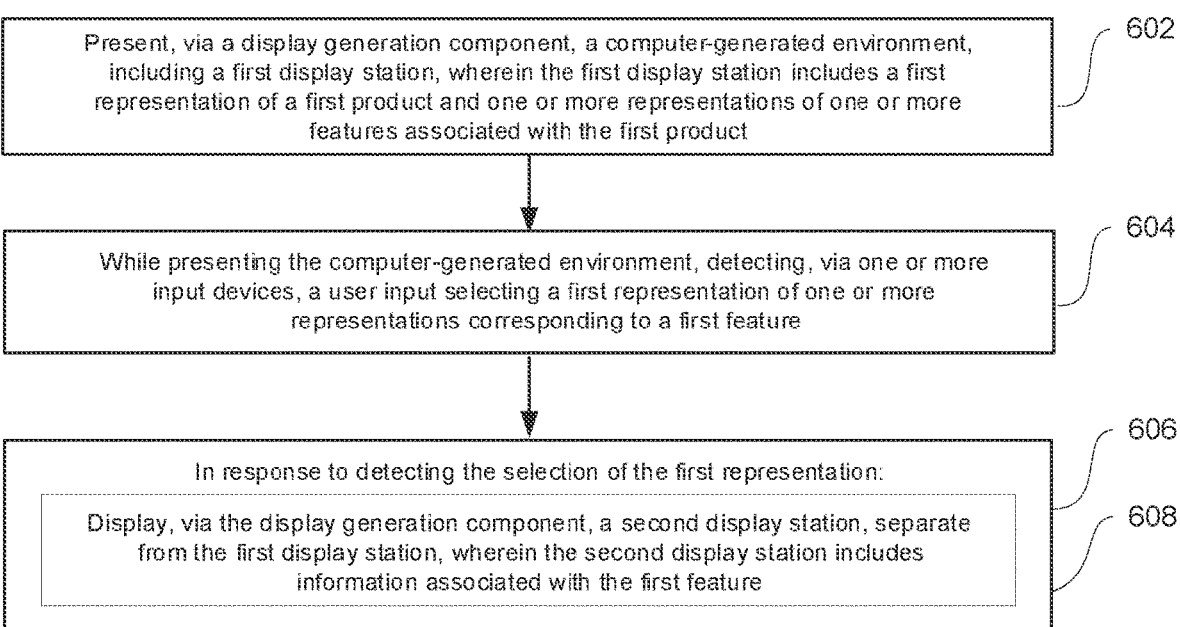

600

Present, via a display generation component, a computer-generated environment, including a first display station, wherein the first display station includes a first representation of a first product and one or more representations of one or more features associated with the first product — 602

While presenting the computer-generated environment, detecting, via one or more input devices, a user input selecting a first representation of one or more representations corresponding to a first feature — 604

In response to detecting the selection of the first representation: — 606

Display, via the display generation component, a second display station, separate from the first display station, wherein the second display station includes information associated with the first feature — 608

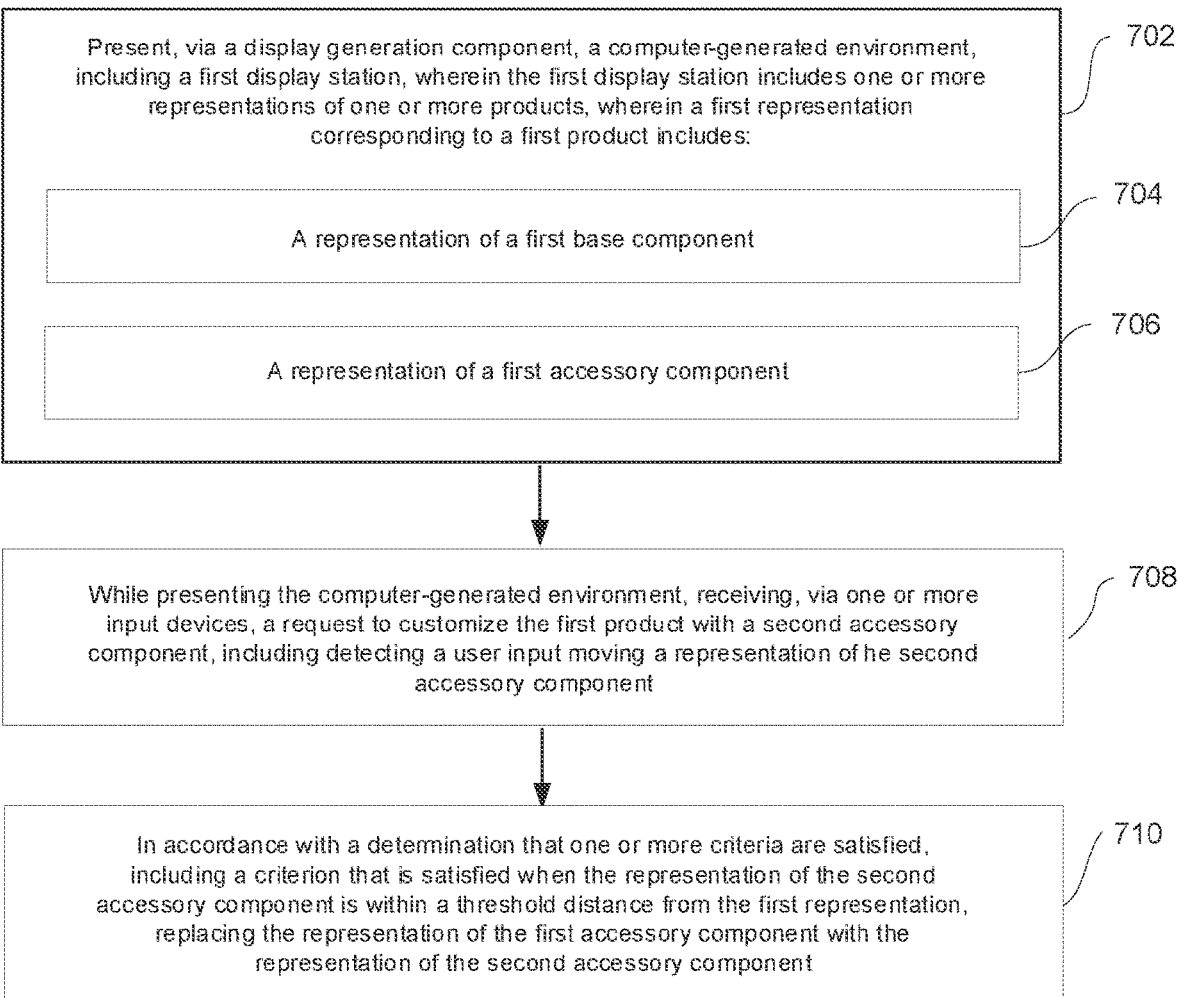

Present, via a display generation component, a computer-generated environment, including a first display station, wherein the first display station includes one or more representations of one or more products, wherein a first representation corresponding to a first product includes:                                                                    702

A representation of a first base component                                                                    704

A representation of a first accessory component                                                                    706

While presenting the computer-generated environment, receiving, via one or more input devices, a request to customize the first product with a second accessory component, including detecting a user input moving a representation of he second accessory component                                                                    708

In accordance with a determination that one or more criteria are satisfied, including a criterion that is satisfied when the representation of the second accessory component is within a threshold distance from the first representation, replacing the representation of the first accessory component with the representation of the second accessory component                                                                    710

FIG. 7

METHOD OF DISPLAYING PRODUCTS IN A VIRTUAL ENVIRONMENT

CROSS-REFERENCE TO RELATED APPLICATIONS

This application is a National Phase application under 35 U.S.C. § 371 of International Application No. PCT/US2021/065146, filed Dec. 23, 2021, which claims the priority benefit of U.S. Provisional Application No. 63/132,844, filed Dec. 31, 2020, the contents of which are hereby incorporated by reference in their entireties for all intended purposes.

FIELD OF THE DISCLOSURE

This relates generally to methods for displaying products in a virtual environment.

BACKGROUND OF THE DISCLOSURE

Computer-generated environments are environments where at least some objects displayed for a user's viewing are generated using a computer. Users may interact with a computer-generated environment, such as by browsing a virtual store and customizing and/or purchasing products.

SUMMARY OF THE DISCLOSURE

Some embodiments described in this disclosure are directed to methods displaying a virtual product display in a three-dimensional environment. Some embodiments described in this disclosure are directed to methods of interacting with, customizing, and previewing virtual products. These interactions provide a more efficient and intuitive user experience. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 6 is a flow diagram illustrating a method of displaying products in a three-dimensional environment according to some embodiments of the disclosure.

FIG. 7 is a flow diagram illustrating a method of customizing products in a three-dimensional environment according to some embodiments of the disclosure.

DETAILED DESCRIPTION

Figure 1:
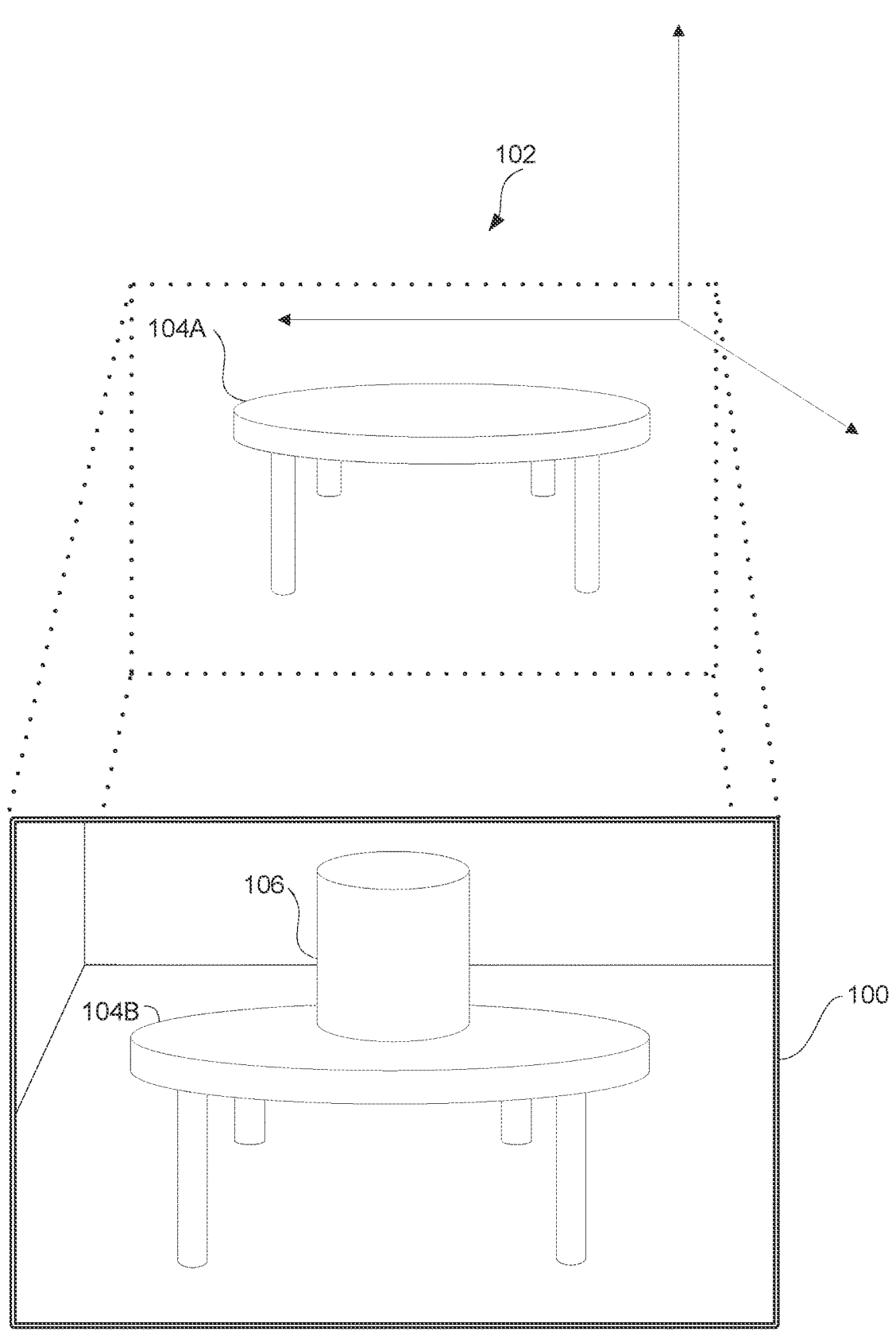
FIG. 1 illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a respective representation could be referred to as a "first" or "second" representation, without implying that the respective representation has different characteristics based merely on the fact that the respective representation is referred to as a "first" or "second" representation. On the other hand, a representation referred to as a "first" representation and a representation referred to as a "second" representation are both representation, but are not the same representation, unless explicitly described as such.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

As used herein, presenting an environment includes presenting a real-world environment, presenting a representation of a real-world environment (e.g., displaying via a display generation component such as a display), and/or presenting a virtual environment (e.g., displaying via a display generation component). Virtual content (e.g., user interfaces, content items, etc.) can also be presented with these environments (e.g., displayed via a display generation component). It is understood that as used herein the terms "presenting"/"presented" and "displaying"/"displayed" are often used interchangeably, but depending on the context it is understood that when a real world environment is visible to a user without being generated by the display generation component, such a real world environment is "presented" to the user (e.g., allowed to be viewable, for example, via a transparent or translucent material) and not necessarily technically "displayed" to the user.

Embodiments of electronic devices, user interfaces for such devices, and associated processes for using such devices are described. In some embodiments, the device is a portable communications device, such as a mobile telephone, that also contains other functions, such as personal digital assistant and/or music player functions. Other portable electronic devices, such as laptops or tablet computers with touch-sensitive surfaces (e.g., touch screen displays and/or touch pads), are optionally used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces/computer generated environments of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the description herein, an electronic device that includes a display generation component for displaying a computer-generated environment optionally includes one or more input devices. In some embodiments, the one or more input devices includes a touch-sensitive surface as a means for the user to interact with the user interface or computer-generated environment (e.g., finger contacts and gestures on the touch-sensitive surface). It should be understood, however, that the electronic device optionally includes or receives input from one or more other input devices (e.g., physical user-interface devices), such as a physical keyboard, a mouse, a stylus and/or a joystick (or any other suitable input device).

In some embodiments, the one or more input devices can include one or more cameras and/or sensors that is able to track the user's gestures and interpret the user's gestures as inputs. For example, the user may interact with the user interface or computer-generated environment via eye focus (gaze) and/or eye movement and/or via position, orientation or movement of one or more fingers/hands (or a representation of one or more fingers/hands) in space relative to the user interface or computer-generated environment. In some embodiments, eye focus/movement and/or position/orientation/movement of fingers/hands can be captured by cameras and other sensors (e.g., motion sensors). In some embodiments, audio/voice inputs can be used to interact with the user interface or computer-generated environment captured by one or more audio sensors (e.g., microphones). Further, as described above, it should be understood that the described electronic device, display and touch-sensitive surface and/or other input devices/sensors are optionally distributed amongst two or more devices.

Therefore, as described herein, information displayed on the electronic device or by the electronic device is optionally used to describe information output by the electronic device for display on a separate display device (touch-sensitive or not). Similarly, as described herein, input received on the electronic device (e.g., touch input received on a touch-sensitive surface of the electronic device) is optionally used to describe input received on a separate input device, from which the electronic device receives input information.

The device typically supports a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a content application (e.g., a photo/ video management application), a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed via the device are, optionally, adjusted and/or varied from one application to the next and/or within a respective application. In this way, a common physical architecture (such as the touch-sensitive surface or other input device/sensor) of the device optionally supports the variety of applications with user interfaces that are intuitive and transparent to the user.

FIG. 1 illustrates an electronic device 100 configurable to display a computer-generated environment according to some embodiments of the disclosure. In some embodiments, electronic device 100 is a portable electronic device, such as a tablet computer, laptop computer or a smartphone, among other possibilities. Example architectures of electronic device 100 are described in further detail with reference to FIGS. 2A-2B. FIG. 1 illustrates electronic device 100 and table 104A located in the physical environment 102. In some embodiments, electronic device 100 is configured to capture and/or display areas of physical environment 102 including table 104A (illustrated in the field of view of electronic device 100). In some embodiments, the electronic device 100 is configured to display one or more virtual objects in the computer-generated environment that are not present in the physical environment 102, but are displayed in the computer generated environment (e.g., positioned on or otherwise anchored to the top surface of a computer-generated representation 104B of real-world table 104A). In FIG. 1, for example, an object 106 not present in the physical environment (e.g., a virtual object) is displayed on the surface of the table 104B in the computer-generated environment displayed via device 100, optionally in response to detecting the planar surface of table 104A in the physical environment 102. It should be understood that object 106 is a representative object and one or more different objects (e.g., of various dimensionality such as two-dimensional or three-dimensional objects) can be included and rendered in a two-dimensional or a three-dimensional computer-generated environment. For example, the virtual objects can include an application or a user interface displayed in the computer-generated environment. Additionally, it should be understood, that the three-dimensional (3D) environment (or 3D object) described herein may be a representation of a 3D environment (or 3D object) displayed in a two dimensional (2D) context (e.g., displayed on a 2D display screen).

Figure 2A:
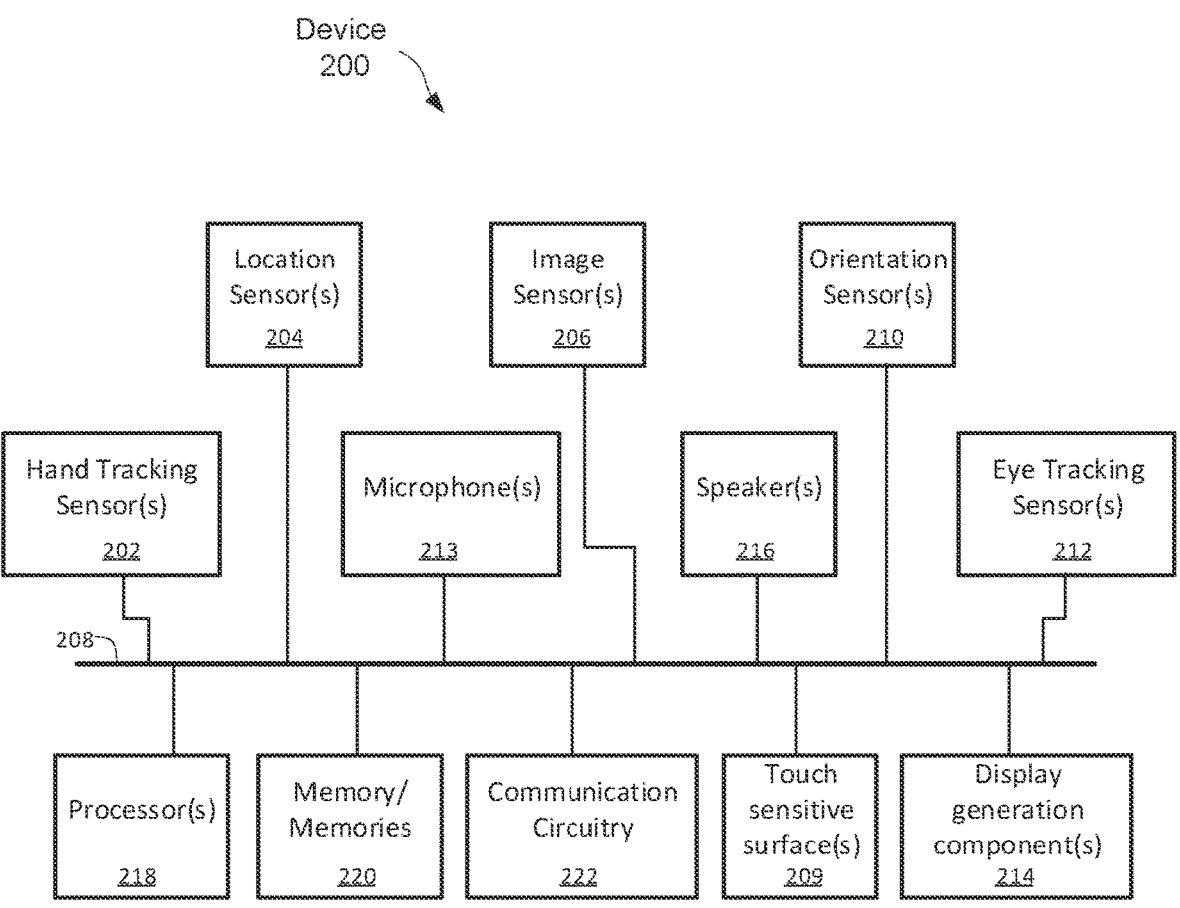
FIGS. 2A-2B illustrate block diagrams of exemplary architectures for a device or devices in accordance with some embodiments of the disclosure.
Figure 2B:
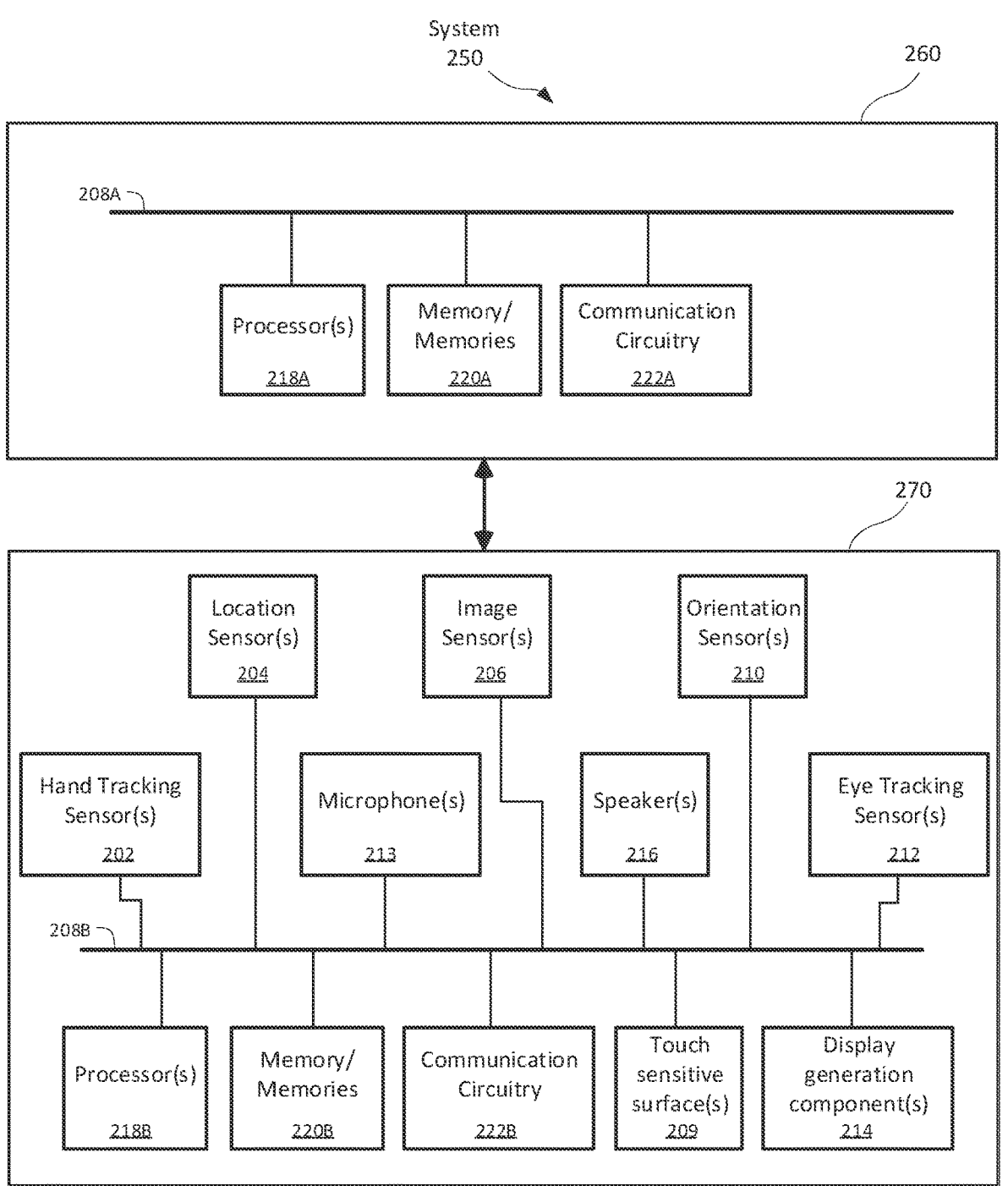

FIGS. 2A-2B illustrate example block diagrams of architectures for a device or devices in accordance with some embodiments of the disclosure. The blocks in FIG. 2A can represent an information processing apparatus for use in a device. In some embodiments, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some embodiments, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some embodiments, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some embodiments, display generation component(s) 214 include multiple displays. In some embodiments, display generation component(s) 214 includes a display with a touch-sensitive surface (e.g., a touch screen), a projector, a holographic projector, a retinal projector, etc.

In some embodiments, device 200 includes touch-sensitive surface(s) 209 configured to receive user inputs (touch and/or proximity inputs), such as tap inputs and swipe inputs or other gestures. In some embodiments, display generation component(s) 214 and touch-sensitive surface(s) 209 together form touch-sensitive display(s) (e.g., a touch screen integrated with device 200 or external to device 200 that is in communication with device 200). It should be understood, that device 200 optionally includes or receives input from one or more other physical user-interface devices than a touch-sensitive surface, such as a physical keyboard, a mouse, a stylus and/or a joystick (or any other suitable input device).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 206 include a first image sensor and a second image sensor. The first image sensor and the second image sensor work together and are optionally configured to capture different information of physical objects in the real-world environment. In some embodiments, the first image sensor is a visible light image sensor and the second image sensor is a depth sensor. In some embodiments, device 200 uses image sensor(s) 206 to detect the position and orientation of device 200 and/or display generation component(s) 214 in the real-world environment. For example, device 200 uses image sensor(s) 206 to track the position and orientation of display generation component (s) 214 relative to one or more fixed objects in the real-world environment.

In some embodiments, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, or head, more generally) with respect to the real-world or computer-generated environment and/or relative to the display generation component(s) 214. The user's gaze can include a direction in which the eyes are directed, and optionally intersection with a particular point or region of space and/or intersection with a particular object. In some embodiments, hand tracking sensor(s) 202 and/or eye tracking sensor(s) 212 are implemented together with the display generation component(s) 214 (e.g., in the same device). In some embodiments, the hand tracking sensor(s) 202 and/or eye tracking sensor(s) 212 are implemented separate from the display generation component(s) 214 (e.g., in a different device).

In some embodiments, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some embodiments, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, eye tracking sensor(s) 212 includes one or more eye tracking cameras (e.g., IR cameras) and/or illumination sources (e.g., IR light sources/ LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and gaze can be determined from tracking both eyes. In some embodiments, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some embodiments, microphone(s) 213 includes an array of microphones that optionally operate together (e.g., to identify ambient noise or to locate the source of sound in space of the real-world environment). In some embodiments, audio and/or voice inputs can be used to interact with the user interface or computer-generated environment captured using one or more audio sensors (e.g., microphones), as permitted by the user of the electronic device.

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that device 200 is not limited to the components and configuration of FIG. 2A. For example, the device can include fewer, additional, or other components in the same or different configurations. In some embodiments, as illustrated in FIG. 2B, system 250 can be divided between multiple devices. For example, a first device 260 optionally includes processor(s) 218A, memory or memories 220A, and communication circuitry 222A, optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

Device 200 or system 250 typically support a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo/video management application, a digital camera application, a digital video camera application, a web browsing application, a digital music player application, a television channel browsing application, and/or a digital video player application.

A computer-generated environment may be displayed using an electronic device (e.g., electronic device 100, device 200, device 270), including using one or more display generation components. The computer-generated environment can optionally include various graphical user interfaces ("GUIs") and/or user interface objects.

In some embodiments, the electronic device can detect or estimate a lighting characteristic of the real world. The estimate of the lighting characteristic can provide some understanding of lighting in the environment. For example, the estimate of the lighting characteristic may provide an indication of which regions of the real-world environment are light or dark. The estimate of the lighting characteristic may provide an indication of the position of light sources (e.g., parametric light sources, directional light sources, point light sources, area light sources, etc.) and/or orientation of light sources. In some embodiments, the lighting characteristic is estimated as a per-voxel incident light field indicating brightness, color and/or direction. For example, the lighting characteristic can be parameterized as an image-based lighting (IBL) environment map. It should be understood that other parameterizations of the lighting characteristic are possible. In some examples, the lighting characteristic is estimated on a per pixel basis of using a triangle mesh with the lighting characteristic defining lighting for each vertex or for each face. Additionally, it should be understood that the estimate of the lighting characteristic is optionally derived from an intermediate representation (e.g., environment map).

In some embodiments, sensors such as cameras (e.g., image sensor(s) 206) are used to capture images of the real-world environment. The images can be processed by processing circuitry (one or more of processor(s) 218) to localize and measure light sources. In some embodiments, light can be determined from the reflections and or shadows cast by light sources in the environment. In some embodiments, deep learning (e.g., supervised) or other artificial intelligence or machine learning is used to estimate the lighting characteristic based on input image(s).

As described herein, a computer-generated environment including various graphics user interfaces ("GUIs") may be displayed using an electronic device, such as electronic device 100 or device 200, including one or more display generation components. The computer-generated environment can include one or more virtual objects. In some embodiments, the one or more virtual objects can be interacted with or manipulated within the three-dimensional environment. For example, a user is able to move or rotate a virtual object. As will be described in further detail below, interactions with a virtual object can be either direct or indirect and the device can automatically interpret user inputs as either a direct or indirect manipulation based on the context, such as the position of the hands of the user and/or the position of the virtual object to be manipulated.

In some embodiments, locations in a computer-generated environment (e.g., a three-dimensional environment, an XR environment, a mixed reality environment, etc.) optionally have corresponding locations in the physical environment. Thus, when a device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a user interface located in front of the table, with the table being a view of (or a representation of) a physical table in the physical environment, and the user interface being a virtual object.

Similarly, a user is optionally able to interact with virtual objects in the three-dimensional environment (e.g., such as user interfaces of applications running on the device) using one or more hands as if the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment (e.g., grabbing, moving, touching, pointing at virtual objects, etc.) as if they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user can be located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique used to determine where and what the gaze of the user is directed to. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

Some embodiments described herein may refer to selection inputs as either discrete inputs or as continuous inputs. For example, a selection input can correspond to a single selection input or a selection input can be held (e.g., maintained) while performing one or more other gestures or inputs. In some embodiments, a selection input can have an initiation stage, a holding stage, and a termination stage. For example, in some embodiments, a pinch gesture by a hand of the user can be interpreted as a selection input. In this example, the motion of the hand into a pinch position can be referred to as the initiation stage and the device is able to detect that the user has initiated a selection input. The holding stage refers to the stage at which the hand maintains the pinch position. Lastly, the termination stage refers to the motion of the hand terminating the pinch position (e.g., releasing the pinch). In some embodiments, if the holding stage is less than a predetermined threshold amount of time (e.g., less than 0.1 seconds, 0.3 seconds, 0.5 seconds, 1 second, 2 seconds, etc.), then the selection input is interpreted as a discrete selection input (e.g., a single event actuating a respective user interface element), such as a mouse click-and-release, a keyboard button press-and-release, etc. In such embodiments, the electronic device optionally reacts to the discrete selection event (e.g., optionally after detecting the termination). In some embodiments, if the holding stage is more than the predetermined threshold amount of time, then the selection input is interpreted as a select-and-hold input, such as a mouse click-and-hold, a keyboard button press-and-hold, etc. In such embodiments, the electronic device can react to not only the initiation of the selection input (e.g., initiation stage), but also to any gestures or events detected during the holding stage (e.g., such as the movement of the hand that is performing the selection gesture), and/or the termination of the selection input (e.g., termination stage).

Figure 3A:
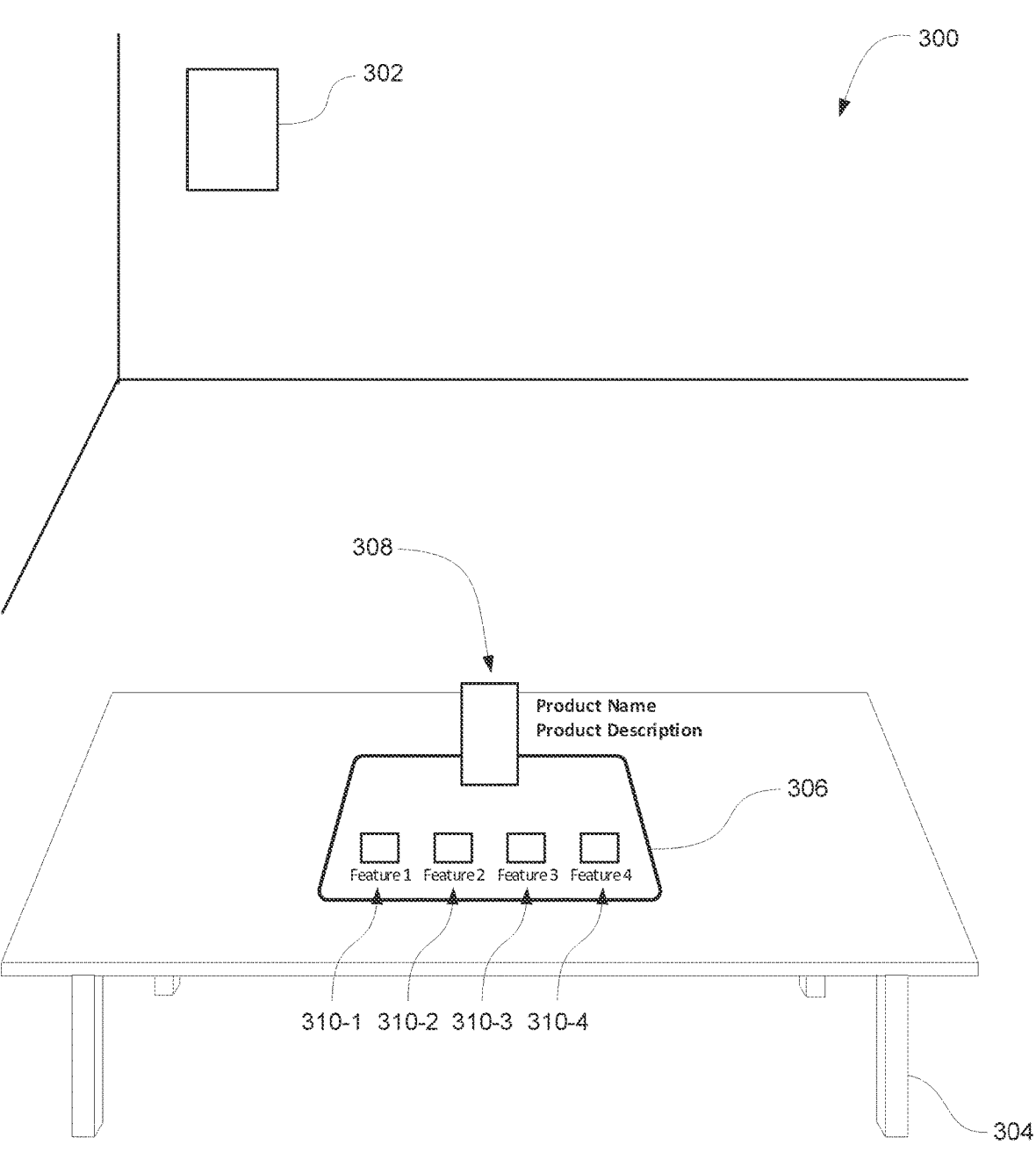
FIGS. 3A-3D illustrate a method of displaying information associated with a product according to some embodiments of the disclosure.

FIGS. 3A-3D illustrate a method of displaying information associated with a product according to some embodiments of the disclosure. FIG. 3A illustrates three-dimensional environment 300 (e.g., a computer-generated environment, an extended reality environment, etc.) that is being displayed by a display generation component of an electronic device (e.g., such as electronic device 100 and/or device 200 described above with respect to FIG. 1 and FIG. 2).

In some embodiments, three-dimensional environment 300 includes one or more real-world objects (e.g., representations of objects in the physical environment around the device) and/or one or more virtual objects (e.g., representations of objects generated and displayed by the device that are not necessarily based on real-world objects in the physical environment around the device). For example, in FIG. 3A, table 304 and picture frame 302 can both be representations of real-world objects in the physical environment around the device. In some embodiments, table 304 and picture frame 302 are displayed by the display generation component by capturing one or more images of table 304 and picture frame 302 (e.g., using one or more sensors of the electronic device) and displaying a representation of the table and picture frame (e.g., a photorealistic representation, a simplified representation, a caricature, etc.), respectively, in the three-dimensional environment. In some embodiments, table 304 and picture frame 302 are passively provided by the device via a transparent or translucent display (e.g., by not obscuring the user's view of table 304 and picture frame 302, thus allowing table 304 and picture frame 302 to be visible to the user through the transparent or translucent display). In some embodiments, table 304 and/or picture frame 302 are virtual objects that exist in three-dimensional environment 300, but not in the real-world environment (e.g., physical environment) around the device. For example, the electronic device can generate a virtual table and display the virtual table as table 304 in three-dimensional environment 300 to appear as if table 304 is physically in the room with the user.

In some embodiments, extended reality environments (e.g., such as three-dimensional environment 300) are able to provide a virtual retail experience by displaying one or more product displays, in a manner similar to a physical retail store (e.g., a brick-and-mortar store). For example, in FIG. 3A, product station 306 can be displayed on table 304 (e.g., which can be a physical object or a virtual object, as discussed above). In some embodiments, product station 306 can be a virtual object that is generated by the electronic device and displayed in three-dimensional environment 300 to appear as if it is placed on the top surface of table 304. In some embodiments, product station 306 mimics a product placemat or product display area in a real-world retail store. In FIG. 3A, product station 306 is a three-dimensional object similar to a placemat (e.g., a flat, planar surface), upon which one or more virtual objects can be placed. In some embodiments, other shapes and sizes are possible for displaying products, such as a basket, a bowl, a rack, etc.

Figure 4A:
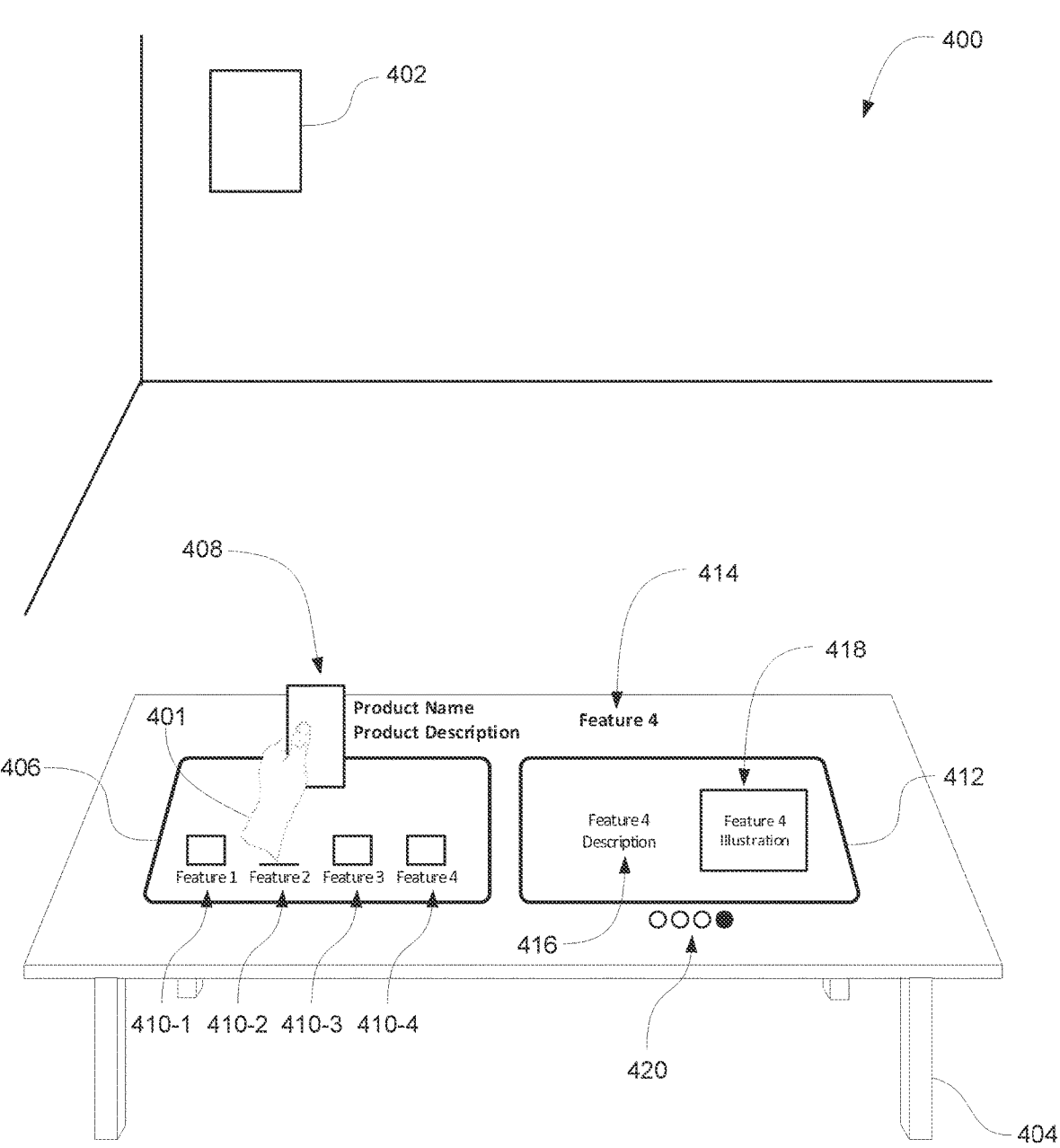
FIGS. 4A-4C illustrate a method of interacting with a virtual product display according to some embodiments of the disclosure.
Figure 4B:
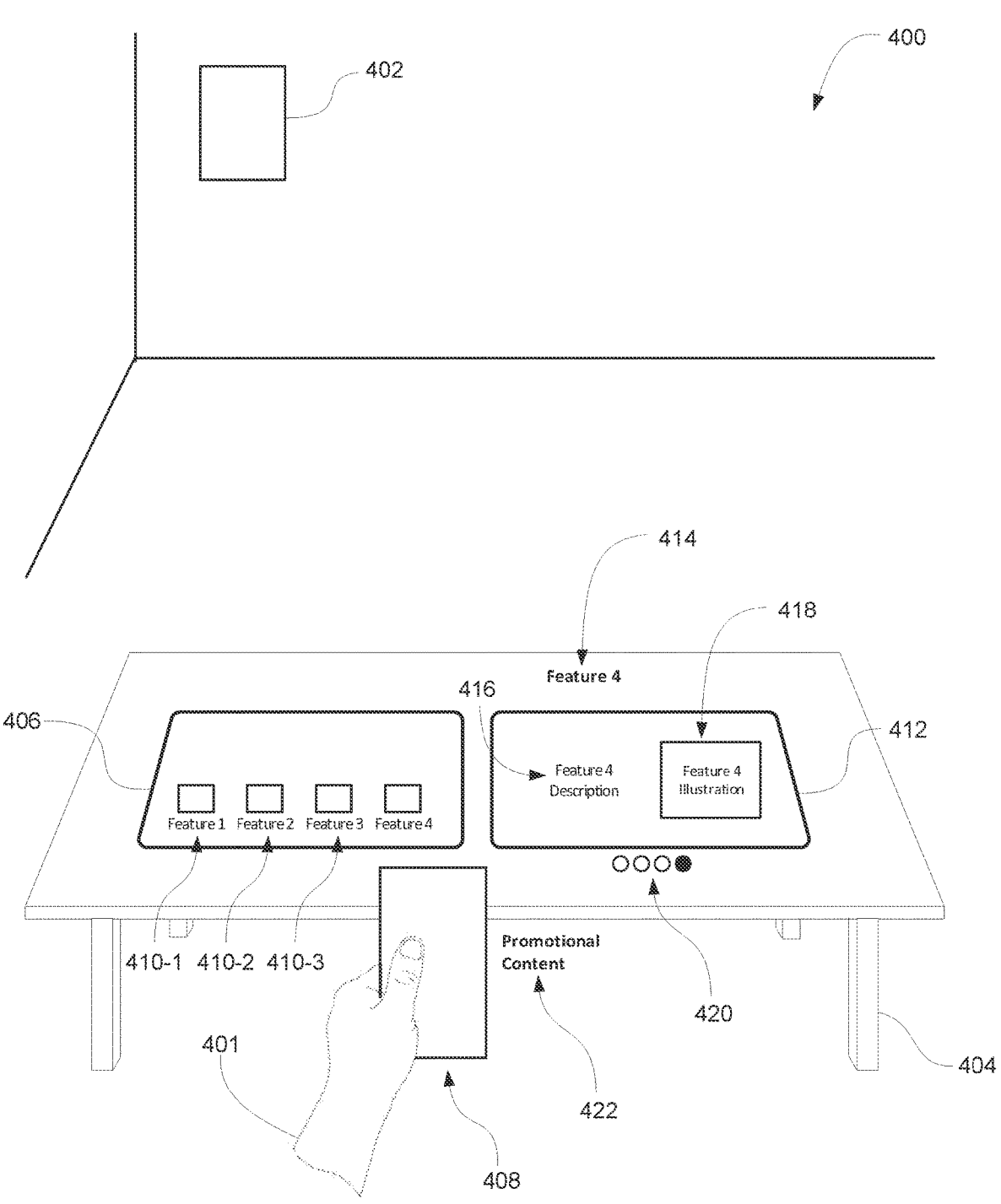
Figure 4C:
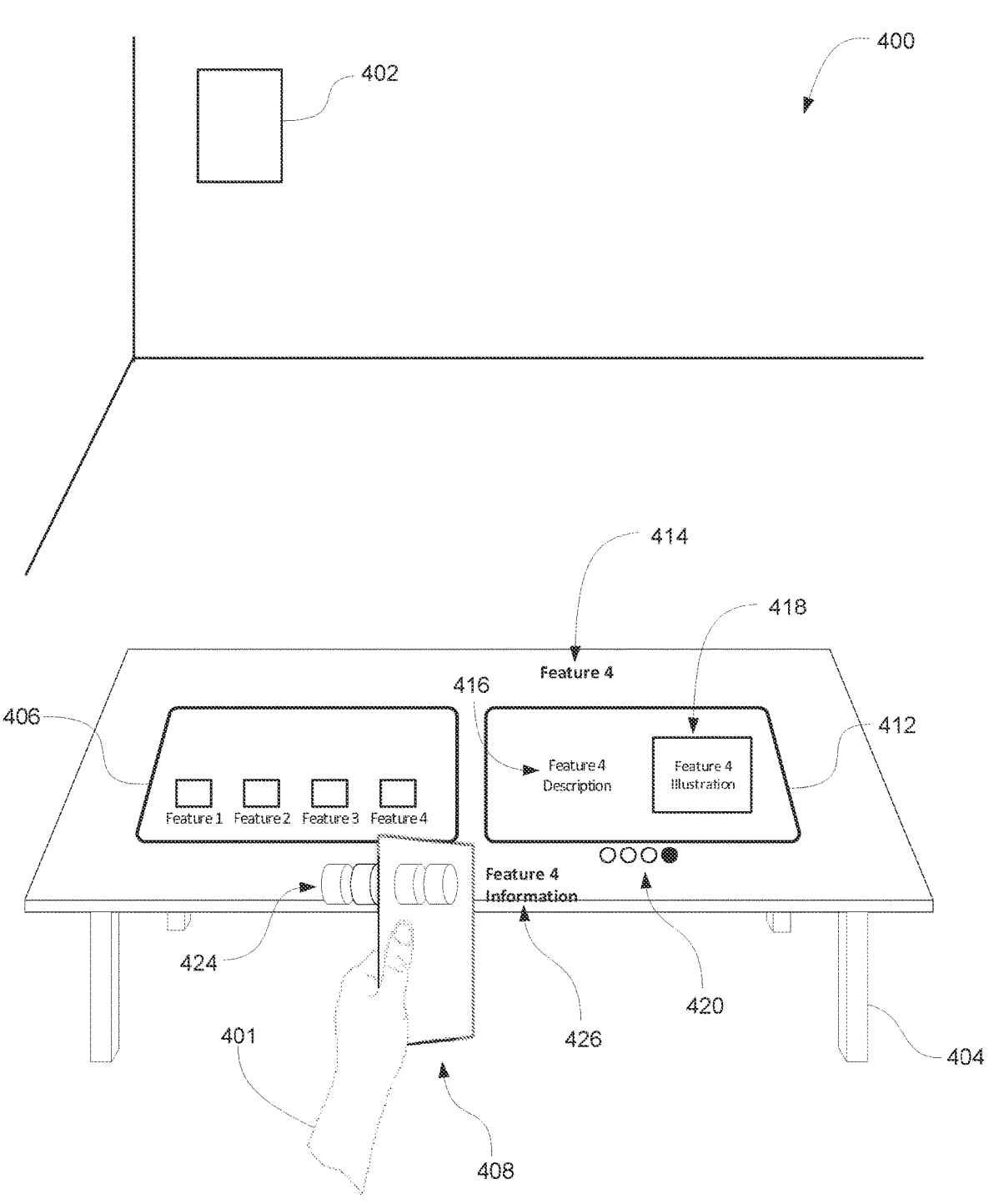

In some embodiments, product station 306 is associated with one type of product, one product model, one product SKU, etc. For example, in FIG. 3A, product station 306 is associated with a respective smartphone model. In some embodiments, the respective smartphone model can have one or more customizable features (e.g., features that a customer can select) and one or more inherent features (e.g., features that are built into the product). In FIG. 3A, product station 306 includes a representation 308 of the respective smartphone model and the accompanying name and description of the respective smartphone model. In some embodiments, representation 308 (e.g., optionally including the name and/or description) is a three-dimensional object that is floating above product station 306. In some embodiments, representation 308 (e.g., optionally including the name and/or description) is a three-dimensional object that is placed on the surface of product station 306 (e.g., laying down, propped up, etc.). As will be described in further detail below with respect to FIGS. 4A-4C, representation 408 is optionally interactable.

Because representation 308 is a three-dimensional object, the user is optionally able to move around in three-dimensional environment 300 (e.g., by physical walking around in the real-world environment) and view representation 308 from different angles and perspectives (e.g., from the side, from behind, from the top, etc.).

In some embodiments, the user is able to customize one or more aspects of the respective product on display. For example, product station 306 optionally includes one or more affordances associated with different customization options. For example, for a respective smartphone model, different screen sizes may be available, different memory sizes may be available, and/or different color options may be available. Thus, product station 306 can include one or more affordances at or near representation 308, which is selectable to select the respective customization option and optionally cause representation 308 to be updated based on the selected customization option. For example, in response to a user selecting an option to change the screen size, representation 308 optionally changes size (e.g., changes screen size, changes overall size) accordingly. Similarly, if a user selects an option to set the color to a respective color, representation 308 optionally updates to reflect the selected color.

In some embodiments, representation 308 can be a static representation or a dynamic representation of the product. For example, in the case of representation 308 being a representation of a smartphone, representation 308 can have a screen or display (e.g., in a manner similar to the physical product) that is displaying a product or feature demonstration, a still image, a video, a slideshow, etc. In some embodiments, while representation 308 is located at or on product station 306, representation 308 is in a passive demonstration mode in which information about features of the device are presented (e.g., an image, a video, an animation, virtual graphics, etc., on the representation itself and/or near the representation) without requiring the user interact with representation 308 and/or without regard to whether the user is interacting with representation 308 and/or how the user is interacting with representation 308.

In some embodiments, product station 306 can include one or more representations of one or more features associated with the respective smartphone model (e.g., the product on display) for which more information is available. In FIG. 3A, product station 306 includes representations 310-1 to 310-4 corresponding to Feature 1 to Feature 4 of the respective smartphone model. Any number of features can be displayed on product station 306 (e.g., based on the desire and design of the retailer) or no features can be displayed on product station 306. In some embodiments, representations 310-1 to 310-4 can be hidden until the user performs a trigger to cause representations 310-1 to 310-4 to be displayed. In some embodiments, the trigger can include the user approaching product station 306 (e.g., approaching to within 2 feet, 3 feet, 4 feet, etc.), the user looking at product station 306, and/or the user reaching one or more hands towards product station 306 (e.g., reaching to within 1 inch, 6 inches, 1 foot, 2 feet, etc. of product station 306). Hiding representations 310-1 to 310-4 can provide a simple and clean product display when the user has not indicated an interest in the product. For example, table 304 can include a plurality of product stations, each of which is associated with a different product model or a different product type and when the user approaches a respective product station and/or interacts with a respective product station, the representations of features can appear and provide the user with information only when desired. In some embodiments, representations 310-1 to 310-4 are always displayed, regardless of whether the user has approached product station 306 or is interacting with product station 306.

In some embodiments, representations 310-1 to 310-4 are two-dimensional or three-dimensional virtual objects and can be icons, graphics, images, or any other object corresponding to its respective feature. For example, the representation for a camera feature can be a three-dimensional model of a camera, the representation for a processor can be a three-dimensional model of an integrated circuit, the representation for a cellular technology can be a three-dimensional antenna, etc. Similar to representation 308, representations 310-1 to 310-4 can be floating above product station 306, or can be placed on product station 306, etc. In some embodiments, representations 310-1 to 310-4 can be displayed as if they are lying flat on product station 306 and upon detecting that the user has approached product station 306 (e.g., approached to within a threshold distance, such as 1 foot, 2 feet, 3 feet, etc.), upon detecting that the gaze of the user is directed to product station 306 (e.g., the one or more eye tracking sensors of the electronic device detect that the user is looking at or near product station 306), and/or upon detecting that one or more hands of the user has reached out towards product station 306, representations 310-1 to 310-4 can appear to stand upright (e.g., animate from a lying-down position to an upright position, optionally floating in air above product station 306). In some embodiments, animating representations 310-1 to 310-4 when the user shows an interest in product station 306 can catch the user's attention, indicating to the user that one or more featured features exist and that the user can interact with the representations to learn more about the features.

As shown in FIG. 3A, representations 310-1 to 310-4 can be accompanied with a feature description and/or feature name. In some embodiments, the feature description and/or feature name is a three-dimensional object that behaves in a manner similar to representations 310-1 to 310-4. In some embodiments, representations 310-1 to 310-4 are placed at a location on product station 306 in front of representation 308 (e.g., at a shallower depth and/or closer to the user than representation 308).

In some embodiments, representations 310-1 to 310-4 are interactable and/or selectable to display more information about the respective feature. For example, in FIG. 3B, the electronic device detects a selection input being performed by hand 301 of the user directed to representation 310-4 corresponding to Feature 4. In some embodiments, the selection input is a pinch gesture by two or more fingers of hand 301 at a location associated with representation 310-4 (e.g., reaching out and pinching representation 310-4 itself), a pinch gesture while the gaze of the user is directed to representation 310-4 (e.g., looking at representation 310-4), a tapping or pointing gesture performed by a finger of hand 301 directed to representation 310-4 (e.g., tapping on representation 310-4, or tapping and/or pointing while the gaze of the user is directed to representation 310-4). In some embodiments, other types of selection inputs are possible.

Figure 3B:
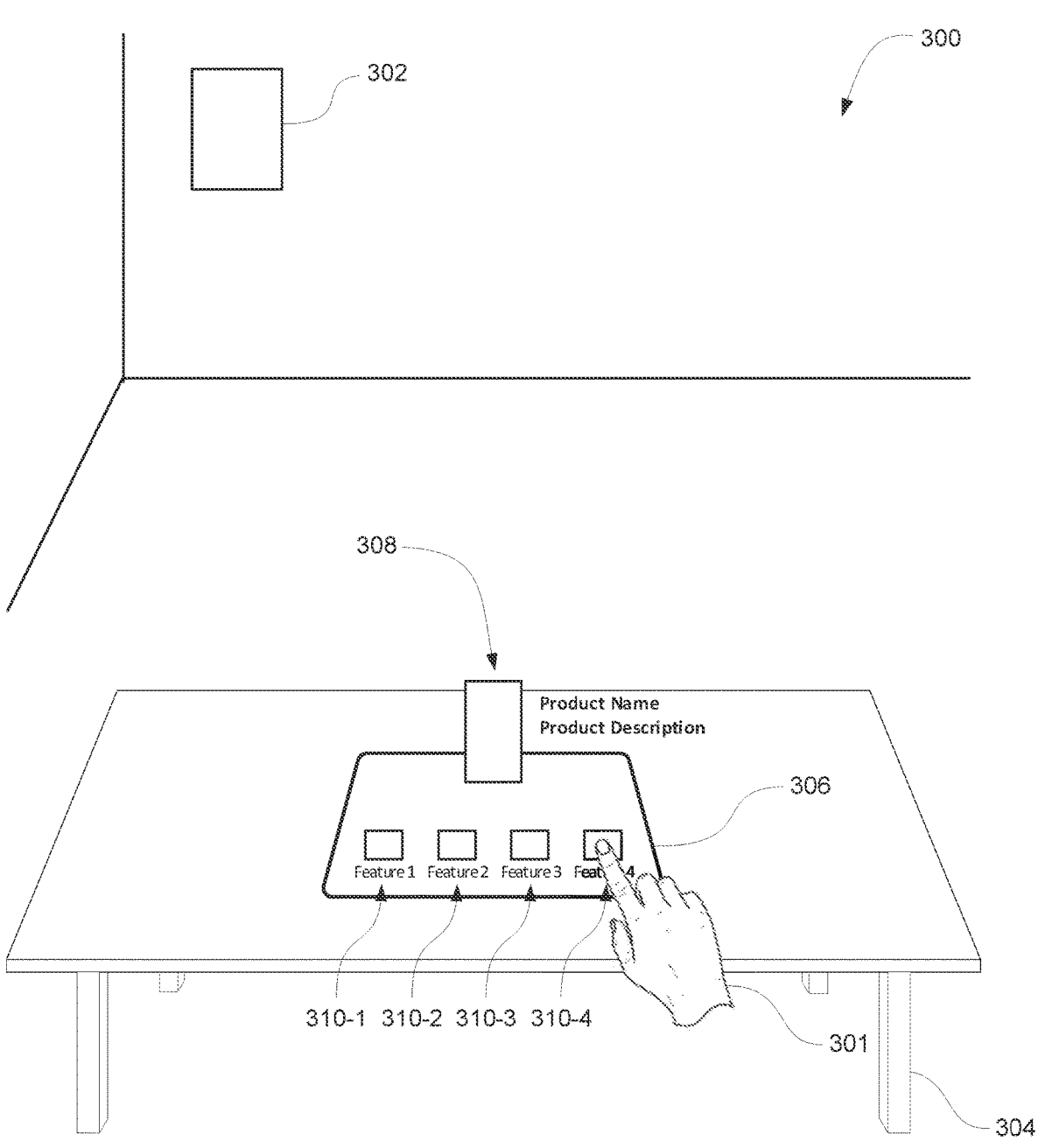
Figure 3C:
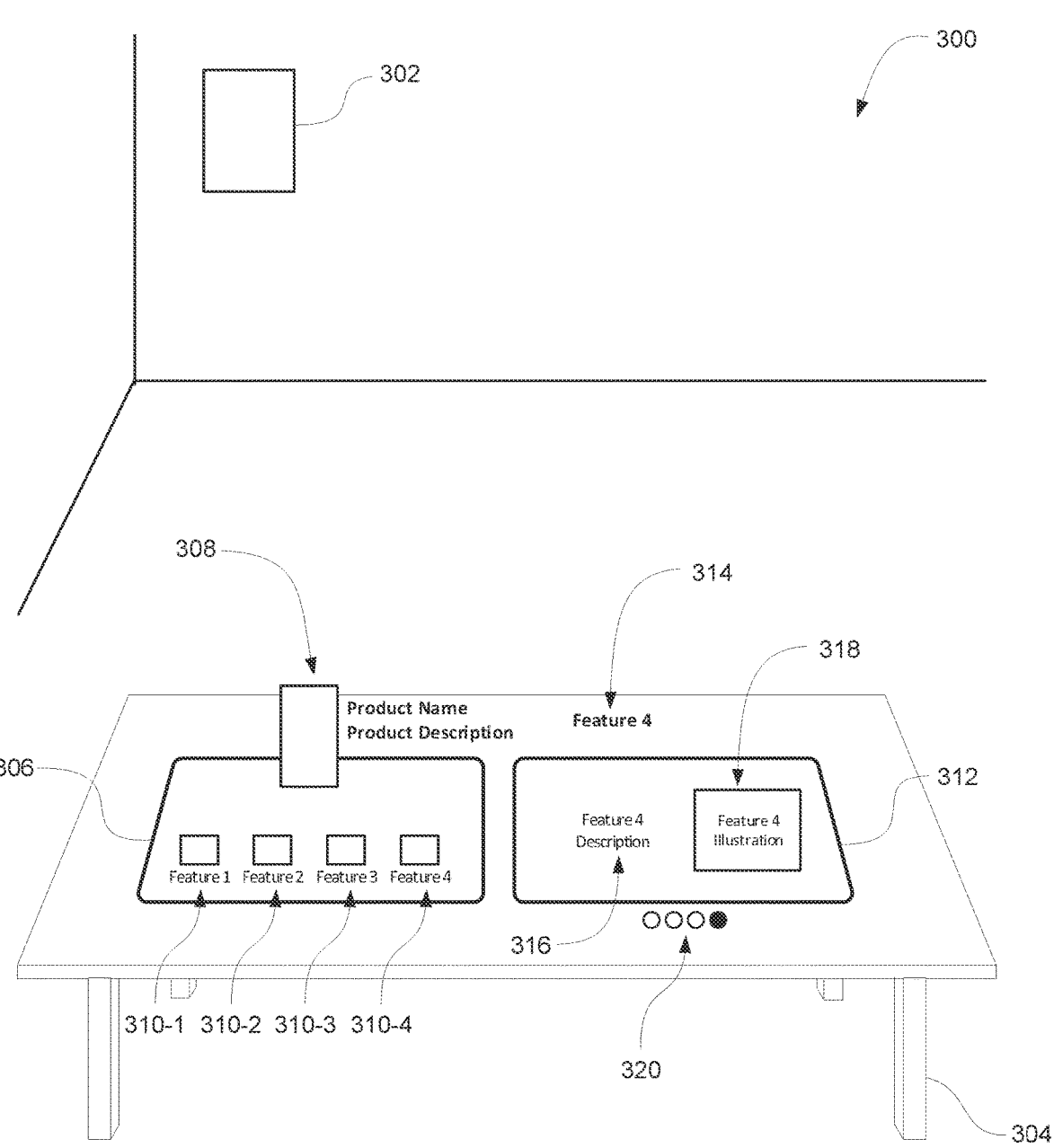

In some embodiments, in response to detecting a selection input directed to representation 310-4, three-dimensional environment 300 is updated to include feature station 312 concurrently with and/or adjacent to product station 306 on table 304, as shown in FIG. 3C. In some embodiments, product station 306 shifts to provide space for feature station 312. For example, in FIG. 3C, product station 306 moved leftwards and feature station 312 is displayed at a location that was at previously partially occupied by product station 306. In some embodiments, the center of product station 306 and feature station 312 is the same as the center of product station 306 before it moved leftwards. Similar to product station 306, feature station 312 can be a three-dimensional object similar to a placemat (e.g., a flat, planar surface), upon which one or more virtual objects can be placed. In some embodiments, feature station 312 has the same size and/or shape as product station 306.

In some embodiments, feature station 312 displays information about the respective selected feature from product station 306. For example, in FIG. 3C, feature station 312 displays information about Feature 4. In some embodiments, feature station 312 includes title 314 of the feature being displayed and/or demonstrated on product station 306. In some embodiments, title 314 is a two-dimensional or a three-dimensional text object that is displayed floating above feature station 312 (e.g., floating above the back portion of feature station 312, floating above a corner of feature station 312, floating above the center of feature station 312, etc.). In some embodiments, title 314 is displayed on the surface of feature station 312 (e.g., the back portion of feature station 312, a corner of feature station 312, the center of feature station 312, etc.).

In some embodiments, feature station 312 includes feature description 316. In some embodiments, feature description 316 includes a textual description of Feature 4. In some embodiments, feature description 316 is scrollable to reveal more text. In some embodiments, feature description 316 is a two-dimensional text that is displayed on the surface of feature station 312. In some embodiments, feature description 316 can be displayed floating above feature station 312 (e.g., to give it a three-dimensional effect). In some embodiments, feature description 316 can include one or more affordances to display even more information about the respective feature. For example, selecting an affordance to display more information can cause the display of a browser application navigated to a webpage with comprehensive information about Feature 4, cause feature description 316 to update and display additional information, cause display of another station, such as feature station 312 (e.g., optionally adjacent to feature station 312), with additional information, etc.

In some embodiments, feature station 312 includes feature illustration 318. In some embodiments, feature illustration 318 is an image, a video, an animation, or any other suitable graphic demonstrating and/or representing Feature 4. In some embodiments, feature illustration 318 can be a two-dimensional graphic located on the surface of feature station 312. In some embodiments, feature illustration 318 can be a three-dimensional graphic that extends outwards (e.g., upwards) from feature station 312. For example, if Feature 4 corresponds to the camera system for the respective smartphone model, feature illustration 318 can be an expanded view (e.g., exploded view) of the components of the camera system, optionally with callouts that describe the respective components. In some embodiments, feature illustration 318 can be animated expanding or collapsing the components of the camera system. In some embodiments, because feature illustration 318 is a three-dimensional object (e.g., in some embodiments), the user is able to walk around feature station 312 and view feature illustration 318 from different perspectives. It is understood that feature station 312 can include any type and any number of virtual elements, laid out in any manner, and this disclosure is not limited to the embodiment illustrated in FIG. 3A.

In some embodiments, feature station 312 includes an indication 320 of the number of "pages" that can be displayed by feature station 312. For example, in FIG. 3C, indication 320 includes four dots that indicate the four features shown on product station 306 (e.g., corresponding to representations 310-1 to 310-4). In some embodiments, the first three dots correspond to Features 1, 2, and 3 and are hollow to indicate that feature station 312 is not displaying information for Features 1, 2, 3. The fourth dot corresponding to Feature 4 can be solid (e.g., filled) to indicate that feature station 312 is displaying information about Feature 4. Thus, based on the user's selection amongst representation 310-1 to 310-4, feature station 312 provides information about the respective selected feature. For example, in FIG. 3D, feature station 312 is displaying information associated with Feature 3 (e.g., corresponding to representation 310-3). In some embodiments, feature station 312 can have the same or similar style or type of displayed elements for Feature 3 as for Feature 4 (e.g., but with different content). In some embodiments, feature station 312 can have a different layout and/or different elements for Feature 3 than for Feature 4.

In some embodiments, a user is able to interact with feature station 312 to cause a different feature to be displayed by feature station 312. For example, a user is optionally able to select a respective indicator from indicator 320 to cause the respective feature to be displayed by feature station 312. For example, in response to a selection of the first indicator from indicator 320, feature station 312 can be updated to display information about Feature 1. Additionally or alternatively, a user can swipe left or right on feature station 312 to cause display of the next or previous feature, respectively. Additionally or alternatively, the titles for the next or previous features (e.g., similar to title 314) can be displayed in three-dimensional environment 300 to the right or left of title 314 (optionally greyed out, darkened, or otherwise visually de-emphasized as compared to title 314), which are selectable to cause feature station 312 to navigate to the next or previous feature, respectively.

Figure 3D:
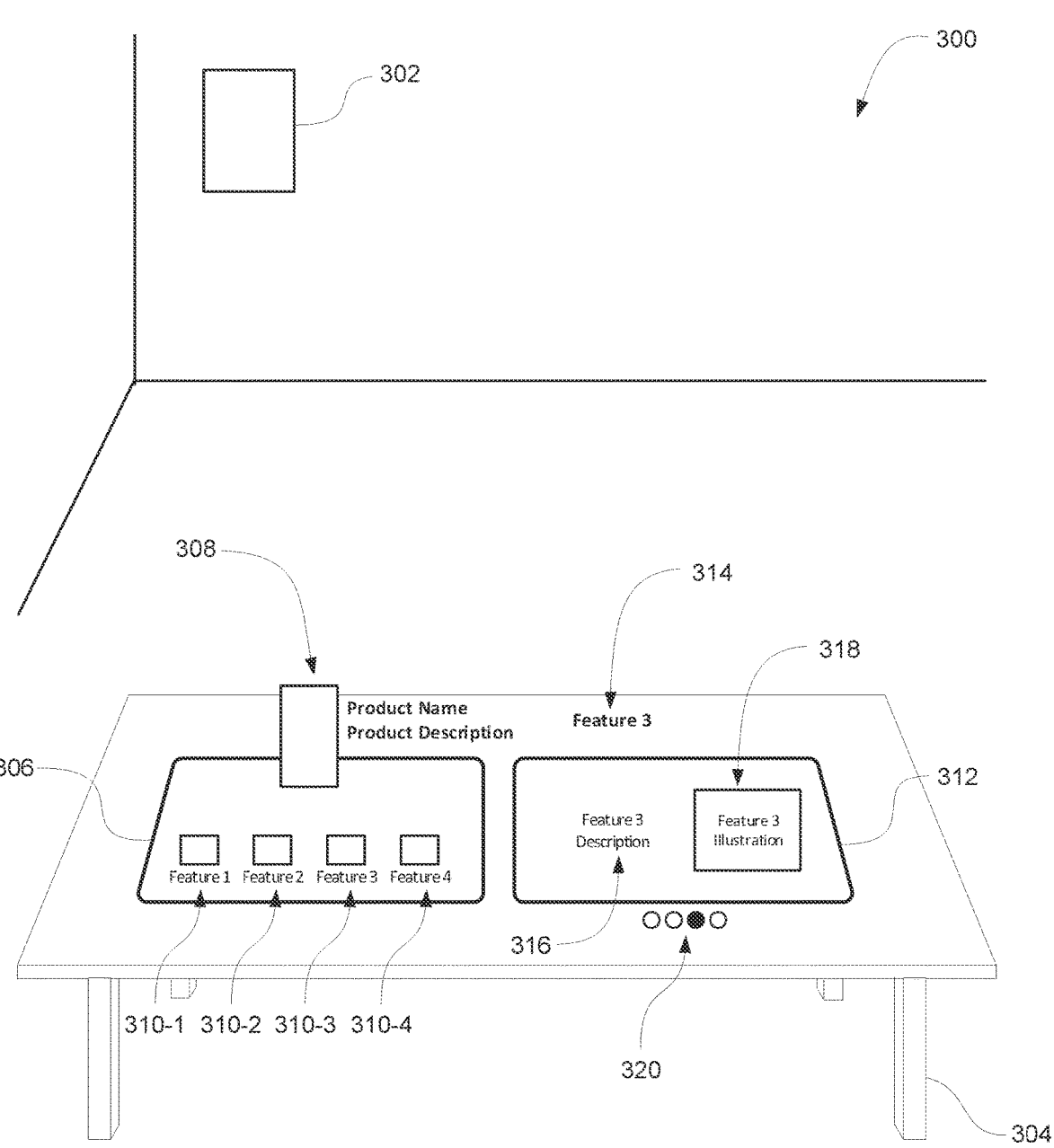

In some embodiments, for each product station, a maximum of one feature station can be displayed, as shown in FIGS. 3C and 3D. Displaying information for another feature (e.g., selecting from representations 310-1 to 310-4) causes the existing feature station to replace the currently displayed feature with the selected feature (or if a feature station is not currently displayed, a feature station is displayed with information for the selected feature). In some embodiments, multiple feature stations can be displayed. For example, in response to selecting representation 310-1 and representation 310-2, three-dimensional environment 300 can include two feature stations corresponding to Feature 1 and Feature 2, respectively. In some embodiments, whether one or multiple features are displayed and/or how many feature stations can be displayed is based on the size of the surface on which the stations are displayed. For example, in FIG. 3D, the surface of table 304 can accommodate two stations. Thus, in FIG. 3D, only one feature station can be displayed at any one time. If, on the other hand, the surface of table 304 can accommodate five stations, then three-dimensional environment 300 can optionally display product station 306 and up to four feature stations. In some embodiments, feature station 312 can include an exit affordance that is selectable to close feature station 312. In response to selecting the exit affordance, feature station 312 can be removed from display and product station 306 can be moved back to its original position, such as in FIG. 3A.

In addition, in some embodiments, the size, type, etc. of product station 306 and feature station(s) 312 and the visual content associated with those stations can based on available space on the surface on which the stations are displayed. In some embodiments, the available space is not limited to a horizontal surface such as on table 304, but alternatively or additionally includes surfaces such as a flat or curved 2D window (not shown) that can be displayed behind the table, or a wall or other vertical surface in three-dimensional environment 300. In other embodiments, product station 306 and feature station(s) 312 can float in three-dimensional environment 300. Product station 306 can be moved to these surfaces or areas of three-dimensional environment 300 by detecting user input such as a pinch or other selection gesture at the product station, followed by movement of that gesture to another surface or location, which can trigger a relocation of the selected product station and any associated feature station(s) to the new surface or location. These larger surfaces or locations can enable a user to browse products while standing up, or at least without having to look down at a flat surface in three-dimensional environment. With these larger surfaces or locations, the user can move closer to the stations in three-dimensional environment 300 to see representations of products, features and other content in greater detail, for example. In embodiments for which representations of products, features and/or content are floating in front of a larger surface, the user can move off to one side and see the representations of products, features and/or content from a perspective or side view.

In some embodiments, while feature station 312 is displaying information about a respective feature of the respective smartphone model, representation 308 can react accordingly. For example, while feature station 312 is displaying information about Feature 4, such as in FIG. 3C, representation 308 can display, on its display, an image, a video, a tutorial, a trailer, etc., about Feature 4. In some embodiments, representation 308 can display an application associated with the feature. For example, if Feature 4 is the camera system of the respective smartphone, representation 308 can be updated to display, on its display, a representation of a camera application. In some embodiments, the representation of the camera application can be reactive to three-dimensional environment 300. For example, the viewfinder portion of the camera application can display a view of three-dimensional environment 300 as if the back-facing camera of the smartphone is actually capturing a portion of three-dimensional environment 300. In some embodiments, the user is able to interact with the camera application and/or representation 308 in a manner similar to a physical smartphone, as will be described in further detail below. Thus, in some embodiments, representation 308 is a functional model of the respective smartphone, including the ability to perform one or more functions associated with the provided features similar to the physical smartphone device of which it is a representation.

FIGS. 4A-4C illustrate a method of interacting with a virtual product display according to some embodiments of the disclosure. FIG. 4A illustrates three-dimensional environment 400 that includes elements similar to those described above with respect to three-dimensional environment 300 in FIGS. 3A-3D, the details of which are not repeated here.

In FIG. 4A, the electronic device detects hand 401 picking up representation 408. In some embodiments, detecting that hand 401 picked up representation 408 includes detecting that hand 401 has reached out to the location in the physical environment that corresponds to the location of representation 408 in three-dimensional environment 400 and detecting that hand 401 has gripped representation 408 (e.g., detecting that hand 401 has assumed a "gripping" or "grabbing" pose around representation 408). In some embodiments, the user need not reach out to the location of representation 408 and can perform a gripping or grabbing gesture with hand 401 while the gaze of the user is directed at representation 408 (e.g., an "indirect" manipulation) and the device additionally or alternatively interprets the gesture as a request to pick up representation 408 and optionally snaps representation 408 to the location of hand 401.

As described above, representation 408 is a representation of a product, such as a respective smartphone model, that is interactable by the user. In some embodiments, a user is able to interact with representation 408 as if it were a physical product in the real-world environment. For example, the user can pick up representation 408, move representation 408, and/or rotate representation 408. In some embodiments, the user is able to interact with representation 408 to cause the virtual product to perform one or more functions in a similar manner as if the user were causing physical product to perform the same functions. For example, a user is able to interact with a camera application on representation 408, for example, to take pictures of three-dimensional environment 400 in the same manner as a user taking pictures with the smartphone in the physical world.

In FIG. 4B, the electronic device detects that hand 401 has brought representation 408 closer to the user and/or up to a "ready" or "inspection" position. For example, hand 401 has retracted back toward the body of the user while maintaining the gripping or grabbing gesture. In some embodiments, in response to detecting the movement of hand 401, representation 408 moves in accordance with the movement of hand 401, such as to maintain representation 408 within the hold of hand 401. In some embodiments, the electronic device detects that the user is inspecting representation 408 and in response, representation 408 enters into an interactive demonstration mode (e.g., as opposed to passive demonstration mode in FIGS. 3A-3D).

In some embodiments, while representation 408 is in an interactive demonstration mode, different content can be displayed at, on, and/or around representation 408 in response to the user's interaction with representation 408, product station 406, and/or feature station 412. For example, in FIG. 4B, in accordance with a determination that representation 408 has been brought closer to the user in a ready position (e.g., an upward position, such that hand 401 is at a 20 degree upward angle, 30 degree upward angle, 60 degree upward angle, etc., and/or hand 401 is within 6 inches, 1 foot, 2 feet, etc. from the face of the user), promotional content 422 is displayed in three-dimensional environment 400 at or near representation 408. In some embodiments, promotional content 422 is a graphic and/or textual description that is displayed adjacent to representation 408. In some embodiments, promotional content 422 provides information about the product, promotes the product, and/or provides instructions about how to interact with representation 408 in the interactive demonstration mode.

In some embodiments, promotional content 422 is attached to and/or orientation locked with representation 408. For example, if representation 408 is held perpendicularly to the user, then promotional content 422 is displayed next to representation 408 and is oriented perpendicularly to the user (e.g., parallel to representation 408), but if representation 408 is rotated to face 30 degrees to the right, promotional content 422 rotates about representation 408 to face 30 degrees to the right (e.g., representation 408 is the vertex of the rotation). Similarly, if representation 408 is moved to the left or right, promotional content 422 moves to the left or right, respectively, in accordance with the movement of representation 408 to maintain its position relative to representation 408. In some embodiments, promotional content 422 is not orientation locked with representation 408 and does not rotate with the rotation of representation 408 (e.g., promotional content 422 remains proportional to the user, without regard to the orientation of representation 408) but optionally moves with representation 408.

In some embodiments, while representation 408 is in an interactive demonstration mode, content associated with the feature for which additional information is being provided on feature station 412 can be displayed at, on, and/or around representation 408. For example, in FIG. 4C, hand 401 has rotated such that representation 408 has rotated to a particular angle. In some embodiments, in accordance with a determination that the orientation of representation 408 falls within a predetermined range based on the feature being demonstrated (e.g., Feature 4, in the case of FIG. 4C), one or more feature elements 424 and feature information 426 can be displayed at or around representation 408. For example, in FIG. 4C, if Feature 4 demonstrates the camera system of the respective smartphone model, feature elements 424 can be an exploded view of the mechanical components of the camera system (e.g., similarly to what is displayed by feature illustration 418) extending outwards from representation 408. In some embodiments, the angles at which feature elements 424 are displayed can be based on the angles at which more than a threshold amount of feature elements 424 are viewable if displayed (e.g., 50% of the elements are viewable by the user, 75%, 90%, etc.) and/or the angles at which certain portions of representation 408 is viewable. For example, in FIG. 4C, representation 408 is being held at a 30 degree rightwards angle such that the user is able to see virtual elements extending outwards from the back of representation 408. Thus, in response, feature elements 424 are displayed extending outwards from representation 408 (e.g., outwards from the back and/or outwards from the front). In some embodiments, an animation can be displayed showing feature elements 424 expanding outwards from representation 408. In some embodiments, feature elements 424 can be displayed on any side of representation 408. As an example, if the respective smartphone model has a camera system on both the back and front sides of representation 408, then feature elements 424 can be an exploded view of the components of the camera systems and feature elements 424 can be displayed on both sides of representation 408 (e.g., corresponding to the front-facing and back-facing cameras), demonstrating the features of the front-side camera system and back-side camera system.

In some embodiments, feature elements 424 include one or more callouts describing the feature elements that are displayed on representation 408. In some embodiments, feature elements 424 can include one or more affordances that the user can interact with, for example, to cause display of more feature elements and/or to cause presentation of more information (e.g., audio or visual).

In some embodiments, feature information 426 can include graphical or textual information describing the respective feature. Similar to promotional content 422, feature information 426 can be attached to representation 408 and/or orientation locked.

In some embodiments, an application can be displayed on the display of representation 408, for example, to demonstrate a respective feature. For example, when demonstrating the camera of a smartphone device, the portion of representation 408 that corresponds to the display of the smartphone device can display a user interface of a camera application. In some embodiments, the user interface for the camera application can include a live view of a portion of three-dimensional environment 400 as if the camera of the virtual smartphone device is capturing images of portions of three-dimensional environment 400 (e.g., a viewfinder). For example, if the user moves and/or representation 408, the user interface of the camera application can update accordingly to reflect the portions of three-dimensional environment 400 that are being "captured" by the camera of the virtual smartphone device as the device moves and/or rotates.

In some embodiments, when representation 408 is rotated such that the orientation of representation 408 is outside of the predetermined range, feature elements 424 and/or feature description 426 ceases to be displayed. In some embodiments, feature elements 424 are animated to retract back into representation 408.

It is understood that although FIG. 4C illustrates the display of feature elements 424 and feature description 426 at or near representation 408, different types of visual elements can be displayed for different features. For example, certain features can be demonstrated with an expanded view of mechanical components such as in FIG. 4C, while other features can be demonstrated by highlighting portions of representation 408 or displaying content on the display of representation 408. Thus, any type or method of visually demonstrating a feature is possible.

In some embodiments, while hand 401 is holding representation 408, a second hand can interact with feature station 412 to change the feature being displayed. In such embodiments, if feature station 412 changes to display a different feature, then representation 408 can be updated to display a different set of feature elements and/or descriptions in accordance with the feature now being displayed on feature station 412. For example, if the user performs a swipe on feature station 412 such that feature station 412 is displaying information about the processor of the respective smartphone, then feature elements 424 can transform into elements associated with the processor. In some embodiments, representation 408 itself can change visual characteristics, such as to become partially transparent to reveal the processor inside of representation 408, optionally with a callout.

Similarly, while hand 401 is holding representation 408, a user is able to perform customizations of the one or more aspects of the product and representation 408 can be updated to reflect the selections (e.g., while remaining held by hand 401). For example, if the user selects a respective affordance to change the screen size and/or color of the product, representation 408 changes to reflect the selected screen size and/or color, respectively.

Although FIG. 4C illustrates hand 401 holding representation 408 and moving and/or rotating representation 408 in three-dimensional environment 400, the user can use a second hand (e.g., the user's right hand) to also interact with representation 408. For example, a user can use a second hand to pick up representation 408 and move and rotate representation 408. In such embodiments, representation 408 can respond to the movement and/or rotation from the second hand in a manner similar to movements and/or rotations when representation 408 is held by hand 401 (e.g., representation 408 remains in interactive demonstration mode while the second hand is holding it, such as to display feature elements 424).

In some embodiments, representation 408 can display information about features of the product (e.g., as virtual elements, as changes in the visual characteristic of the representation, as descriptions, etc.), without regard to the feature that is being displayed by feature station 412. For example, as the user rotates representation 408, different elements can be displayed on, around, or near representation 408, describing different features of the product (e.g., Feature 1, 2, 3, 4, and/or other features that are not among those that are available for feature station 412).

In some embodiments, if three-dimensional environment 400 is not displaying feature station 412 (e.g., the user has not caused feature station 412 to be displayed, such as in FIG. 3A), then representation 408 can display information about the respective product, which can be associated with a feature for which feature station 412 can display information or not associated with a feature for which feature station 412 can display information. In some embodiments, representation 408 can display a home screen user interface, a lock screen user interface, a screensaver, etc. Additionally or alternatively, if three-dimensional environment 400 is not displaying feature station 412, feature elements and/or descriptions (which can be associated with a feature for which feature station 412 can display information or can not be associated with a feature for which feature station 412 can display information) can be displayed at, near, or on representation 408.

Thus, while representation 408 is being held by hand 401 and representation 408 is in an interactive demonstration mode, one or more elements and/or descriptions (e.g., which are optionally associated with the feature being displayed in feature station 412) can be displayed at, around, on, or near representation 408 to provide information and/or demonstrations. In some embodiments, visual elements may appear when representation 408 is rotated to certain predetermined angles and/or rotated to reveal certain portions of representation 408.

In some embodiments, while hand 401 is holding representation 408, if hand 401 releases the gripping or grabbing gesture, then the device detects that the user is no longer inspecting representation 408 and in response, representation 408 exits interactive demonstration mode (e.g., optionally enters passive demonstration mode, such as in FIGS. 3A-3D) and is returned to its original position relative to product station 406 (e.g., optionally with an animation moving representation 408 back to its original position) and promotional content 422 ceases to be displayed. Additionally or alternatively, if the device detects that hand 401 has moved downwards away from the upright position (e.g., downwards to a 10 degree upright angle, 0 degree angle, a 20 degree downward angle, 45 degree downward angle, to the user's sides, etc.), then the device detects that the user is no longer inspecting representation 408 and in response, representation 408 exits interactive demonstration mode (e.g., optionally enters passive demonstration mode, such as in FIGS. 3A-3D) and is returned to its original position relative to product station 406 (e.g., optionally with an animation moving representation 408 back to its original position) and promotional content 422 ceases to be displayed.

As noted above, any or all of product station 406 and/or feature station(s) 412 described can be displayed on top of a horizontal surface (e.g., such as table 404 described above), attached to a vertical surface, or in space (e.g., unattached to any surfaces). For example, product station 406 and/or feature station 412 can be attached to a vertical wall such that a user is able to stand in front of a wall and product station 406 and/or feature station 412 are displayed as a vertical station (e.g., a vertical plane as opposed to a horizontal plane as described above in FIGS. 4A-4C), as if attached to the wall. In some embodiments, if the device does not detect a suitable horizontal surface (e.g., a coffee table, a dining table, an office desk, etc.), the device can search the physical environment around the user for vertical surface (e.g., a wall, a door, a refrigerator, a column, etc.) on which to display product station and/or feature station 412. In some embodiments, if the device does not detect a suitable horizontal and/or vertical surface, the device can display product station 406 and/or feature station 412 floating in space (e.g., spatially), unattached to a particular surface. In such embodiments, the objects displayed on product station 406 and/or feature station 412 optionally are not displayed on a "station" or "placemat" object, but rather are spatially separated (e.g., the objects of product station 406 are displayed in one area and the objects of feature station 412 are displayed in another area, separated by distance, optionally without visual boundaries or bounding boxes).

In some embodiments, the objects on product station 406 and/or feature station 412 can have positions and/or layouts based on the surface on which they are displayed. For example, when displayed on a horizontal surface, the objects can be laid out in a landscape orientation and appear as if they are placed on a placemat. However, when displayed on a vertical surface, the objects can be laid out in a portrait orientation (e.g., arranged up/down, as opposed to left/right). In some embodiments, when displayed in space, unattached to a particular surface, the objects can be arranged at different depths, such as a cloud or hologram.

Thus, in some embodiments, a user is able to view a product, interact with a product, and/or learn about the features of a product, regardless of the user's environment and/or the objects in the user's environment. In some embodiments, the electronic device is able to automatically adjust to the user's environment by changing the surface on which the product and/or features of the product are displayed. In some embodiments, a user is able to move the displays from one surface to another (e.g., or to space) by manipulating product station 406 and/or feature station 412. For example, a user can pinch on a portion of product station 406 and drag product station 406 to another surface (e.g., optionally product station 406 snaps to the new surface when it approaches within a threshold distance of the new surface, such as 3 inches, 6 inches, 12 inches, etc.). In some embodiments, a user can interact with a movement affordance, such as to pinch the movement affordance, to cause product station 406 and/or feature station 412 to be relocated to a new surface. In some embodiments, product station 406 and feature station 412 need not be on the same surface. For example, product station 406 can be displayed on top of a table in front of the user, while feature station 412 can be displayed in space next to the table. In some embodiments, a user is able to move product station 406 and/or feature station 412 without moving the other station. In some embodiments, moving one of product station 406 and/or feature station 412 causes the other station(s) to also be moved automatically (e.g., to the same surface and/or location in space).

Figure 5A:
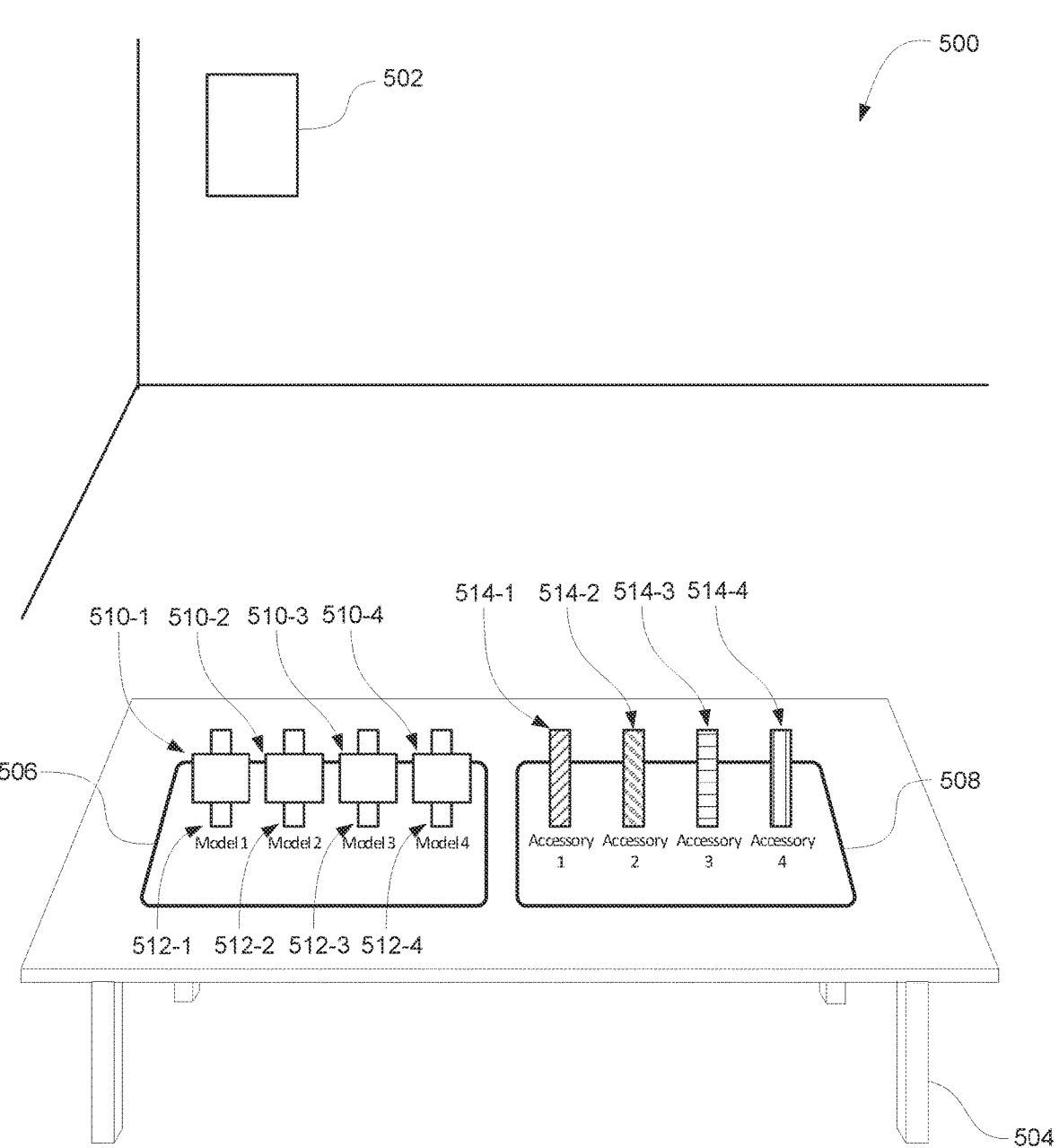
FIGS. 5A-5S illustrate a method of customizing and previewing a virtual product according to some embodiments of the disclosure.
Figure 5B:
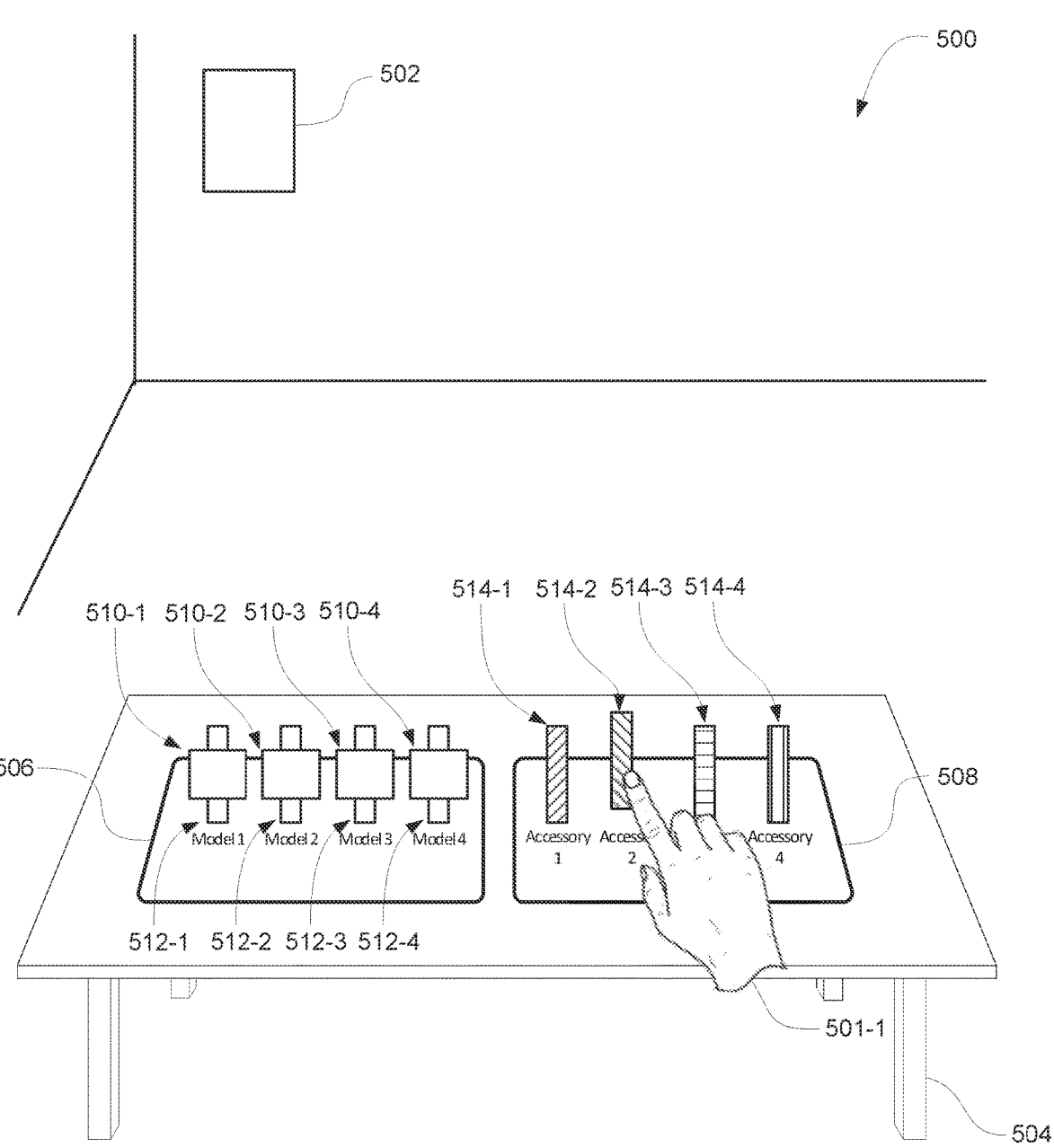
Figure 5C:
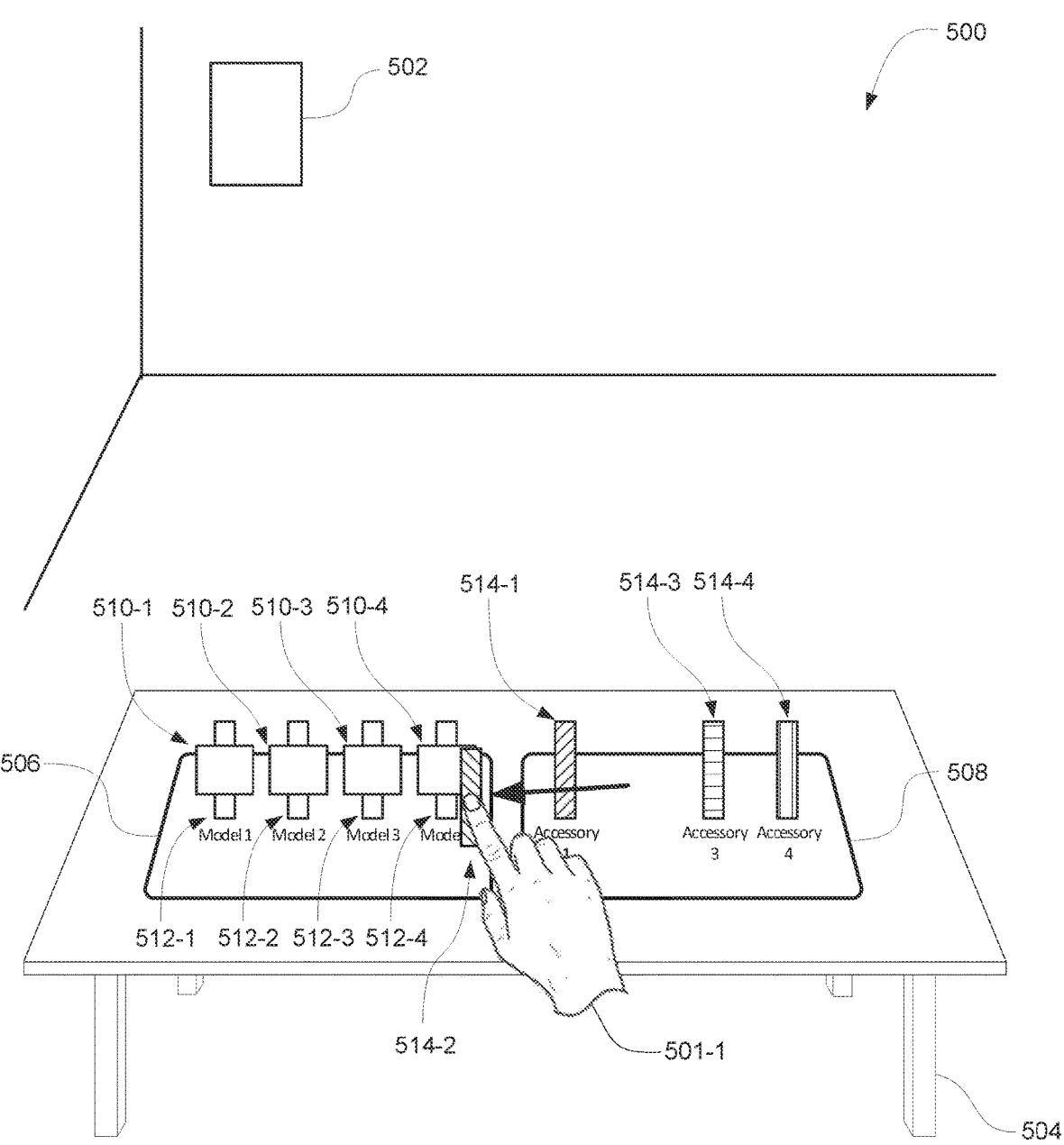
Figure 5D:
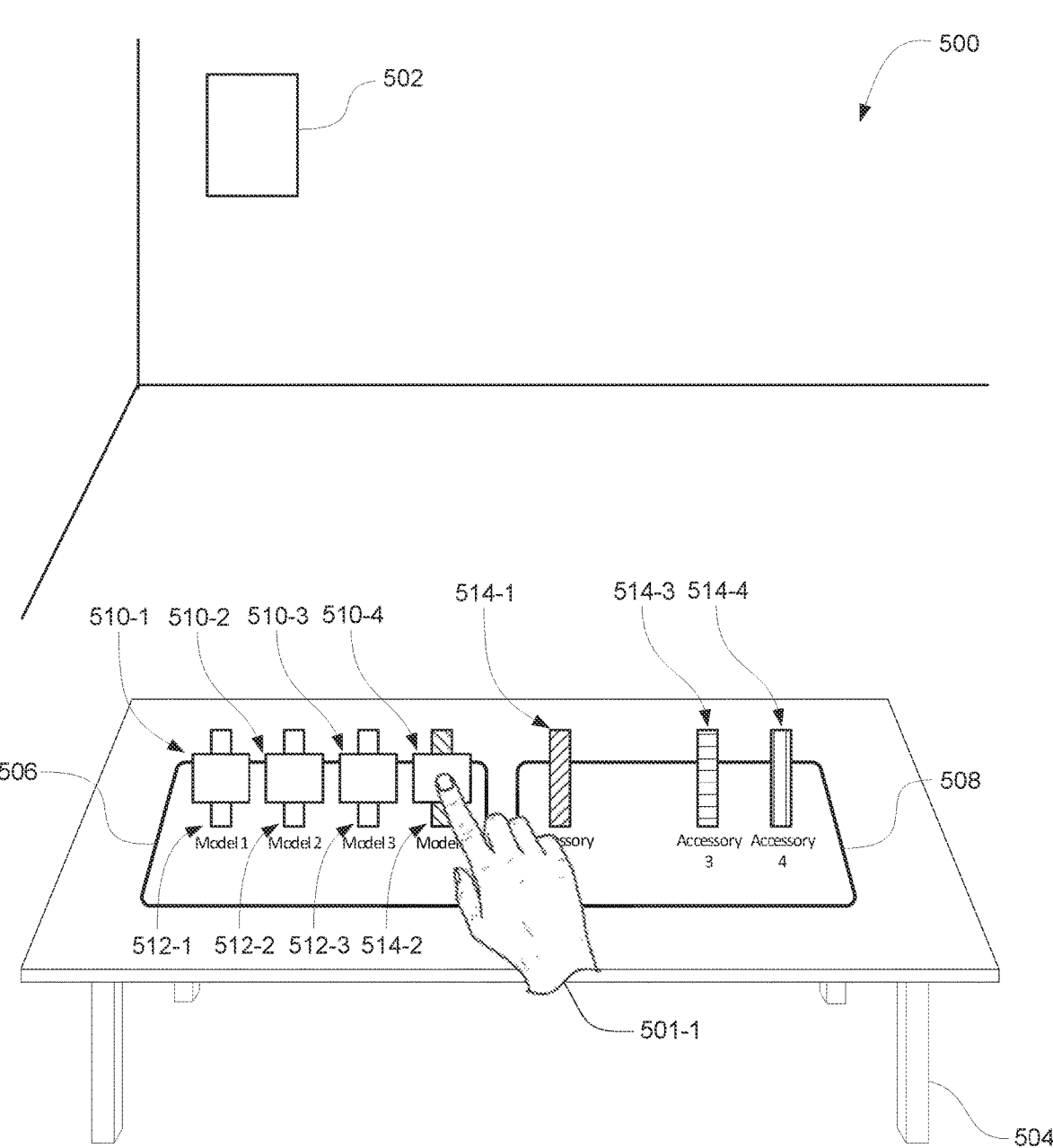
Figure 5E:
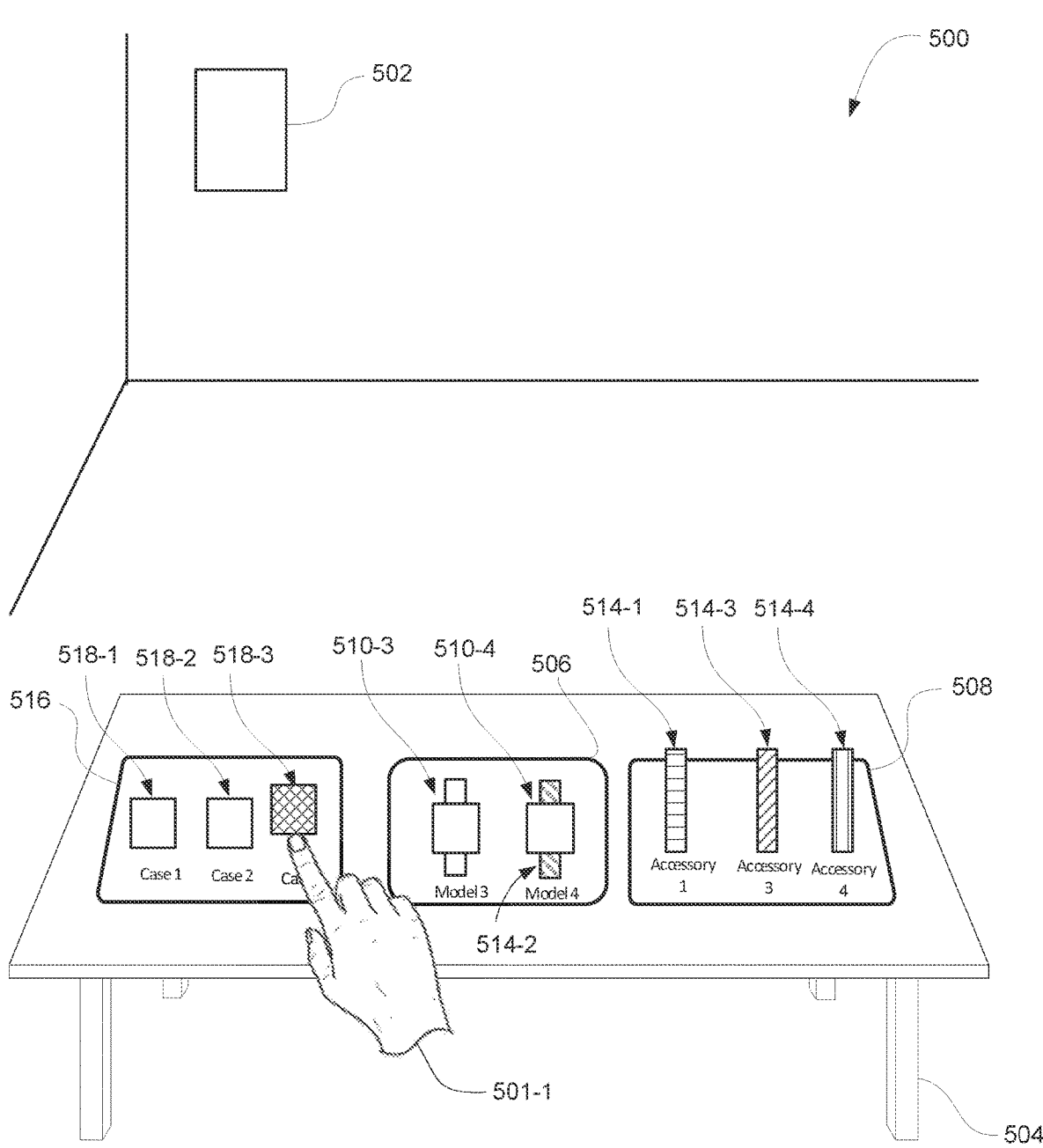
Figure 5F:
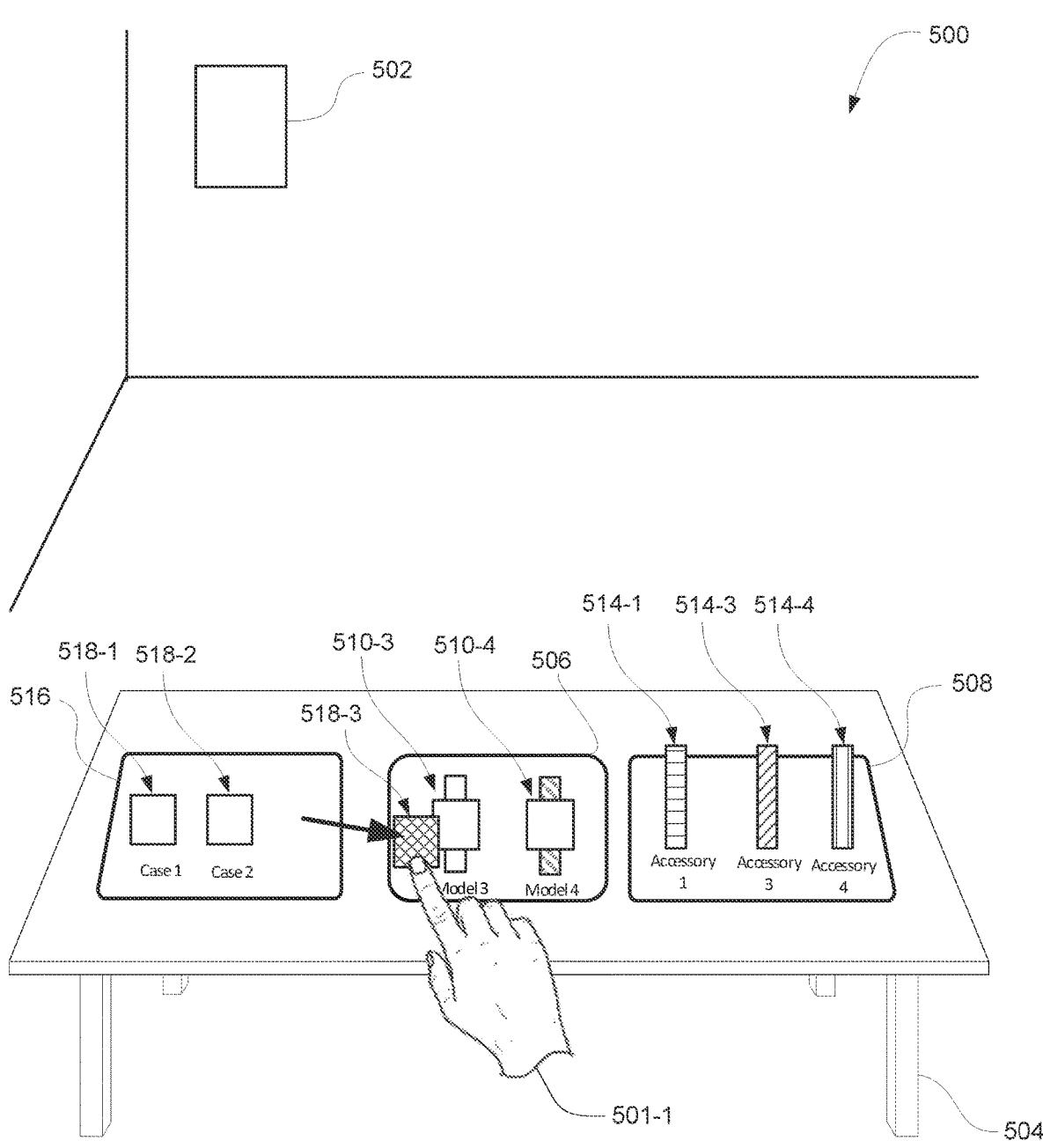
Figure 5G:
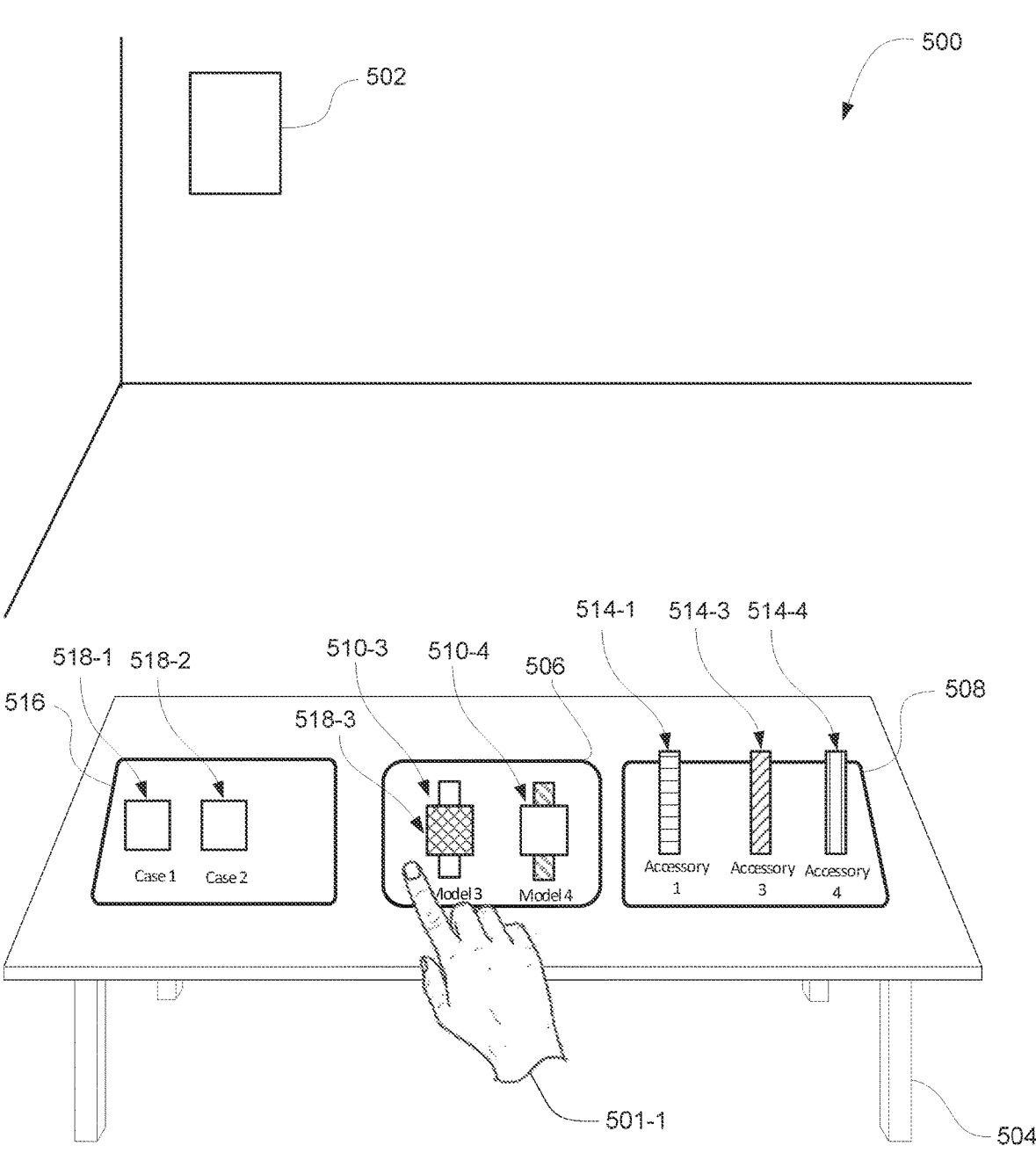
Figure 5H:
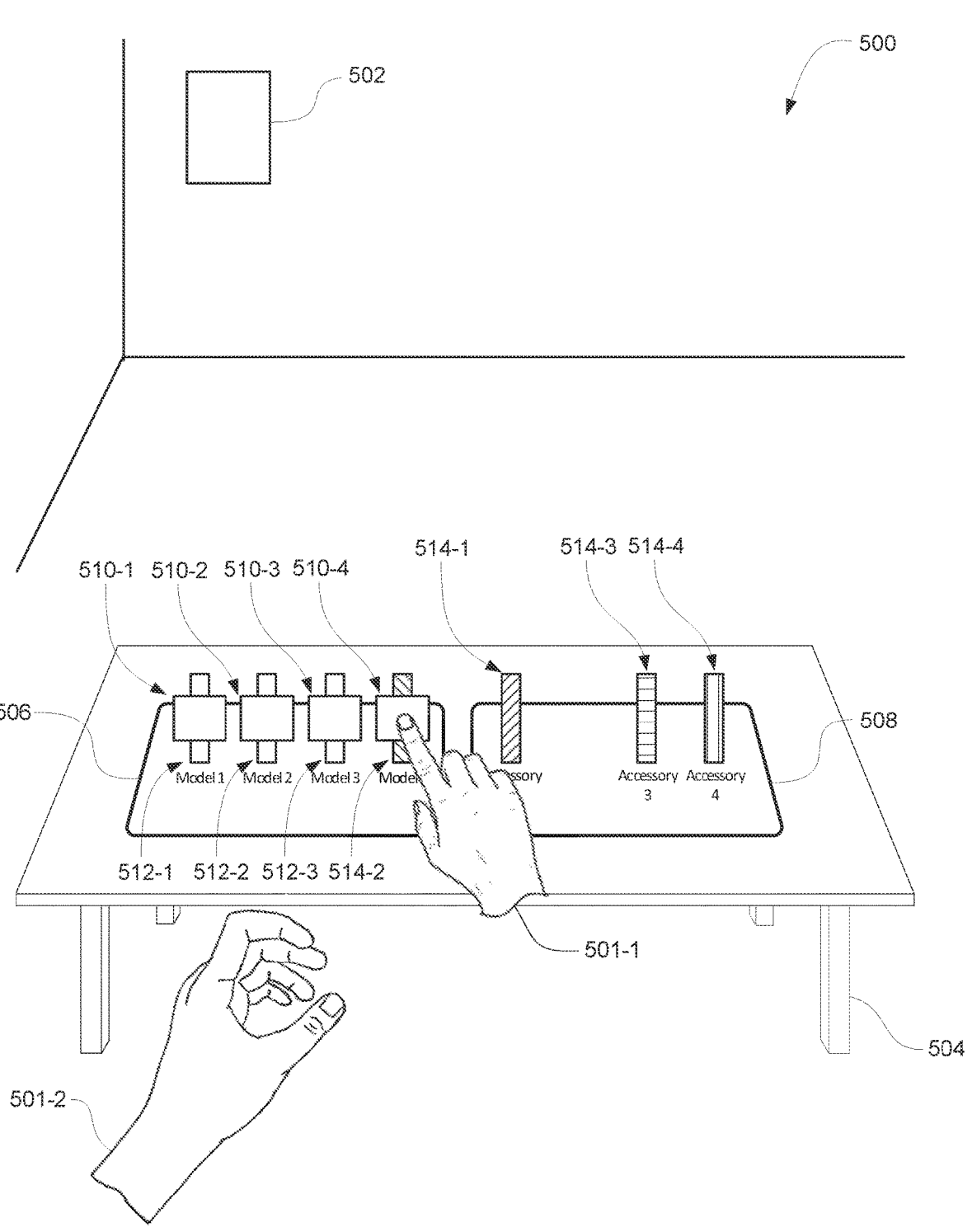
Figure 5I:
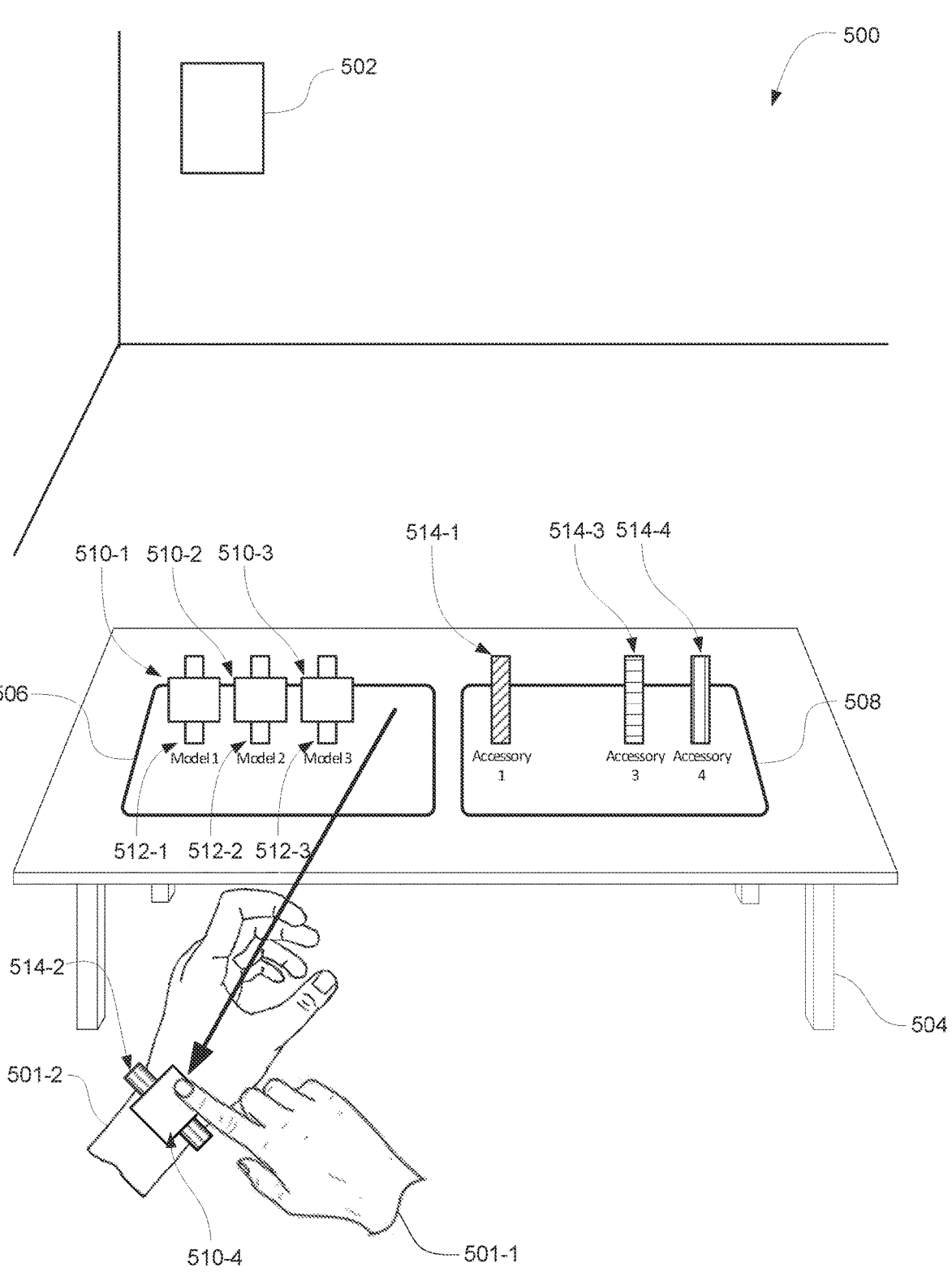
Figure 5J:
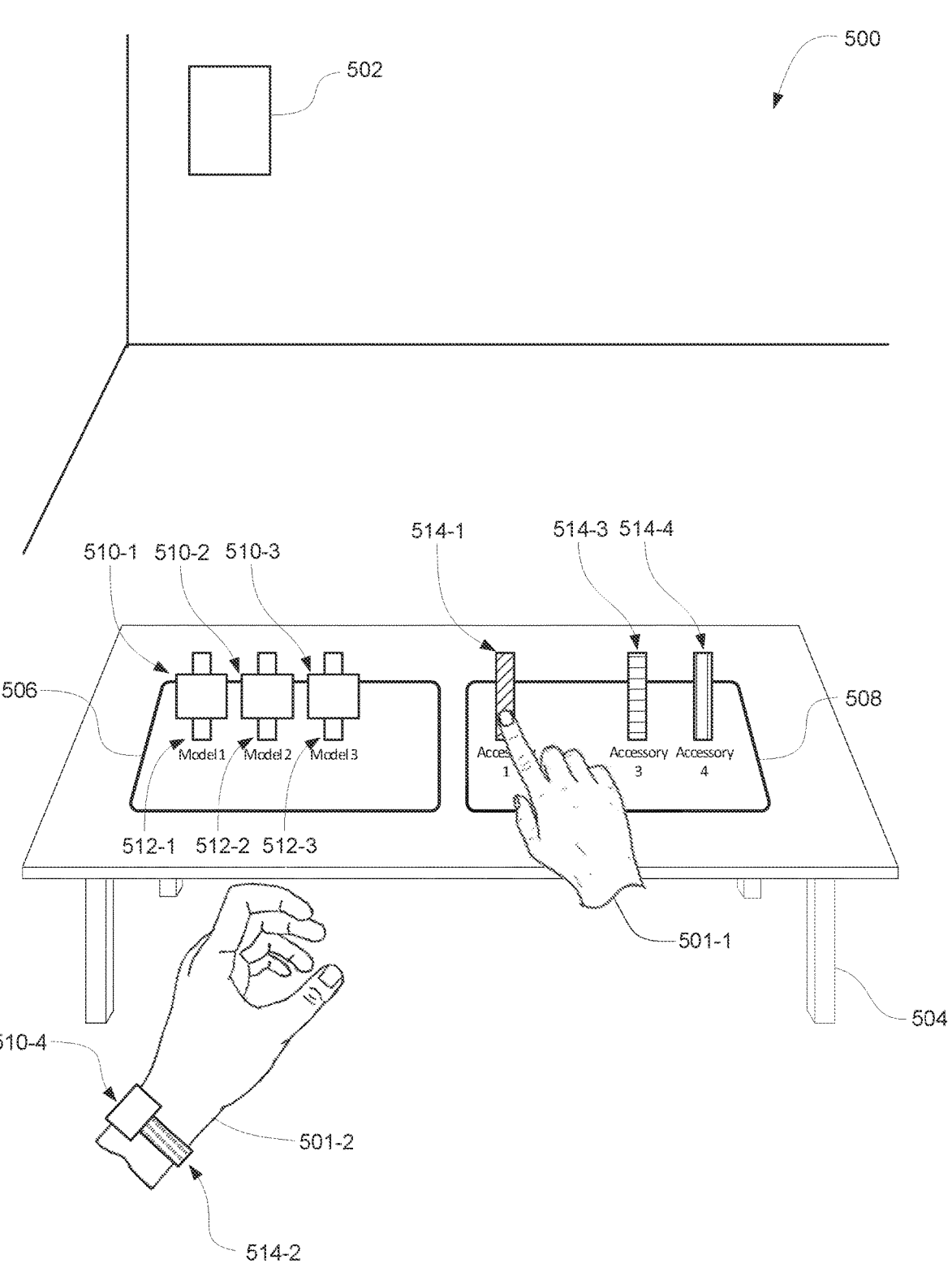
Figure 5K:
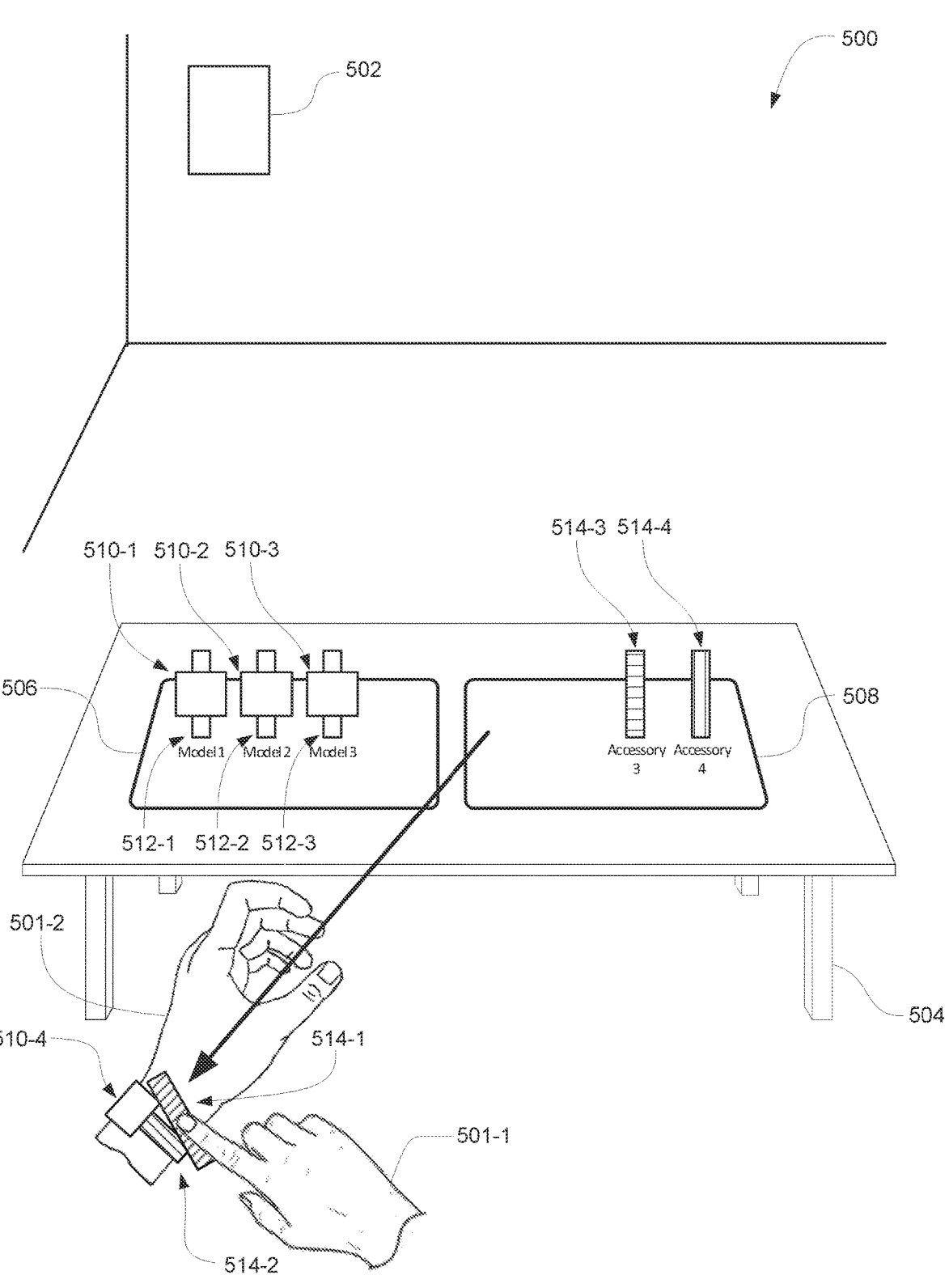
Figure 5L:
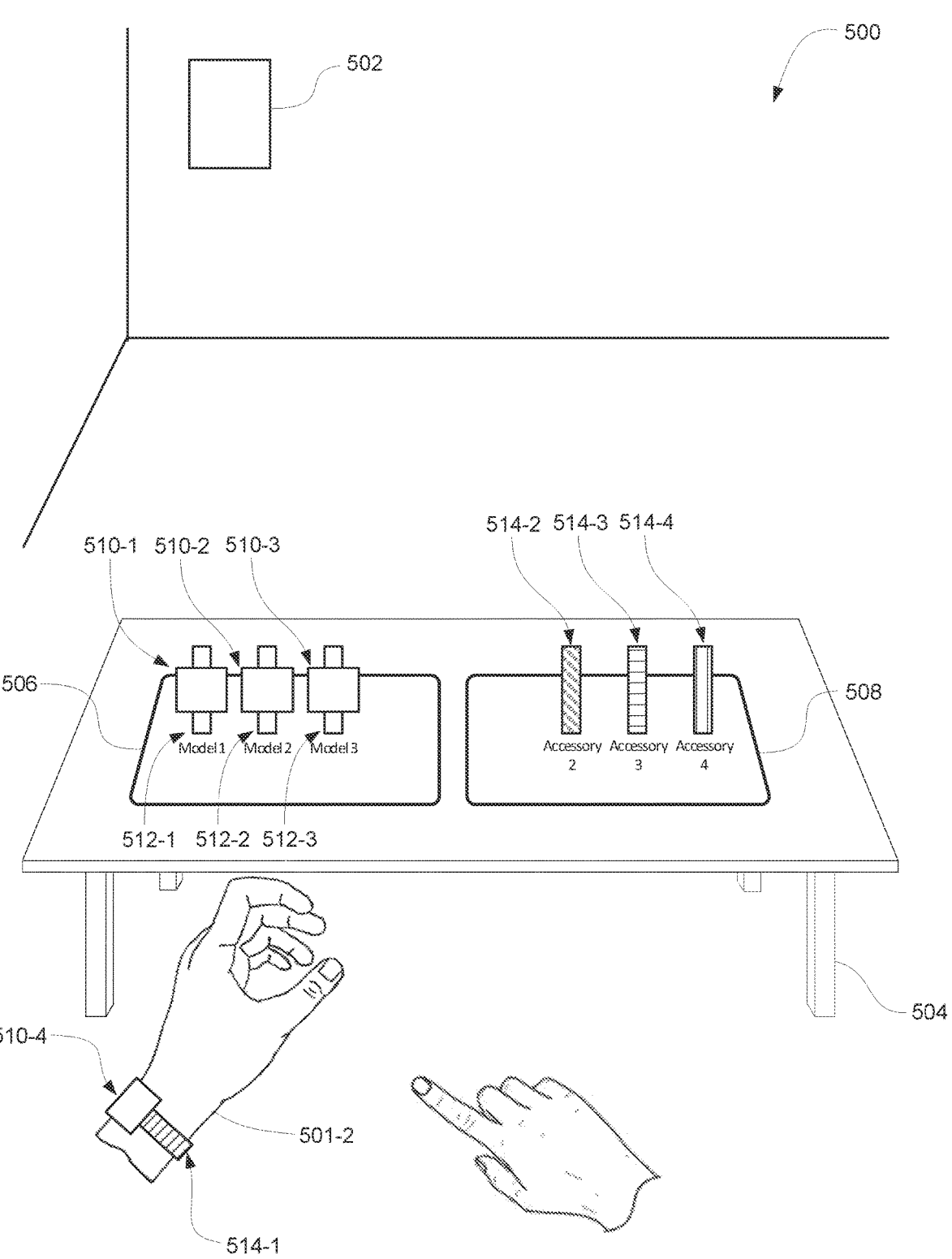
Figure 5M:
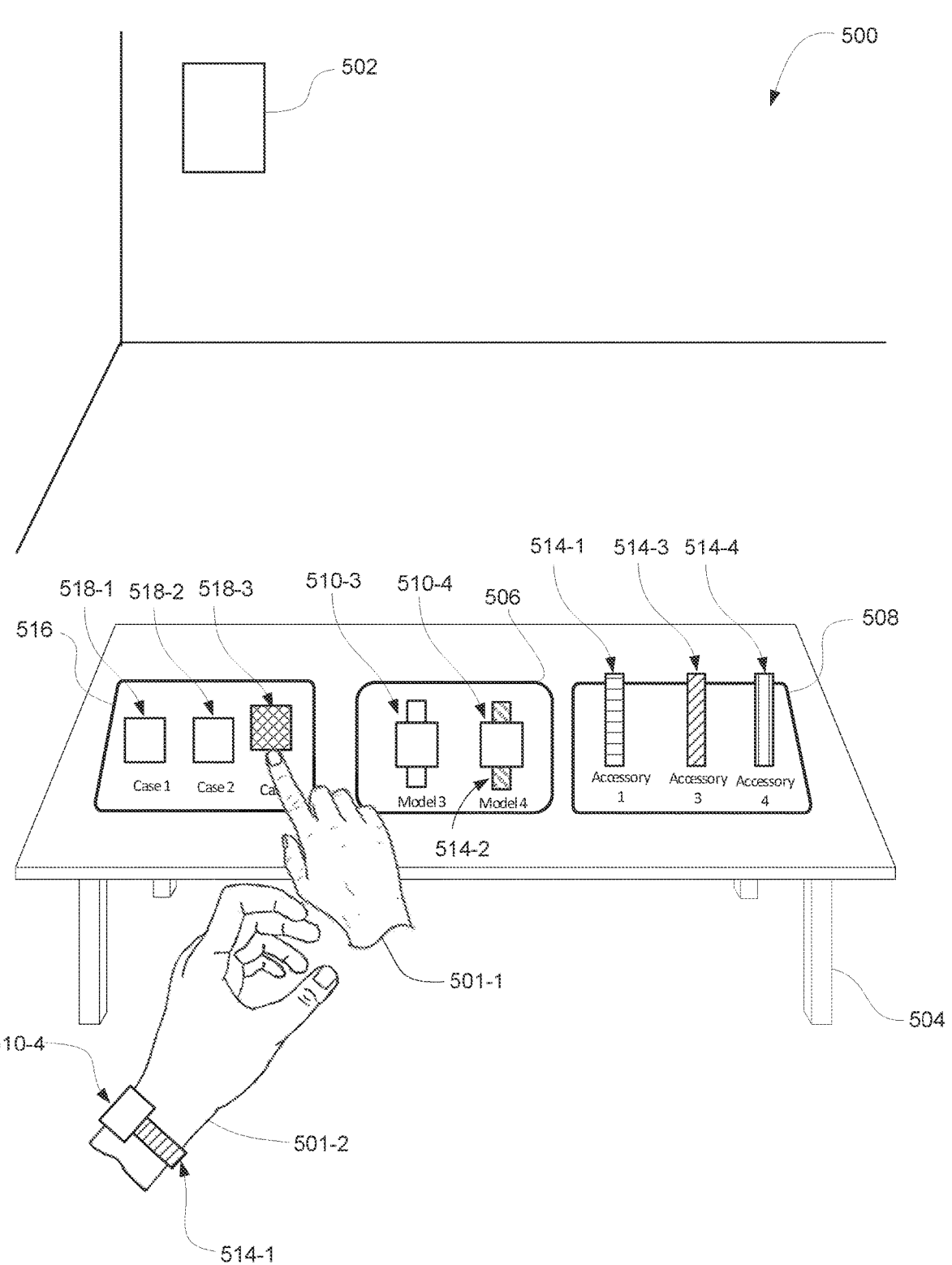
Figure 5N:
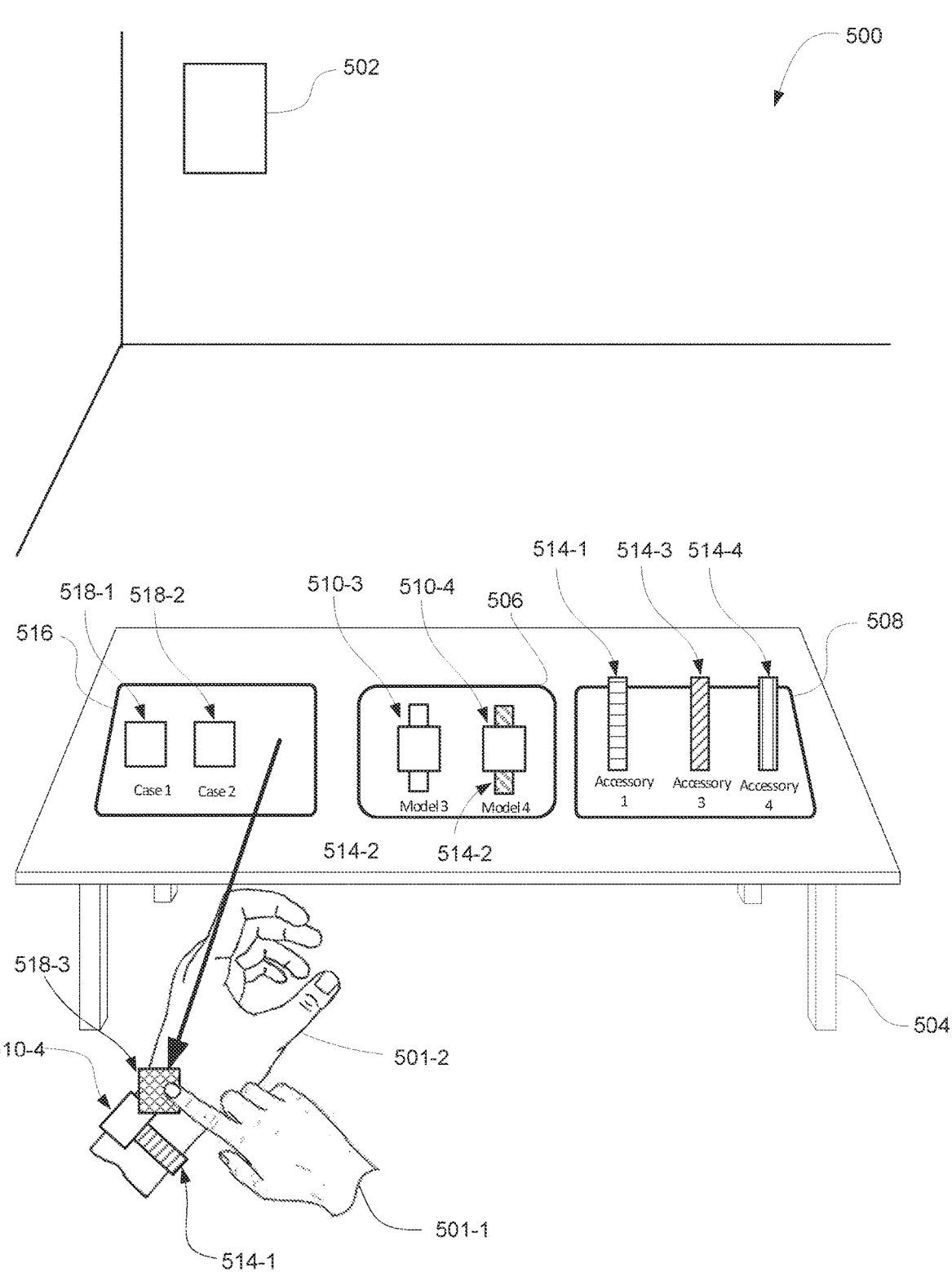
Figure 50:
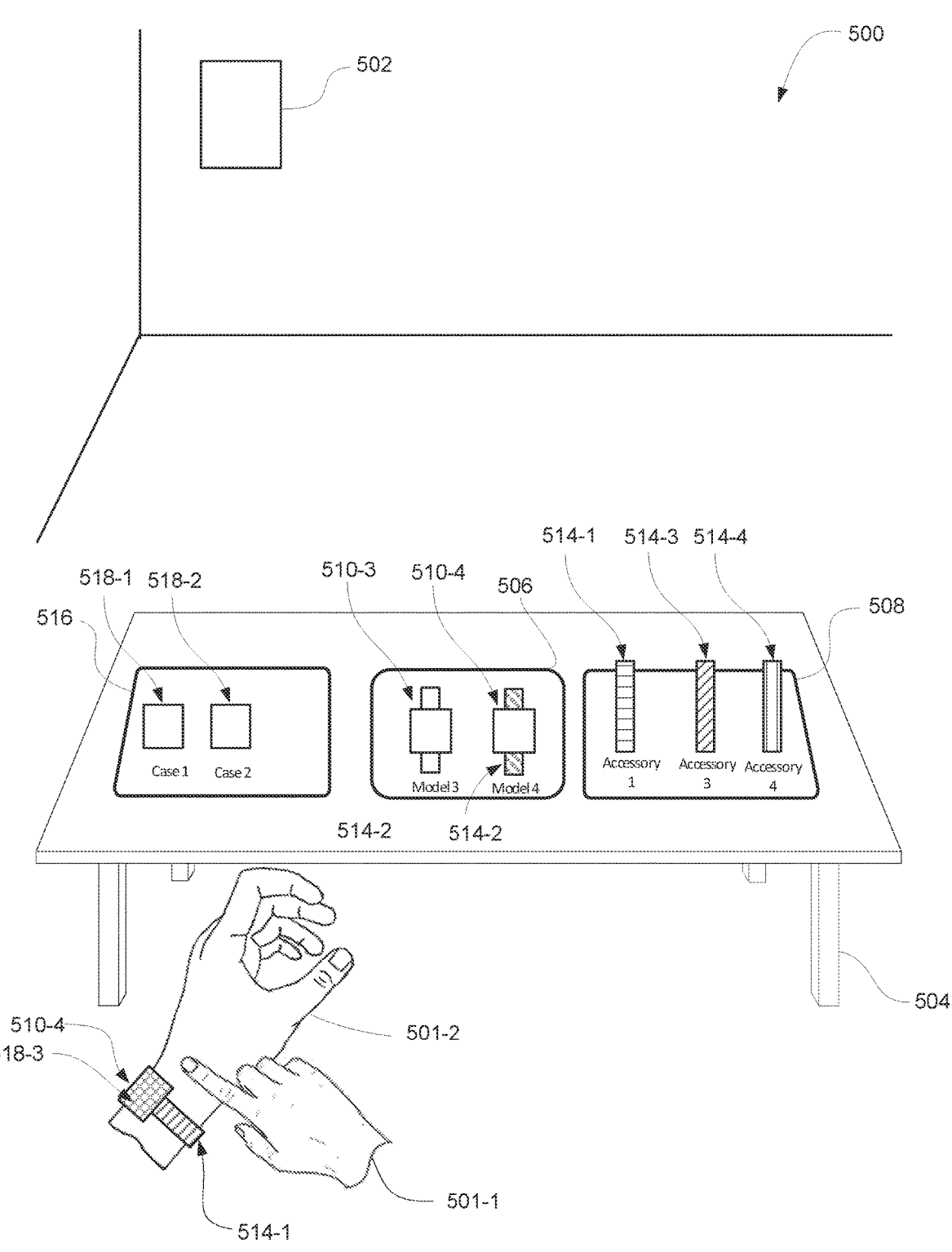
Figure 5P:
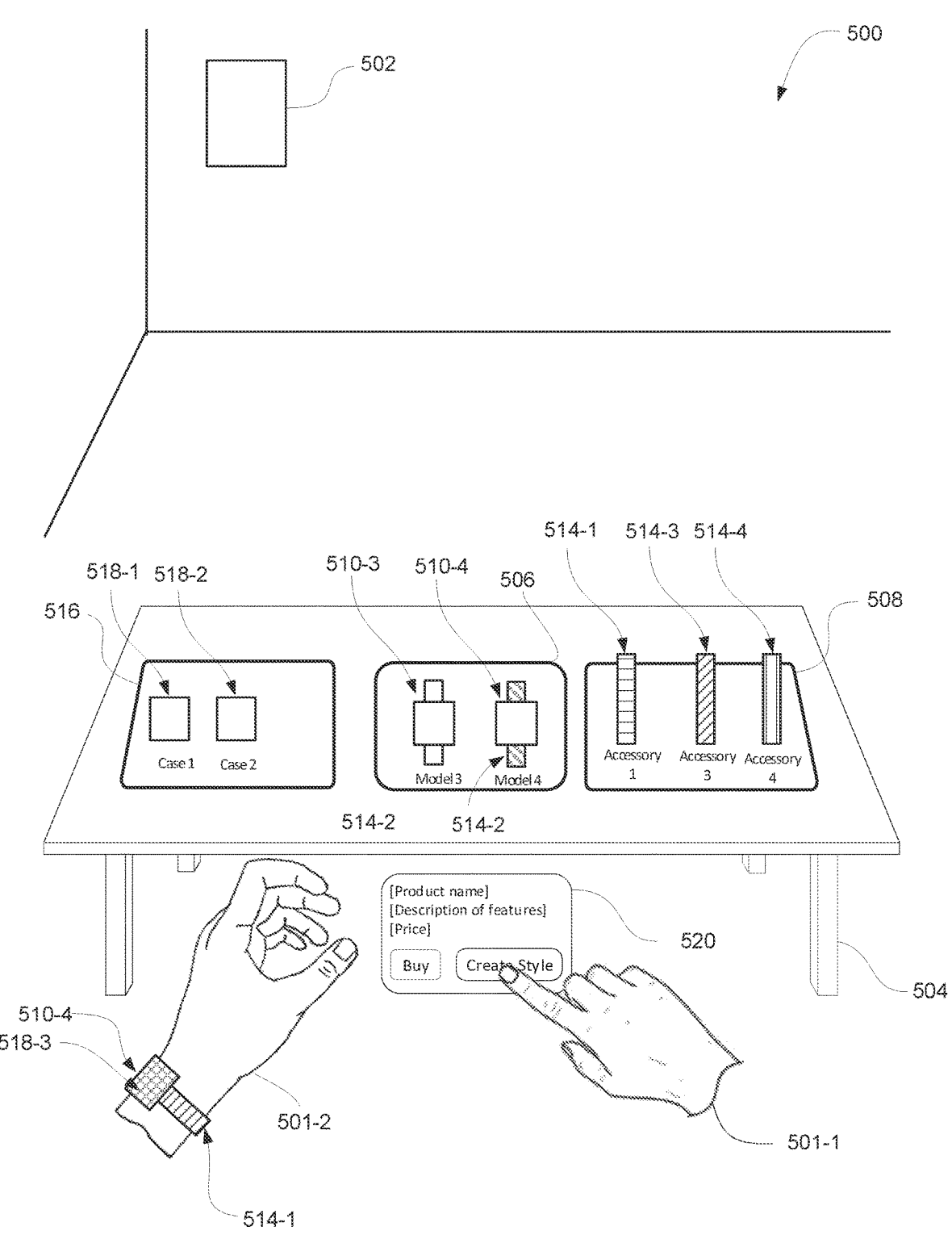
Figure 5Q:
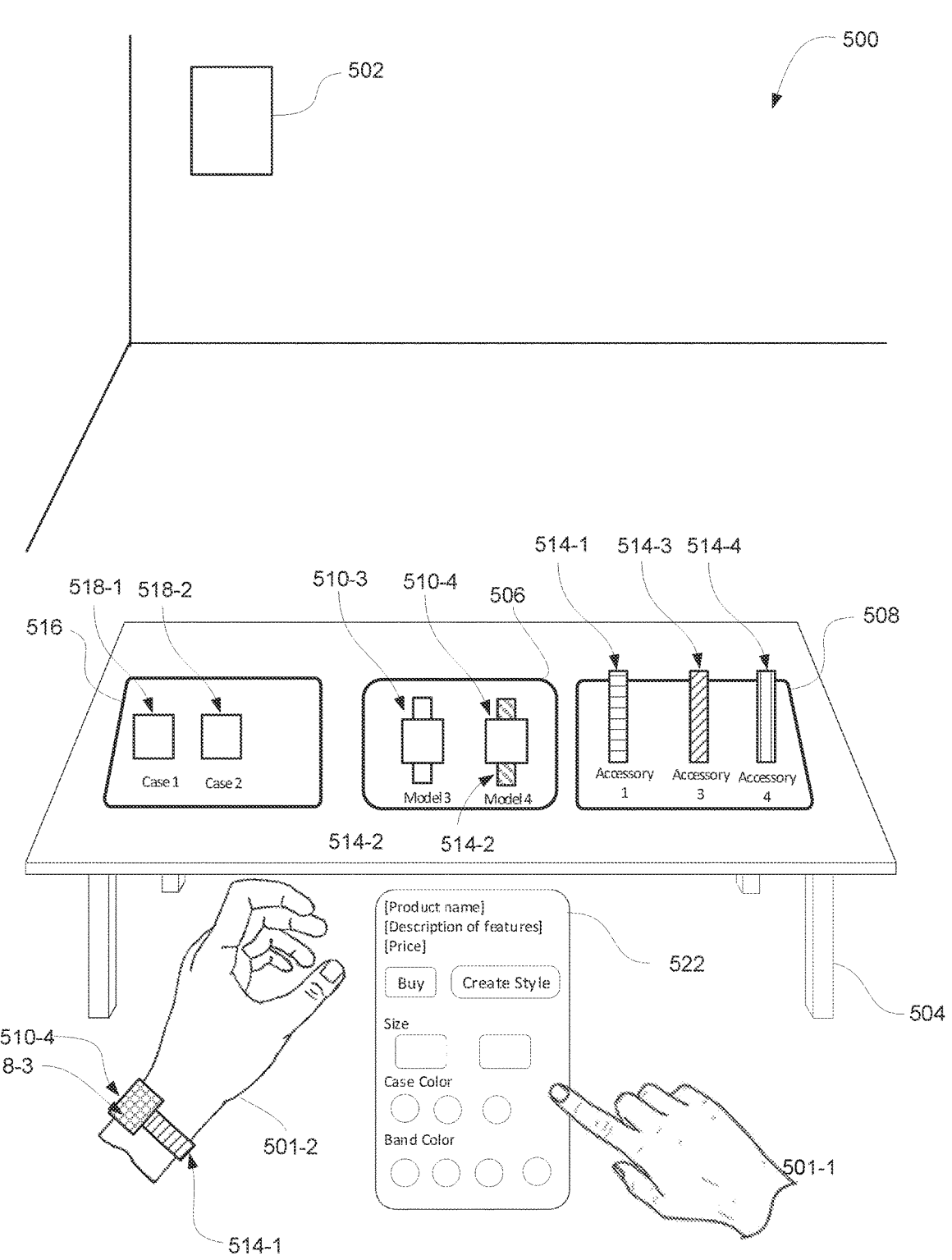
Figure 5R:
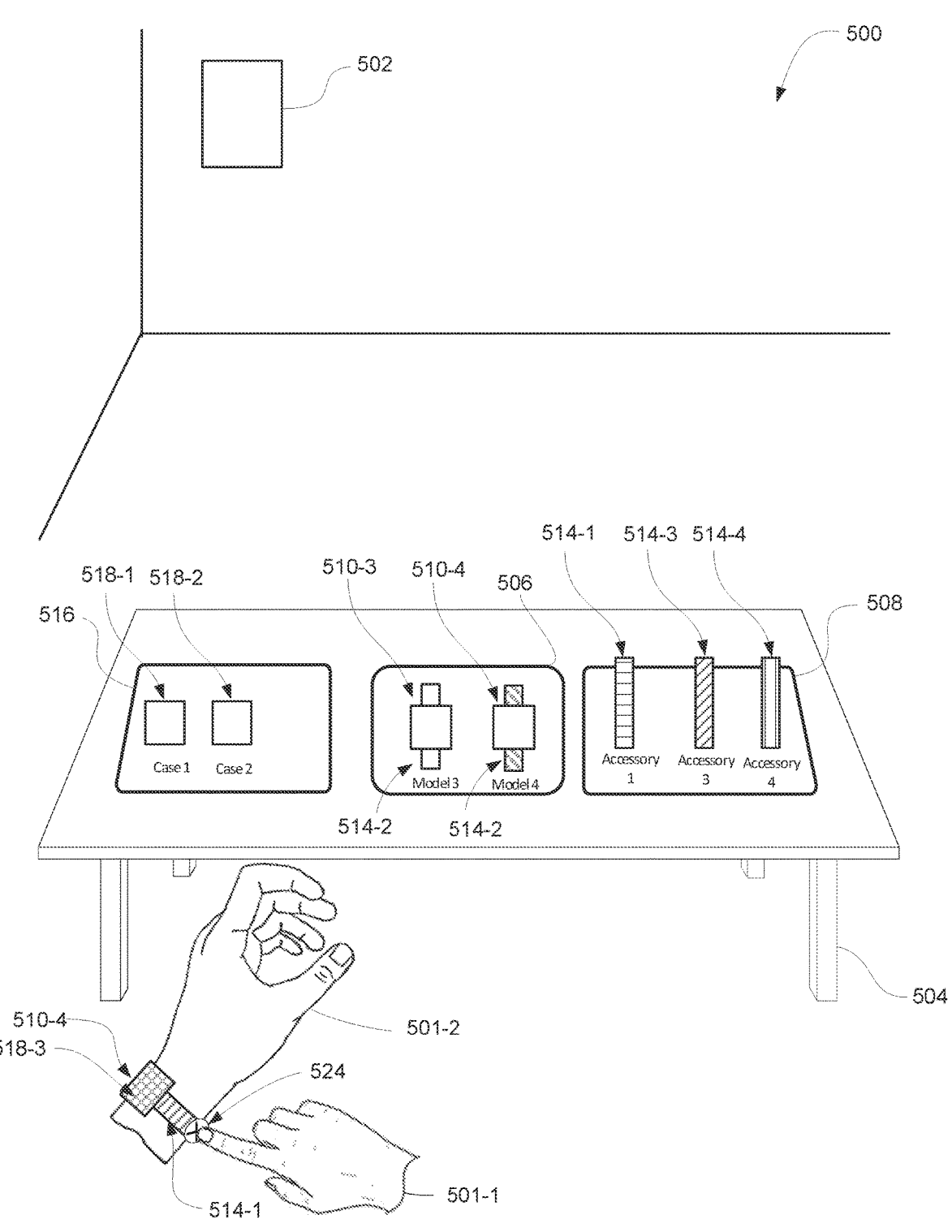
Figure 5S:
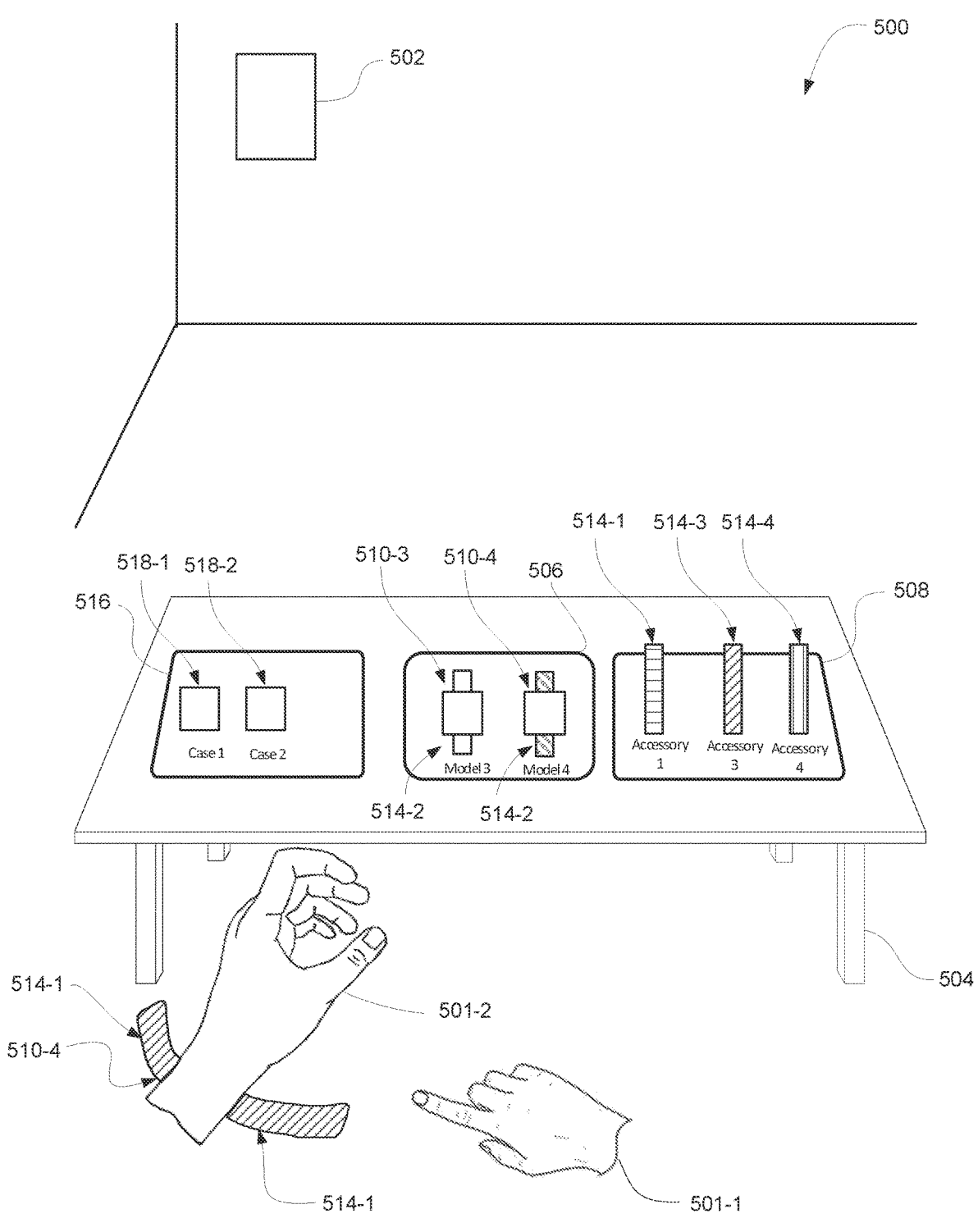

FIGS. 5A-5S illustrate a method of customizing and previewing a virtual product according to some embodiments of the disclosure. FIG. 5A illustrates three-dimensional environment 500 (e.g., a computer-generated environment, an extended reality environment, etc.) that is being displayed by a display generation component of an electronic device (e.g., such as electronic device 100 and/or device 200 described above with respect to FIG. 1 and FIG. 2).

In some embodiments, three-dimensional environment 500 includes product station 506 and accessory station 508. Product station 506 and accessory station 508 share similar features and/or characteristics as product station 306 and/or feature station 312 described above with respect to FIGS. 3A-3D. As shown in FIG. 5A, product station 506 can include one or more representations of one or more different models of a particular product. For example, representation 510-1 can be a first watch model, representation 510-2 can be a second watch model, representation 510-3 can be a third watch model, and representation 510-4 can be a fourth watch model. In some embodiments, the different representations can be of different variants of the same watch model (e.g., as opposed to different watch models). For example, different variants of the same watch model can correspond to different customizable base components for a respective product. In some embodiments, a customizable base component is a component for which different options (e.g., variations) exist, but which is not interchangeable with another base component without otherwise replacing the product with a wholly different product. For example, with respect to a watch product, a customizable base component can be the watch body (e.g., the component that includes the display and/or watch face) because the watch body cannot be replaced with another watch body without otherwise effectively replacing the watch with another watch (e.g., it is no longer considered the same device). In FIG. 5A, representation 510-1 can be a watch with a first body color, representation 510-2 can be the same watch with a second body color, and representation 510-3 can be the same watch with a different body size (e.g., larger or smaller watch face). Any number of models can be displayed on product station 506.

On the other hand, customizable accessories (e.g., customizable components that are not base components) are those that are interchangeable with other compatible accessories. In some embodiments, customizable accessories can be attached to a base component. For example, watch bands can be interchangeable with other watch bands and can be attached to a watch body. In some embodiments, a customizable watch band can feature different colors, different textures, different materials, different lengths, etc.

In some embodiments, representations 510-1 to 510-4 on product station 506 can be displayed bundled with a default accessory. For example, representation 510-1 is displayed with accessory 512-1, representation 510-2 is displayed with accessory 512-2, representation 510-3 is displayed with accessory 512-3, and representation 510-4 is displayed with accessory 512-4. In some embodiments, the default accessory that the representations are displayed with are a standard color, a color that is bundled with the base component, a featured watch band, etc.

In some embodiments, customizable accessories can be displayed on accessory station 508 (e.g., separately from product station 506). In FIG. 5A, accessory station 508 includes representations 514-1 to 514-4 corresponding to four different accessories (e.g., of the same accessory type, or of different accessory types) that can be selected for the respective product that is displayed on product station 506. For example, representations 514-1 to 514-4 can be different types of watch bands, different color watch bands, watch bands made of different materials, different length watch bands, etc.

In some embodiments, representations 510-1 to 510-4 can be customized using the accessories on accessory station 508. For example, in FIG. 5B, the electronic device detects a selection of accessory 514-2 performed by hand 501-1 of the user. In some embodiments, selection of accessory 514-2 can include detecting a pinch gesture by hand 501-1 at a location associated with accessory 514-2 (e.g., pinching on the accessory itself), detecting a pinch gesture while the gaze of the user is directed at accessory 514-2 (e.g., without requiring the user pinch on accessory 514-2), and/or a pointing or tapping gesture (e.g., on the accessory itself or while the gaze of the user is directed at accessory 514-2). In the embodiment of FIG. 5B, representation of accessory 514-2 rises up from accessory station 508 to visually indicate that it has been selected, although in other embodiments different visual indicators such as different accessory motions, changes in accessory size, coloration or highlighting, or audio indicators such as a chime of other sound can be employed to indicate selection of an accessory.

In FIG. 5C, while maintaining the selection gesture with hand 501-1, the electronic device detects the movement of hand 501-1 towards representation 510-4. In some embodiments, in response to detecting the movement of hand 501-1 while maintaining the selection gesture, accessory 514-2 moves in accordance with the movement of hand 501-1. For example, the user is able to pick up and drag accessory 514-2 around in three-dimensional environment 500 (e.g., a drag-and-drop operation). In some embodiments, if accessory 514-2 is moved to within a threshold distance from representation 510-4 (e.g., within 1 inch, 3 inches, 6 inches, 1 foot, etc.) and/or a threshold distance from a respective location on representation 510-4 (e.g., within 1 inch, 3 inches, 6 inches, etc. of the location on representation 510-4 associated with watch bands), then in response to detecting a termination of the selection input (e.g., the release of the pinch gesture, the termination of the pointing or tapping gesture, etc.), representation 510-4 is updated to attach accessory 514-2, as shown in FIG. 5D. In some embodiments, if representation 510-4 has an existing accessory of the same type as the accessory being attached, then the existing accessory is replaced with the accessory being added. For example, in FIG. 5D, accessory 512-4, which was previously attached to representation 510-4, is replaced with accessory 514-2. As shown in FIG. 5D, accessory 512-4 is attached to representation 510-4 at the respective position associated with the type of accessory. For example, a watch band accessory can be attached to the top and bottom of the watch body, just the bottom of the watch body, or just the top of the watch body.

As shown in FIGS. 5C and 5D, when the user moves accessory 514-2 away from accessory station 508, the name of the accessory is no longer displayed on accessory station 508. In some embodiments, the user is able to remove accessory 514-2 from representation 510-4 by selecting accessory 514-2 and pulling it off representation 510-4. In some embodiments, after removing accessory 514-2 from representation 510-4, the user is able to attach it to other base components (e.g., representation 510-1 to 510-3). In some embodiments, after removing accessory 514-2 from representation 510-4, the user is able to return accessory 514-2 to accessory station 508 either by physically moving accessory 514-2 back to its position on station 508 (e.g., or within a threshold distance of its original position, such as 1 inch, 3 inches, 6 inches, 1 foot, etc.), or by releasing the selection gesture when accessory 514-2 is not within the threshold distance from any of the representations that would otherwise cause accessory 514-2 to attach to the respective representation (e.g., by dropping accessory 514-2). In some embodiments, an animation is displayed moving accessory 514-2 back to its original position on accessory station 508. In some embodiments, after removing accessory 514-2 from representation 510-4, representation 510-4 optionally is displayed with the default accessory (e.g., accessory 512-4 is restored), or representation 510-4 is displayed with no accessory at the respective position (e.g., no watch band).

In some embodiments, three-dimensional environment 500 can include multiple accessory stations, each associated with a different type of accessory or component. As shown in FIG. 5E, accessory station 508 can be used to customize watch bands and accessory station 516 can be used to customize watch cases. In some embodiments, accessory stations 508 and/or 516 are scrollable to display different sets of accessories or components. For example, a user is able to swipe left or right to scroll through the catalog of accessories or components and cause display of representations of accessories or components that were not previously displayed.

In FIG. 5E, the electronic device detects a selection of case 518-3 performed by hand 501-1 of the user. In some embodiments, selection of case 518-3 can include detecting a pinch gesture by hand 501-1 at a location associated with case 518-3 (e.g., pinching on the watch case itself), detecting a pinch gesture while the gaze of the user is directed at case 518-3 (e.g., without requiring the user pinch on case 518-3), and/or a pointing or tapping gesture (e.g., on the watch case itself or while the gaze of the user is directed at case 518-3). In the embodiment of FIG. 5E, case 518-3 rises up from accessory station 516 to visually indicate that it has been selected, although in other embodiments different visual indicators such as different accessory motions, changes in accessory size, coloration or highlighting, or audio indicators such as a chime of other sound can be employed to indicate selection of an accessory.

As shown in FIGS. 5F and 5G, when the user moves case 518-3 away from accessory station 516, the name of the watch case is no longer displayed on accessory station 516. In some embodiments, the user is able to remove a watch case from representation 510-3 or 510-4 by selecting the watch case and pulling it off representation 510-3 or 510-4. In some embodiments, after removing the watch case from representation 510-3 or 510-4, the user is able to attach it to other representations. In some embodiments, after removing a watch case from a representation, the user is able to return the watch case to accessory station 516 either by moving the watch case back to its position on station 516 (e.g., or within a threshold distance of its original position, such as 1 inch, 3 inches, 6 inches, 1 foot, etc.), or by releasing the selection gesture when the watch case is not within the threshold distance from any of the representations that would otherwise cause the watch case to attach to the respective representation. In some embodiments, an animation is displayed moving a watch case back to its original position on accessory station 516. In some embodiments, after removing a watch case from a representation, the representation optionally is displayed with a default watch case, or the representation is displayed with no watch case at the respective position.

Thus, while representations of models of products are displayed on product station 506, a user is able to customize the products by dragging and dropping one or more customizable accessories or components onto the representations. In some embodiments, the user is able to "test drive" the product, for example, by wearing the product, to preview the product. For example, in FIG. 5H, the electronic device detects a selection of representation 510-4 being performed by hand 501-1 of the user. In FIG. 5I, while maintaining the selection gesture with hand 501-1, the electronic device detects the movement of hand 501-1 towards hand 501-2 (e.g., the other hand of the user, a representation of the other hand of the user, etc.). In some embodiments, in response to detecting the movement of hand 501-1 while maintaining the selection gesture, representation 510-4 (e.g., including the attached accessory 514-2) moves in accordance with the movement of hand 501-1. In some embodiments, if representation 510-4 is moved to within a threshold distance (e.g., within 1 inch, 3 inches, 6 inches, 1 foot, etc.) from the wrist of hand 501-2 (e.g., the predetermined location on which the product is worn), then in response to detecting a termination of the selection input (e.g., the release of the pinch gesture, the termination of the pointing or tapping gesture, etc.), representation 510-4 is attached to the wrist of hand 501-2 as if the user is wearing the respective product (e.g., the watch), as shown in FIG. 5I.

In some embodiments, attaching representation 510-4 to hand 501-2 can include three-dimensionally rotating representation 510-4 such that representation 510-4 is worn at the proper orientation on hand 501-2 (e.g., either watch face up or watch face down, but not watch face to the sides). In some embodiments, attaching representation 510-4 to hand 501-2 can include displaying an animation of the watch band portion of representation 510-4 (e.g., accessory 514-2) opening up and/or closing around the wrist of hand 501-2. In some embodiments, when representation 510-4 reaches a predetermined threshold distance from hand 501-2, the watch band portion of representation 510-4 animates to open up (e.g., to a straightened position), for example, to indicate that representation 510-4 can be attached to hand 501-2. In some embodiments, the predetermined threshold distance at which representation 510-4 animates to open up is the same predetermined threshold distance at which representation 510-4 will attach to the wrist of hand 501-2 when the selection input is terminated (e.g., when representation 510-4 is animated to open up, then in response to detecting the termination of the selection input, representation 510-4 attaches to the wrist of hand 501-2). In some embodiments, in response to detecting the termination of the selection input, the device displays an animation of the watch bands closing around the wrist of hand 501-2, such as to close the clasp mechanism on accessory 514-2.

In some embodiments, while a representation of a product (e.g., such as representation 510-4) is not associated (e.g., "attached to") with product station 506 and/or while an accessory (e.g., such as accessory 514-2) is not associated (e.g., "attached to") accessory station 508 (e.g., while the representation and/or accessory is being dragged by hand 501-1), the representation of the product and/or accessory can display a physics effect. For example, while accessory 514-2 is being moved by hand 501-1 and/or while representation 510-4 is being moved by hand 501-1, accessory 514-2 can exhibit a physics effect (e.g., gravity, momentum, etc.) such as the band(s) of accessory 514-2 hanging downwards (e.g., due to gravity), flopping around, swinging, etc., as hand 501-1 moves it around three-dimensional environment 500 (e.g., due to inertia and/or momentum), etc. In some embodiments, a physics engine simulates the movement of accessory 514-2 and/or representation 510-4 while being moved in three-dimensional environment 500. In some embodiments, representation 510-4 and/or accessory 514-2 can physically interact with the environment, such the watch bands being displaced by table 504 if accessory 514-2 is brought into contact with table 504. The behavioral realism displayed by the physics effect can demonstrate the stiffness or flexibility of the accessory, which can give the user a more accurate sense of the material, feel or comfort of the accessory and assist in accessorizing or purchasing decisions.

As shown in FIG. 5J, representation 510-4 can be attached to the wrist of hand 501-2 with the user-selected accessory 514-2. In some embodiments, representation 510-4 is aligned with and/or attached to the wrist of hand 501-2 such that in response to detecting the movement and/or rotation of hand 501-2, representation 501-4 (e.g., including accessory

514-2) moves and/or rotates in accordance with the movement and/or rotation of hand 501-2, respectively. Thus, a user is able to preview how the product would look when worn by the user, including the selected accessory for the product.

In FIG. 5J, the electronic device detects a selection of accessory 514-1 performed by hand 501-1 of the user. In FIG. 5K, while maintaining the selection gesture with hand 501-1, the electronic device detects the movement of hand 501-1 towards representation 510-4 while representation 510-4 is on the wrist of hand 501-2. In some embodiments, in response to detecting the movement of hand 501-1 while maintaining the selection gesture, accessory 514-1 moves in accordance with the movement of hand 501-1. In some embodiments, if accessory 514-1 is moved to within a threshold distance from representation 510-4 (e.g., within 1 inch, 3 inches, 6 inches, 1 foot, etc.), then in response to detecting a termination of the selection input (e.g., the release of the pinch gesture, the termination of the pointing or tapping gesture, etc.), representation 510-4 is updated to attach accessory 514-1, as shown in FIG. 5L. Thus, a user is able to change one or more accessory options for a product while the representation of the product is on product station 506 and/or while the representation of the product is being worn by the user. Similarly, a user is able to drag-and-drop a representation of another product model, such as representation 510-1 to 510-3, to replace representation 510-4 on the wrist of hand 501-2 with the selected representation.

In some embodiments, while representation 510-4 is on the wrist of hand 501-2, the user is able to customize one or more aspects of the base component (e.g., the watch body). In the embodiment of FIG. 5M, three-dimensional environment 500 can include multiple accessory stations, each associated with a different type of accessory or component. As shown in FIG. 5M, accessory station 508 can be used to customize watch bands and accessory station 516 can be used to customize the watch body or case. In FIG. 5M, the electronic device detects a selection of case 518-3 performed by hand 501-1 of the user. In some embodiments, selection of case 518-3 can include detecting a pinch gesture by hand 501-1 at a location associated with case 518-3 (e.g., pinching on the watch case itself), detecting a pinch gesture while the gaze of the user is directed at case 518-3 (e.g., without requiring the user pinch on case 518-3), and/or a pointing or tapping gesture (e.g., on the watch case itself or while the gaze of the user is directed at case 518-3). In the embodiment of FIG. 5M, case 518-3 rises up from accessory station 516 to visually indicate that it has been selected, although in other embodiments different visual indicators such as different accessory motions, changes in accessory size, coloration or highlighting, or audio indicators such as a chime of other sound can be employed to indicate selection of an accessory.

In FIG. 5N, while maintaining the selection gesture with hand 501-1, the electronic device detects the movement of hand 501-1 towards hand 501-2 (e.g., the other hand of the user, a representation of the other hand of the user, etc.). In some embodiments, in response to detecting the movement of hand 501-1 while maintaining the selection gesture, case 518-3 moves in accordance with the movement of hand 501-1. As shown in FIGS. 5N, when the user moves case 518-3 away from accessory station 516, the name of the watch case is no longer displayed on accessory station 516. In some embodiments, if case 518-3 is moved to within a threshold distance (e.g., within 1 inch, 3 inches, 6 inches, 1 foot, etc.) from the wrist of hand 501-2 (e.g., the predetermined location on which the product is worn), then in response to detecting a termination of the selection input (e.g., the release of the pinch gesture, the termination of the pointing or tapping gesture, etc.), representation 510-4 is updated to attach case 518-3, as shown in FIG. 5O.

In the embodiments described above, a user is able to purchase one or more of the products on display. For example, in FIG. 5P, after customizing representation 510-4, selection of representation 510-4 using any of the selection techniques described above can cause window 520 to appear to the side of representation 510-4. Window 520 can include one or more product descriptions including a price, and one or more affordances such as a "Buy" affordance and/or a "Create Style" affordance. The user is able to select the "Buy" affordance to initiate a process to purchase the respective watch product with the selected customizations. In some embodiments, a user need not customize a product to be able to purchase the product. For example, a user is able to select representation 510-3 and purchase the product associated with representation 510-3 (e.g., which includes default and/or pre-selected options) without providing any customizations. Similarly, in any of FIGS. 3A-3D and FIGS. 4A-4C, the user is able to initiate a process to purchase the product associated with representation 308 and representation 408 via, for example, selection of a purchase affordance.

In the embodiment of FIG. 5P, if a user selects the "Create Style" affordance, a new or extended window 522 can be presented, as shown in FIG. 5Q. Window 522 can include one or more affordances that are selectable to select from different watch sizes, different memory sizes, different color options, etc. for representation 510-4. In such embodiments, in response to receiving a selection of an affordance, representation 510-4 can be updated to reflect the custom selection. For example, in response to a user selecting an option to change the watch size, representation 510-4 optionally changes size (e.g., changes screen size, changes overall size) accordingly. Similarly, if a user selects an option to set the case or band to a respective color, representation 510-4 optionally updates to reflect the selected case or band color. Additionally or alternatively, a user is able to select an affordance to save his or her product style customizations for a future shopping session. Additionally or alternatively, a user is able to select an affordance to share his or her product customizations with another user (e.g., via a messaging service, email, etc.).

In some embodiments, product station 506 and/or accessory stations 508 and 516 can be displayed on top of a horizontal surface (e.g., such as table 504 described above), attached to a vertical surface, or in space (e.g., unattached to any surfaces), in a manner similar to that described above with respect to product station 406 and/or feature station 406. For example, product station 506 and/or accessory station 508 can be oriented vertically (e.g., optionally in a portrait orientation) and attached to a vertical surface, such as a wall. In some embodiments, product station 506 and/or accessory station 508 can be placed in space (e.g., unattached to any surface). In some embodiments, the virtual objects on product station 506 and/or accessory station 508 can be arranged or oriented based on the surface and/or location at which product station 506 and/or accessory station 508 is located.

In some embodiments, within three-dimensional environment 500 a user can rotate hand 501-2 and expose the clasp of band 514-1, where clasp affordance 524 can be presented as shown in FIG. 5R. If clasp affordance 524 is selected by hand 501-1, an animation can be presented that shows the clasp being opened as shown in FIG. 5S. Selecting clasp affordance 524 when the clasp is opened as shown in FIG.

5S can trigger an animation that demonstrates how the clasp works. From the open position, a user can select representation 510-4 and relocate the representation back to product station 506.

FIG. 6 is a flow diagram illustrating a method 600 of displaying products in a three-dimensional environment according to some embodiments of the disclosure. The method 600 is optionally performed at an electronic device such as device 100 and device 200, when displaying products in a virtual retail store described above with reference to FIGS. 3A-3D, 4A-4C, and 5A-5S. Some operations in method 600 are, optionally combined (e.g., with each other and/or with method 700) and/or order of some operations is, optionally, changed. As described below, the method 600 provides methods of displaying products in a three-dimensional environment in accordance with embodiments of the disclosure (e.g., as discussed above with respect to FIGS. 3A-5S).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (e.g., a touch screen display, a head mounted display, etc.) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (602) via the display generation component, a computer-generated environment, including a first display station, wherein the first display station can be three-dimensional and displayed within the computer-generated environment, and includes a first representation of a first product and one or more representations of one or more features associated with the first product, such as three-dimensional environment 300 in FIG. 3A, which includes product station 306 and representation 308 of a respective smartphone product and representations 310-1 to 310-4 of Features 1 to 4.

In some embodiments, while presenting the computer-generated environment, the electronic device detects (604), via the one or more input devices, a user input selecting a first representation of the one or more representations corresponding to a first feature, such as the detection of a selection input directed to representation 310-4 performed by hand 301 in FIG. 3B.

In some embodiments, in response to detecting the selection of the first representation (606), the electronic device displays (608), via the display generation component, a second display station, separate from the first display station, wherein the second display station can be three-dimensional and displayed within the computer-generated environment, and includes information associated with the first feature, such as the display of feature station 312 in FIG. 3C.

In some embodiments, while presenting the computer-generated environment, the electronic device detects, via the one or more input devices, a second user input selecting a second representation the one or more representations corresponding to a second feature, such as if the user selected another representation from representations 310-1 to 310-4 in FIGS. 3C and 3D. In some embodiments, in response to detecting the selection of the second representation, the electronic device updates the second display station to cease displaying information associated with the first feature, and display information associated with the second feature, such as replacing the information associated with Feature 4 with information associated with Feature 3 on feature station 312 in FIG. 3D.

In some embodiments, while presenting the computer-generated environment, the electronic device detects, via the one or more input devices, a second user input selecting a second representation of the one or more representations corresponding to a second feature, such as if the user selected another representation from representations 310-1 to 310-4 in FIGS. 3C and 3D. In some embodiments, in response to detecting the selection of the second representation, the electronic device displays, via the display generation component, a third display station, separate from the first and the second display stations, wherein the third display station can be three-dimensional and displayed within the computer-generated environment, and includes information associated with the second feature, and maintains display of the second display station, such as if the device displays another feature station, similar to feature station 312, concurrently with the display of feature station 312.

In some embodiments, the first display station is displayed on a first surface of an object in the computer-generated environment, such as product station 306 being displayed on table 304 in FIG. 3A. In some embodiments, the second display station is displayed on the first surface, adjacent to the first display station, such as feature station 312 being also displayed on table 304 in FIG. 3C.

In some embodiments, displaying the second display station includes moving the first display station from a first location on the first surface to a second location, and displaying the second display station at a location that partially overlaps with the first location, such as moving product station 306 leftwards and displaying feature station 312 at a location that partially overlaps with the previous position of product station 306 in FIG. 3C.

In some embodiments, the information associated with the first feature includes any one of: a textual element associated with the first feature and a graphical element associated with the first feature, such as feature description 316 and feature illustration 318 in FIG. 3C. In some embodiments, the information associated with the first feature is displayed at a location in the computer-generated environment above the second display station, such as feature description 316 being displayed floating above feature station 312 in FIG. 3C. In some embodiments, the first representation of the first product is displayed at a location in the computer-generated environment above the first display station, such as representation 308 being displayed floating above product station 306 in FIG. 3A.

In some embodiments, while presenting the first display station including the first representation of the first product, the electronic device receives, via the one or more input devices, a user input corresponding to a request to customize the first product with a first customization option, such as the selection of a size and/or color option for the respective smartphone product described in FIG. 3A. In some embodiments, in response to receiving the user input, the electronic device updates a visual characteristic of the first representation of the first product in accordance with the first customization option, such as if representation 308 in FIG. 3A is updated to reflect the selected size and/or color option.

In some embodiments, while presenting the first display station including the first representation of the first product, the electronic device receives, via the one or more input devices, a request to inspect the first product, including detecting a grasping gesture performed by a hand of a user of the device directed to the first representation of the first product and a movement of the hand of the user to a respective location while maintaining the grasping gesture, such as hand 401 grabbing representation 408 in FIG. 4A and moving toward the user in FIG. 4B. In some embodiments, in accordance with a determination that one or more criteria are satisfied, the electronic device configures the first representation in an interactive demonstration mode, such as hand 401 moving to a predetermined position associated with the interactive demonstration mode in FIG. 4B.

In some embodiments, in response to detecting the movement of the hand of the user to the predetermined location while maintaining the grasping gesture, the electronic device moves the first representation of the first product in accordance with the movement of the hand, such as representation 408 moving with the movement of hand 401 in FIG. 4B. In some embodiments, the one or more criteria includes a criterion that is satisfied when the hand of the user has moved to a predetermined location relative to the user, such as in FIG. 4B.

In some embodiments, while the first representation is configured in the interactive demonstration mode, the electronic device detects, via the one or more input devices, a rotation of the hand of the user, such as in FIG. 4C. In some embodiments, in response to detecting the rotation of the hand of the user, the electronic device rotates the first representation in accordance with the rotation of the hand, such as the rotation of representation 408 in FIG. 4C, and in accordance with a determination that one or more second criteria are satisfied, displaying a first set of information associated with the first product, such as if representation 408 is rotated to be within a predetermined range of orientations, feature elements 424 and/or feature information 426 are displayed in FIG. 4C.

In some embodiments, the one or more second criteria includes a criterion that is satisfied when an orientation of the first representation is within a predetermined range of orientations, such as in FIG. 4C. In some embodiments, in accordance with a determination that the computer-generated environment includes the second display station, the first set of information associated with the first product includes information associated with the first feature, such as feature elements 424 and feature information 426 being associated with Feature 4 in FIG. 4C. In some embodiments, the information associated with the first product includes a three-dimensional visual element, such as feature elements 424 being three-dimensional elements in FIG. 4C.

In some embodiments, while presenting the first display station including the first representation of the first product, the electronic device detects, via the one or more input devices, a termination of the request to inspect the first product, such as if hand 401 released representation 406 in FIG. 4C. In some embodiments, in response to detecting the termination of the request to inspect the first product, the electronic device configures the first representation in a demonstration mode different than the interactive demonstration mode, and moves the first representation to a location associated with the first display station, such as if representation 408 returns to a passive demonstration mode and/or is returned to its position above product station 406 such as in FIG. 4A.

FIG. 7 is a flow diagram illustrating a method 700 of customizing products in a three-dimensional environment according to some embodiments of the disclosure. The method 700 is optionally performed at an electronic device such as device 100 and device 200, when displaying products in a virtual retail store described above with reference to FIGS. 3A-3D, 4A-4C, and 5A-5S. Some operations in method 700 are, optionally combined (e.g., with each other and/or with method 600) and/or order of some operations is, optionally, changed. As described below, the method 700 provides methods of customizing products in a three-dimensional environment in accordance with embodiments of the disclosure (e.g., as discussed above with respect to FIGS. 3A-5S).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (e.g., a touch screen display, a head mounted display, etc.) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (702), via the display generation component, a computer-generated environment, including a first display station, wherein the first display station includes one or more representations of one or more products, such as product station 506 in FIG. 5A, which includes representations 510-1 to 510-4 of a plurality of watch products.

In some embodiments, a first representation of the one or more representations corresponding to a first product includes a representation of a first base component (704), and a representation of a first accessory component (706), such as representations 510-1 to 510-5 including representations of base components and accessory components (e.g., accessories 512-1 to 512-4) in FIG. 5A. In some embodiments, while presenting the computer-generated environment, the electronic device receives (708), via the one or more input devices, a request to customize the first product with a second accessory component, including detecting a user input moving a representation of the second accessory component, such as hand 501-1 selecting accessory 514-2 in FIG. 5B and moving accessory 514-2 toward representation 510-4 in FIG. 5C.

In some embodiments, in accordance with a determination that one or more criteria are satisfied, including a criterion that is satisfied when the representation of the second accessory component is within a threshold distance from the first representation, the electronic device receives (710) the representation of the first accessory component with the representation of the second accessory component, such as accessory 514-2 being brought to within a threshold distance from representation 510-4 in FIG. 5C.

In some embodiments, the computer-generated environment includes a second display station, separate from the first display station, wherein the second display station includes one or more representations of one or more accessory components, including the representation of the second accessory component, such as accessory station 508 in FIG. 5A.

In some embodiments, detecting the user input moving the representation of the second accessory component includes detecting a grasping gesture performed by a hand of a user of the device directed to the representation of the second accessory component and, while maintaining the grasping gesture, moving the hand of the user, such as hand 501-1 performing a grabbing and/or grasping gesture directed at accessory 514-2 in FIG. 5B and moving toward representation 510-4 while maintaining the grabbing and/or grasping gesture in FIG. 5C.

In some embodiments, receiving the request to customize the first product includes detecting a selection gesture by a hand of a user of the device directed to the representation of the second accessory component, such as detecting hand 501-1 performing a grabbing and/or grasping gesture directed at accessory 514-2 in FIG. 5B. In some embodiments, the one or more criteria includes a criterion that is satisfied when the request includes a termination of the selection gesture, such as detecting the release of the grabbing and/or grasping gesture by hand 501-1.

In some embodiments, in accordance with a determination that the one or more criteria are not satisfied, the electronic device forgoes replacing the representation of the first accessory component with the representation of the second accessory component, such as if representation 512-4 is not replaced with representation 514-2 in FIG. 5D.

In some embodiments, while presenting the computer-generated environment, the electronic device receives, via the one or more input devices, a request to customize the first base component with a first customization option, such as the selection of a size and/or color option for a respective representation of a watch product in FIG. 5A. In some embodiments, in response to receiving the request to customize the first base component, the electronic device updates a visual characteristic of the first representation in accordance with the first customization option, such as updating the respective representation of the watch product to reflect the selected size and/or color option in FIG. 5A.

In some embodiments, the computer-generated environment includes other stations such as other display stations, product stations, feature stations, accessory stations, and the like, separate from the first display station and the second display station, wherein the other stations include one or more representations of one or more products, features, accessory components, and the like, as shown in figures such as FIGS. 5E-5G.

In some embodiments, while presenting the computer-generated environment, the electronic device receives, via the one or more input devices, a request to preview the first product, such as a user input moving representation 514-2 to the wrist of hand 501-2 in FIG. 5H. In some embodiments, in response to receiving the request to preview the first product, the electronic device displays the first representation on a representation of a respective portion of a user of the device, such as attaching representation 514-2 to the wrist of hand 501-2 in FIG. 5I.

In some embodiments, the first product is a watch device, such as in FIG. 5A. In some embodiments, the respective portion of the user of the device is a wrist of the user, such as in FIG. 5I. In some embodiments, receiving the request to preview the first product includes detecting a user input moving the first representation to within a threshold distance of the respective portion of the user, such as in FIG. 5I.

In some embodiments, while presenting the first representation on the representation of the respective portion of the user, the electronic device detects a change in a pose of the respective portion of the user, such as the movement of hand 501-2 and/or rotation of hand 501-2. In some embodiments, a change in a pose refers to a change in the position (e.g., movement), a change in the orientation (e.g., rotation), and/or a change in both position and orientation. In some embodiments, in response to detecting the change in the pose of the respective portion of the user, the electronic device changes a pose of the first representation in accordance with the change in the pose of the respective portion of the user, such as moving and/or rotating representation 510-4 in accordance with the movement and/or rotation of hand 501-2 to maintain representation 510-4 on the wrist of hand 501-2 in FIG. 5I.

In some embodiments, while presenting the first representation on the representation of the respective portion of the user, the electronic device receives, via the one or more input devices, a second request to customize the first product with a third accessory component, such as the selection of a size and/or color option while representation 510-4 is on the wrist of hand 501-2 in FIGS. 5J and 5K. In some embodiments, in response to receiving the second request to customize the first product with the third accessory component, the electronic device replaces the representation of the second accessory component with a representation of the third accessory component, while maintaining display of the first representation on the representation of the respective portion of the user, such as if representation 510-4 is updated to reflect the selected size and/or color option while maintaining representation 510-4 on the wrist of hand 501-2 in FIG. 5L.

In some embodiments, other accessories or components can be configured on the wrist of a hand, such as different bodies, cases, straps, clasps, and the like, as shown in FIGS. 5M-5S.

In some embodiments, method 600 and/or method 700 described above can be performed by a first electronic device, such as device 100 and/or device 200 described above with respect to FIGS. 1 and 2. In some embodiments, method 600 and/or method 700 described above can be performed by multiple electronic devices (e.g., with respect to the same three-dimensional environment). In some embodiments, the steps of method 600 and/or method 700 can be divided among a plurality of electronic devices. In some embodiments, a primary electronic device generates (e.g., creates, renders, etc.) the three-dimensional environments described above (e.g., three-dimensional environment 300 and 400, etc.) and a secondary electronic device displays the generated three-dimensional environment. In some embodiments, a first electronic device generates a part of three-dimensional environment and a second electronic device generates other parts of three-dimensional environment. For example, the setting and/or real world objects in a three-dimensional environment can be based on the physical environment around the primary device, whereas the virtual objects can be generated and placed by a second electronic device (e.g., or a server).

In some embodiments, multiple users can join, view and/or interact with the above-described three-dimensional environments via, for example, multiple electronic devices (e.g., concurrently). In some embodiments, a first electronic device (e.g., such as device 100 and/or device 200) and a second electronic device (e.g., such as device 100 and/or device 200) are in communication with each other (e.g., directly via a direct communication protocol such as Bluetooth, WiFi Direct, etc., or indirectly, such as via an internet connection). In some embodiments, the first electronic device can act as the host and create the three-dimensional environments described above, including the virtual retail experience. In some embodiments, the second electronic device can receive information from the first electronic device, and display the three-dimensional environment via its own display generation component. In some embodiments, the user of the first electronic device and the user of the second electronic device can both be present in the three-dimensional environment concurrently (e.g., can both exist in the environment) and can optionally interact with each other and/or with the virtual objects in the three-dimensional environment (e.g., such as the product stations, feature stations, accessory stations, representation of products, etc. described above). In some embodiments, one user can see a representation of the other user(s) and the interactions of the other user(s). For example, if a first user picks up a representation of a product, the second user can see the representation of the product being picked up by the first user (e.g., by a representation of the first user). Thus, in this way, a plurality of users can participate in a virtual shopping session.

Therefore, according to the above, some examples of the disclosure are directed to a method comprising, at an electronic device in communication with a display and one or more input devices, presenting, via the display, a computer-generated environment, including a three-dimensional first display station displayed within the computer-generated environment, wherein the first display station includes a first representation of a first product and one or more representations of one or more features associated with the first product, while presenting the computer-generated environment, detecting, via the one or more input devices, a user input selecting a first representation of the one or more representations corresponding to a first feature, in response to detecting the selection of the first representation, displaying, via the display, a second display station, separate from the first display station, wherein the second display station includes information associated with the first feature. Alternatively or additionally to one or more of the examples disclosed above, in some examples the method further comprises, while presenting the computer-generated environment, detecting, via the one or more input devices, a second user input selecting a second representation of the one or more representations corresponding to a second feature, and in response to detecting the selection of the second representation, updating the second display station to cease displaying information associated with the first feature, and display information associated with the second feature. Alternatively or additionally to one or more of the examples disclosed above, in some examples the method further comprises, while presenting the computer-generated environment, detecting, via the one or more input devices, a second user input selecting a second representation the one or more representations corresponding to a second feature, and in response to detecting the selection of the second representation, displaying, via the display, a third display station, separate from the first and the second display stations, wherein the third display station includes information associated with the second feature, and maintaining display of the second display station. Alternatively or additionally to one or more of the examples disclosed above, in some examples the first display station is displayed on a first surface of an object in the computer-generated environment, and the second display station is displayed on the first surface, adjacent to the first display station. Alternatively or additionally to one or more of the examples disclosed above, in some examples the method further comprises, while presenting the computer-generated environment, detecting, via the one or more input devices, a user input selecting the first display station, in response to detecting the selection of the first display station, detecting, via the one or more input devices, movement of the user input from a first location to a second location, and in response to detecting the movement of the user input from the first location to the second location, relocating the first display station to the second location and relocating the second display station adjacent to the first display station. Alternatively or additionally to one or more of the examples disclosed above, in some examples the method further comprises, while presenting the computer-generated environment, detecting, via the one or more input devices, a surface in the computer-generated environment, in response to a determination that the surface has been detected, displaying the first display station on the surface and displaying the second display station adjacent to the first display station, and in response to a determination that the surface has not been detected, displaying the first display station floating in the computer-generated environment and displaying the second display station adjacent to the first display station. Alternatively or additionally to one or more of the examples disclosed above, in some examples displaying the second display station includes moving the first display station from a first location on the first surface to a second location, and displaying the second display station at a location that partially overlaps with the first location. Alternatively or additionally to one or more of the examples disclosed above, in some examples the information associated with the first feature includes any one of a textual element associated with the first feature and a graphical element associated with the first feature. Alternatively or additionally to one or more of the examples disclosed above, in some examples the information associated with the first feature is displayed at a location in the computer-generated environment above the second display station. Alternatively or additionally to one or more of the examples disclosed above, in some examples the first representation of the first product is displayed at a location in the computer-generated environment above the first display station. Alternatively or additionally to one or more of the examples disclosed above, in some examples the method further comprises, while presenting the first display station including the first representation of the first product, receiving, via the one or more input devices, a user input corresponding to a request to customize the first product with a first customization option, and in response to receiving the user input, updating a visual characteristic of the first representation of the first product in accordance with the first customization option. Alternatively or additionally to one or more of the examples disclosed above, in some examples the method further comprises, while presenting the first display station including the first representation of the first product, receiving, via the one or more input devices, a request to inspect the first product, including detecting a grasping gesture performed by a hand of a user of the device directed to the first representation of the first product and a movement of the hand of the user to a respective location while maintaining the grasping gesture, and in accordance with a determination that one or more first criteria are satisfied, configuring the first representation in an interactive demonstration mode. Alternatively or additionally to one or more of the examples disclosed above, in some examples the method further comprises, in response to detecting the movement of the hand of the user to the predetermined location while maintaining the grasping gesture, moving the first representation of the first product in accordance with the movement of the hand. Alternatively or additionally to one or more of the examples disclosed above, in some examples the one or more first criteria includes a first criterion that is satisfied when the hand of the user has moved to a predetermined location relative to the user. Alternatively or additionally to one or more of the examples disclosed above, in some examples the method further comprises, while the first representation is configured in the interactive demonstration mode, detecting, via the one or more input devices, a rotation of the hand of the user, and in response to detecting the rotation of the hand of the user, rotating the first representation in accordance with the rotation of the hand, and in accordance with a determination that one or more second criteria are satisfied, displaying a first set of information associated with the first product. Alternatively or additionally to one or more of the examples disclosed above, in some examples the one or more second criteria includes a second criterion that is satisfied when an orientation of the first representation is within a predetermined range of orientations. Alternatively or additionally to one or more of the examples disclosed above, in some examples, in accordance with a determination that the computer-generated environment includes the second display station, the first set of information associate with the first product includes information associated with the first feature. Alternatively or additionally to one or more of the examples disclosed above, in some examples the information associated with the first product includes a three-dimensional visual element. Alternatively or additionally to one or more of the examples disclosed above, in some examples the method further comprises, while presenting the first display station including the first representation of the first product, detecting, via the one or more input devices, a termination of the request to inspect the first product, and in response to detecting the termination of the request to inspect the first product, configuring the first representation in a demonstration mode different than the interactive demonstration mode, and moving the first representation to a location associated with the first display station.

Some examples of the disclosure are directed to an electronic device, comprising one or more processors, memory, and one or more programs, wherein the one or more programs are stored in the memory and configured to be executed by the one or more processors, the one or more programs including instructions for presenting, via a display, a computer-generated environment, including a three-dimensional first display station displayed within the computer-generated environment, wherein the first display station includes a first representation of a first product and one or more representations of one or more features associated with the first product, while presenting the computer-generated environment, detecting, via one or more input devices, a user input selecting a first representation of the one or more representations corresponding to a first feature, and in response to detecting the selection of the first representation, displaying, via the display, a second display station, separate from the first display station, wherein the second display station includes information associated with the first feature.

Some examples of the disclosure are directed to a non-transitory computer readable storage medium storing one or more programs, the one or more programs comprising instructions, which when executed by one or more processors of an electronic device, cause the electronic device to present, via a display, a computer-generated environment, including a three-dimensional first display station displayed within the computer-generated environment, wherein the first display station includes a first representation of a first product and one or more representations of one or more features associated with the first product, while presenting the computer-generated environment, detect, via one or more input devices, a user input selecting a first representation of the one or more representations corresponding to a first feature, and in response to detecting the selection of the first representation, display, via the display, a second display station, separate from the first display station, wherein the second display station includes information associated with the first feature.

Some examples of the disclosure are directed to an electronic device, comprising one or more processors, memory, and means for presenting, via a display, a computer-generated environment, including a three-dimensional first display station displayed within the computer-generated environment, wherein the first display station includes a first representation of a first product and one or more representations of one or more features associated with the first product, means for, while presenting the computer-generated environment, detecting, via one or more input devices, a user input selecting a first representation of the one or more representations corresponding to a first feature, and means for, in response to detecting the selection of the first representation, displaying, via the display, a second display station, separate from the first display station, wherein the second display station includes information associated with the first feature.

Some examples of the disclosure are directed to an information processing apparatus for use in an electronic device, the information processing apparatus comprising means for presenting, via a display, a computer-generated environment, including a three-dimenisonal first display station displayed within the computer-generated environment, wherein the first display station includes a first representation of a first product and one or more representations of one or more features associated with the first product, means for, while presenting the computer-generated environment, detecting, via one or more input devices, a user input selecting a first representation of the one or more representations corresponding to a first feature, and means for, in response to detecting the selection of the first representation, displaying, via the display, a second display station, separate from the first display station, wherein the second display station includes information associated with the first feature.

Some examples of the disclosure are directed to an electronic device, comprising one or more processors, memory, and one or more programs, wherein the one or more programs are stored in the memory and configured to be executed by the one or more processors, the one or more programs including instructions for performing one or more of the example methods disclosed above.

Some examples of the disclosure are directed to a non-transitory computer readable storage medium storing one or more programs, the one or more programs comprising instructions, which when executed by one or more processors of an electronic device, cause the electronic device to perform one or more of the example methods disclosed above.

Some examples of the disclosure are directed to an electronic device, comprising one or more processors, memory, and means for performing one or more of the example methods disclosed above.

Some examples of the disclosure are directed to an information processing apparatus for use in an electronic device, the information processing apparatus comprising means for performing one or more of the example methods disclosed above.

Some examples of the disclosure are directed to a method, comprising, at an electronic device in communication with a display and one or more input devices, presenting, via the display, a computer-generated environment, including a three-dimensional first display station displayed within the computer-generated environment, wherein the first display station includes one or more representations of one or more products, wherein a first representation of the one or more representations corresponding to a first product includes a representation of a first base component, and a representation of a first accessory component, while presenting the computer-generated environment, receiving, via the one or more input devices, a request to customize the first product with a second accessory component, including detecting a user input moving a representation of the second accessory component, and in accordance with a determination that one or more first criteria are satisfied, including a first criterion that is satisfied when the representation of the second accessory component is within a threshold distance from the first representation, replacing the representation of the first accessory component with the representation of the second accessory component. Additionally or alternatively to one or more of the examples disclosed above, in some examples the computer-generated environment includes a second display station, separate from the first display station, wherein the second display station includes one or more representations of one or more accessory components, including the representation of the second accessory component. Additionally or alternatively to one or more of the examples disclosed above, in some examples detecting the user input moving the representation of the second accessory component includes detecting a grasping gesture performed by a hand of a user of the device directed to the representation of the second accessory component and, while maintaining the grasping gesture, moving the hand of the user. Additionally or alternatively to one or more of the examples disclosed above, in some examples receiving the request to customize the first product includes detecting a selection gesture by a hand of a user of the device directed to the representation of the second accessory component, and the one or more first criteria includes a criterion that is satisfied when the request includes a termination of the selection gesture. Additionally or alternatively to one or more of the examples disclosed above, in some examples the method further comprises, in accordance with a determination that the one or more first criteria are not satisfied, forgoing replacing the representation of the first accessory component with the representation of the second accessory component. Additionally or alternatively to one or more of the examples disclosed above, in some examples the method further comprises, while presenting the computer-generated environment, receiving, via the one or more input devices, a request to customize the first base component with a first customization option, and in response to receiving the request to customize the first base component, updating a visual characteristic of the first representation in accordance with the first customization option. Additionally or alternatively to one or more of the examples disclosed above, in some examples while presenting the computer-generated environment, receiving, via the one or more input devices, a request to customize the first product with a second base component, including detecting a user input moving a representation of the second base component, and in accordance with a determination that one or more second criteria are satisfied, including a second criterion that is satisfied when the representation of the second base component is within a threshold distance from the first representation, replacing the representation of the first base component with the representation of the second base component. Additionally or alternatively to one or more of the examples disclosed above, in some examples the computer-generated environment includes a second display station, separate from the first display station, wherein the second display station includes one or more representations of one or more base components. Additionally or alternatively to one or more of the examples disclosed above, in some examples detecting the user input moving the representation of the second base component includes detecting a grasping gesture performed by a hand of a user of the device directed to the representation of the second base component and, while maintaining the grasping gesture, moving the hand of the user. Additionally or alternatively to one or more of the examples disclosed above, in some examples receiving the request to customize the first product includes detecting a selection gesture by a hand of a user of the device directed to the representation of the second base component, and the one or more second criteria includes a second criterion that is satisfied when the request includes a termination of the selection gesture. Additionally or alternatively to one or more of the examples disclosed above, in some examples the method further comprises, in accordance with a determination that the one or more second criteria are not satisfied, forgoing replacing the representation of the first base component with the representation of the second base component. Additionally or alternatively to one or more of the examples disclosed above, in some examples the method further comprises, while presenting the computer-generated environment, receiving, via the one or more input devices, a request to preview the first product, and in response to receiving the request to preview the first product, displaying the first representation on a representation of a respective portion of a user of the device. Additionally or alternatively to one or more of the examples disclosed above, in some examples the first product is a watch device, and the respective portion of the user of the device is a wrist of the user. Additionally or alternatively to one or more of the examples disclosed above, in some examples receiving the request to preview the first product includes detecting a user input moving the first representation to within a threshold distance of the respective portion of the user. Additionally or alternatively to one or more of the examples disclosed above, in some examples the method further comprises, while presenting the first representation on the representation of the respective portion of the user, detecting a change in a pose of the respective portion of the user, and in response to detecting the change in the pose of the respective portion of the user, changing a pose of the first representation in accordance with the change in the pose of the respective portion of the user. Additionally or alternatively to one or more of the examples disclosed above, in some examples the method further comprises, while presenting the first representation on the representation of the respective portion of the user, receiving, via the one or more input devices, a second request to customize the first product with a third accessory component, and in response to receiving the second request to customize the first product with the third accessory component, replacing the representation of the second accessory component with a representation of the third accessory component, while maintaining display of the first representation on the representation of the respective portion of the user.

Some examples of the disclosure are directed to an electronic device, comprising one or more processors, memory, and one or more programs, wherein the one or more programs are stored in the memory and configured to be executed by the one or more processors, the one or more programs including instructions for presenting, via a display, a computer-generated environment, including a three-dimensional first display station displayed within the computer-generated environment, wherein the first display station includes one or more representations of one or more products, wherein a first representation corresponding to a first product includes a representation of a first base component, and a representation of a first accessory component, while presenting the computer-generated environment, receiving, via one or more input devices, a request to customize the first product with a second accessory component, including detecting a user input moving a representation of the second accessory component, and in accordance with a determination that one or more criteria are satisfied, including a criterion that is satisfied when the representation of the second accessory component is within a threshold distance from the first representation, replacing the representation of the first accessory component with the representation of the second accessory component.

Some examples of the disclosure are directed to a non-transitory computer readable storage medium storing one or more programs, the one or more programs comprising instructions, which when executed by one or more processors of an electronic device, cause the electronic device to present, via a display, a computer-generated environment, including a three-dimensional first display station displayed within the computer-generated environment, wherein the first display station includes one or more representations of one or more products, wherein a first representation corresponding to a first product includes a representation of a first base component, and a representation of a first accessory component, while presenting the computer-generated environment, receive, via one or more input devices, a request to customize the first product with a second accessory component, including detecting a user input moving a representation of the second accessory component, and in accordance with a determination that one or more criteria are satisfied, including a criterion that is satisfied when the representation of the second accessory component is within a threshold distance from the first representation, replace the representation of the first accessory component with the representation of the second accessory component.

Some examples of the disclosure are directed to an electronic device, comprising one or more processors, memory, means for presenting, via a display, a computer-generated environment, including a three-dimensional first display station displayed within the computer-generated environment, wherein the first display station includes one or more representations of one or more products, wherein a first representation corresponding to a first product includes a representation of a first base component, and a representation of a first accessory component, means for, while presenting the computer-generated environment, receiving, via one or more input devices, a request to customize the first product with a second accessory component, including detecting a user input moving a representation of the second accessory component, and means for, in accordance with a determination that one or more criteria are satisfied, including a criterion that is satisfied when the representation of the second accessory component is within a threshold distance from the first representation, replacing the representation of the first accessory component with the representation of the second accessory component.

Some examples of the disclosure are directed to an information processing apparatus for use in an electronic device, the information processing apparatus comprising means for presenting, via a display, a computer-generated environment, including a three-dimensional first display station displayed within the computer-generated environment, wherein the first display station includes one or more representations of one or more products, wherein a first representation corresponding to a first product includes a representation of a first base component, and a representation of a first accessory component, means for, while presenting the computer-generated environment, receiving, via one or more input devices, a request to customize the first product with a second accessory component, including detecting a user input moving a representation of the second accessory component, and means for, in accordance with a determination that one or more criteria are satisfied, including a criterion that is satisfied when the representation of the second accessory component is within a threshold distance from the first representation, replacing the representation of the first accessory component with the representation of the second accessory component.

Some examples of the disclosure are directed to an electronic device, comprising one or more processors, memory, and one or more programs, wherein the one or more programs are stored in the memory and configured to be executed by the one or more processors, the one or more programs including instructions for performing one or more of the example methods disclosed above.

Some examples of the disclosure are directed to a non-transitory computer readable storage medium storing one or more programs, the one or more programs comprising instructions, which when executed by one or more processors of an electronic device, cause the electronic device to perform one or more of the example methods disclosed above.

Some examples of the disclosure are directed to an electronic device, comprising one or more processors, memory, and means for performing one or more of the example methods disclosed above.

Some examples of the disclosure are directed to an information processing apparatus for use in an electronic device, the information processing apparatus comprising means for performing one or more of the example methods disclosed above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:
1. A method, comprising:
at an electronic device in communication with a display and one or more input devices:
  presenting, via the display, a three-dimensional environment, including a three-dimensional first display station displayed within the three-dimensional environment, wherein the first display station includes a first representation of a first product and one or more representations of one or more features associated with the first product, wherein the one or more representations of the one or more features are different from the first representation of the first product;
  while presenting the three-dimensional environment, detecting, via the one or more input devices, a user input selecting a first representation of the one or more representations corresponding to a first feature; and
  in response to detecting the selection of the first representation of the one or more representations corresponding to the first feature:
    displaying, via the display, a three-dimensional second display station, separate from the first display station, concurrently with the first display station, wherein the second display station includes information associated with the first feature and was not displayed prior to detecting selection of the first representation of the one or more representations corresponding to the first feature.
2. The method of claim 1, further comprising:
while presenting the three-dimensional environment, detecting, via the one or more input devices, a second user input selecting a second representation of the one or more representations corresponding to a second feature; and
in response to detecting the selection of the second representation:
  updating the second display station to:
    cease displaying information associated with the first feature, and
    display information associated with the second feature.
3. The method of claim 1, further comprising:
while presenting the three-dimensional environment, detecting, via the one or more input devices, a second user input selecting a second representation of the one or more representations corresponding to a second feature; and
in response to detecting the selection of the second representation:
  displaying, via the display, a third display station, separate from the first and the second display stations, wherein the third display station includes information associated with the second feature; and
  maintaining display of the second display station.
4. The method of claim 1, wherein:
the first display station is displayed on a first surface of an object in the three-dimensional environment; and
the second display station is displayed on the first surface, adjacent to the first display station.
5. The method of claim 1, further comprising:
while presenting the three-dimensional environment, detecting, via the one or more input devices, a user input selecting the first display station;
in response to detecting the user input selecting the first display station, detecting, via the one or more input devices, movement of the user input from a first location to a second location; and
in response to detecting the movement of the user input from the first location to the second location, relocating the first display station to the second location and relocating the second display station adjacent to the first display station.
6. The method of claim 1, further comprising:
while presenting the three-dimensional environment, detecting, via the one or more input devices, a surface in the three-dimensional environment;
in response to a determination that the surface has been detected, displaying the first display station on the surface and displaying the second display station on the surface adjacent to the first display station; and in response to a determination that the surface has not been detected, displaying the first display station floating in the three-dimensional environment and displaying the second display station adjacent to the first display station.

7. The method of claim 1, wherein displaying the second display station includes:

moving the first display station from a first location to a second location, and displaying the second display station at a location that partially overlaps with the first location.

8. The method of claim 1, wherein the information associated with the first feature includes any one of: a textual element associated with the first feature and a graphical element associated with the first feature.

9. The method of claim 1, wherein the information associated with the first feature is displayed at a location in the three-dimensional environment above the second display station.

10. The method of claim 1, wherein the first representation of the first product is displayed at a location in the three-dimensional environment above the first display station.

11. The method of claim 1, further comprising:

while presenting the first display station including the first representation of the first product, receiving, via the one or more input devices, a user input corresponding to a request to customize the first product with a first customization option; and in response to receiving the user input, updating a visual characteristic of the first representation of the first product in accordance with the first customization option.

12. The method of claim 1, further comprising:

while presenting the first display station including the first representation of the first product, receiving, via the one or more input devices, a request to inspect the first product, including detecting a grasping gesture performed by a hand of a user of the electronic device directed to the first representation of the first product and a movement of the hand of the user to a respective location while maintaining the grasping gesture; and in accordance with a determination that one or more first criteria are satisfied, configuring the first representation in an interactive demonstration mode.

13. The method of claim 12, further comprising:

in response to detecting the movement of the hand of the user to the respective location while maintaining the grasping gesture, moving the first representation of the first product in accordance with the movement of the hand.

14. The method of claim 12, wherein the one or more first criteria includes a first criterion that is satisfied when the hand of the user has moved to a predetermined location relative to the user.

15. The method of claim 12, further comprising:

while the first representation is configured in the interactive demonstration mode, detecting, via the one or more input devices, a rotation of the hand of the user; and in response to detecting the rotation of the hand of the user:

rotating the first representation in accordance with the rotation of the hand; and in accordance with a determination that one or more second criteria are satisfied, displaying a first set of information associated with the first product.

16. The method of claim 15, wherein the one or more second criteria include a second criterion that is satisfied when an orientation of the first representation is within a predetermined range of orientations.

17. The method of claim 15, wherein:

in accordance with a determination that the three-dimensional environment includes the second display station, the first set of information associate with the first product includes information associated with the first feature.

18. The method of claim 15, wherein the information associated with the first product includes a three-dimensional visual element.

19. The method of claim 12, further comprising:

while presenting the first display station including the first representation of the first product, detecting, via the one or more input devices, a termination of the request to inspect the first product; and in response to detecting the termination of the request to inspect the first product:

configuring the first representation in a demonstration mode different than the interactive demonstration mode; and moving the first representation to a location associated with the first display station.

20. An electronic device, comprising:

one or more processors;

memory; and one or more programs, wherein the one or more programs are stored in the memory and configured to be executed by the one or more processors, the one or more programs including instructions for:

presenting, via a display, a three-dimensional environment, including a three-dimensional first display station displayed within the three-dimensional environment, wherein the first display station includes a first representation of a first product and one or more representations of one or more features associated with the first product, wherein the one or more representations of the one or more features are different from the first representation of the first product;

while presenting the three-dimensional environment, detecting, via one or more input devices, a user input selecting a first representation of the one or more representations corresponding to a first feature; and in response to detecting the selection of the first representation of the one or more representations corresponding to the first feature:

displaying, via the display, a three-dimensional second display station, separate from the first display station, concurrently with the first display station, wherein the second display station includes information associated with the first feature and was not displayed prior to detecting selection of the first representation of the one or more representations corresponding to the first feature.

21. A non-transitory computer readable storage medium storing one or more programs, the one or more programs comprising instructions, which when executed by one or more processors of an electronic device, cause the electronic device to:

present, via a display, a three-dimensional environment, including a three-dimensional first display station displayed within the three-dimensional environment, wherein the first display station includes a first representation of a first product and one or more representations of one or more features associated with the first product, wherein the one or more representations of the one or more features are different from the first representation of the first product;

while presenting the three-dimensional environment, detecting, via one or more input devices, a user input selecting a first representation of the one or more representations corresponding to a first feature; and in response to detecting the selection of the first representation of the one or more representations corresponding to the first feature:

display, via the display, a three-dimensional second display station, separate from the first display station, concurrently with the first display station, wherein the second display station includes information associated with the first feature and was not displayed prior to detecting selection of the first representation of the one or more representations corresponding to the first feature.

\* \* \* \* \*